(12) United States Patent  (10) Patent No.: US 7,632,142 B2
Khemakhem et al.  (45) Date of Patent: Dec. 15, 2009

(54) MODULAR MOUNTING SLEEVE FOR JACK

(75) Inventors: M'hamed Anis Khemakhem, Minnetonka, MN (US); Kenneth Allen Skluzacek, North Mankato, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/008,977

(22) Filed: Jan. 14, 2008

(65) Prior Publication Data

US 2008/0293296 A1    Nov. 27, 2008

Related U.S. Application Data

(63) Continuation of application No. 11/484,890, filed on Jul. 11, 2006, now Pat. No. 7,329,148, which is a continuation of application No. 11/144,351, filed on Jun. 3, 2005, now Pat. No. 7,083,469, which is a continuation of application No. 11/112,627, filed on Apr. 21, 2005, now Pat. No. 7,074,080.

(51) Int. Cl.
    *H01R 9/05* (2006.01)
(52) U.S. Cl. ..................................... 439/578
(58) Field of Classification Search ................ 439/578, 439/654, 638, 668, 579, 582
    See application file for complete search history.

(56) References Cited

U.S. PATENT DOCUMENTS

| 3,020,365 | A | 2/1962 | Neeman |
| 3,109,997 | A | 11/1963 | Giger et al. |
| 3,566,334 | A | 2/1971 | Ziegler, Jr. |
| 3,663,901 | A | 5/1972 | Forney, Jr. |
| 3,701,083 | A | 10/1972 | Ziegler, Jr. |
| 3,873,785 | A | 3/1975 | Lieberman |
| 3,980,385 | A | 9/1976 | Hirokawa et al. |
| 4,099,825 | A | 7/1978 | Jackson |
| 4,231,003 | A | 10/1980 | Ishimaru |
| 4,264,115 | A | 4/1981 | Chow |

(Continued)

FOREIGN PATENT DOCUMENTS

EP    1 107 368 A2    6/2001

(Continued)

OTHER PUBLICATIONS

Ward, R., "Avoiding the Pitfalls in Serial Digital Signal Distribution," *SMPTE Journal*, vol. 102, No. 1, pp. 14-23 (Jan. 1993).

(Continued)

*Primary Examiner*—Ross N Gushi
(74) *Attorney, Agent, or Firm*—Merchant & Gould P.C.

(57) ABSTRACT

A coaxial connection assembly including a coaxial jack. The jack is positioned within a longitudinal opening of a housing. The first end of the jack extends through a first end of the housing and the second end of the jack extends through a second end of the housing. The jack may only be inserted within and removed from the housing through the first end and may be held within the opening by a catch. Rotation of the jack within the opening is prevented. The housing includes a mounting flange extending away from the longitudinal opening. The flange may be adjacent the first end of the housing, and may include an opening for receiving a fastener. Sidewalls may extend from the flange toward the second end.

26 Claims, 44 Drawing Sheets

U.S. PATENT DOCUMENTS

| | | | |
|---|---|---|---|
| 4,749,968 A | 6/1988 | Burroughs |
| 4,789,351 A | 12/1988 | Fisher, Jr. et al. |
| 4,824,399 A | 4/1989 | Bogar et al. |
| 4,925,403 A | 5/1990 | Zorzy |
| 4,938,707 A | 7/1990 | Guimond et al. |
| 4,941,846 A | 7/1990 | Guimond et al. |
| 4,950,840 A | 8/1990 | Zetena |
| 4,971,569 A | 11/1990 | Gooch et al. |
| 4,971,578 A | 11/1990 | Wilson |
| 5,090,915 A | 2/1992 | Moulton |
| 5,096,444 A | 3/1992 | Lu et al. |
| 5,194,020 A | 3/1993 | Voltz |
| 5,233,501 A | 8/1993 | Allen et al. |
| 5,246,378 A | 9/1993 | Seiceanu |
| 5,280,254 A | 1/1994 | Hunter et al. |
| 5,329,262 A | 7/1994 | Fisher, Jr. |
| 5,348,491 A | 9/1994 | Louwagie et al. |
| 5,382,173 A | 1/1995 | Brown et al. |
| 5,417,588 A | 5/1995 | Olson et al. |
| 5,450,011 A | 9/1995 | Boeijen et al. |
| 5,467,062 A | 11/1995 | Burroughs |
| 5,475,394 A | 12/1995 | Kohls et al. |
| 5,482,469 A | 1/1996 | Seiceanu et al. |
| 5,489,222 A | 2/1996 | Moyer et al. |
| 5,498,175 A | 3/1996 | Yeh et al. |
| 5,503,566 A | 4/1996 | Wang |
| 5,518,414 A | 5/1996 | Antonini et al. |
| 5,567,179 A | 10/1996 | Voltz |
| 5,577,924 A | 11/1996 | Louwagie |
| 5,585,768 A | 12/1996 | Wei |
| 5,599,198 A | 2/1997 | Wang |
| 5,654,679 A | 8/1997 | Mavretic et al. |
| 5,700,160 A | 12/1997 | Lee |
| 5,702,262 A | 12/1997 | Brown et al. |
| 5,865,654 A | 2/1999 | Shimirak et al. |
| 5,876,253 A | 3/1999 | Martucci et al. |
| 5,885,096 A | 3/1999 | Ogren |
| 5,964,607 A | 10/1999 | Finke et al. |
| 6,045,378 A | 4/2000 | Follingstad |
| 6,062,910 A | 5/2000 | Braquet et al. |
| 6,065,997 A | 5/2000 | Wang |
| 6,113,431 A | 9/2000 | Wong |
| 6,213,801 B1 | 4/2001 | Tayloe et al. |
| 6,224,421 B1 | 5/2001 | Maturo, Jr. |
| 6,227,868 B1 | 5/2001 | Wlodarski |
| 6,241,562 B1 | 6/2001 | Benda et al. |
| 6,250,960 B1 | 6/2001 | Youtsey |
| 6,276,970 B1 | 8/2001 | Wong |
| 6,409,550 B1 | 6/2002 | Splichal et al. |
| 6,533,616 B2 | 3/2003 | Johnsen et al. |
| 6,572,413 B2 | 6/2003 | Olson et al. |
| 6,743,032 B2 | 6/2004 | Ogren et al. |
| 6,752,665 B2 | 6/2004 | Kha et al. |
| 6,761,588 B2 | 7/2004 | Heebe et al. |
| 6,790,080 B2 | 9/2004 | Cannon |
| 6,808,426 B2 | 10/2004 | Liu |
| 6,811,432 B2 | 11/2004 | Cabalka et al. |
| 6,817,876 B2 | 11/2004 | Cooper et al. |
| 6,830,486 B2 | 12/2004 | Norris et al. |
| 6,835,093 B1 | 12/2004 | Griffin et al. |
| 6,846,195 B2 | 1/2005 | Annequin |
| 6,848,948 B1 | 2/2005 | Khemakhem et al. |
| 6,881,076 B2 | 4/2005 | Baker |
| 6,945,817 B2 | 9/2005 | Miyazaki et al. |
| 6,953,368 B2 | 10/2005 | Khemakhem et al. |
| 7,074,080 B1 | 7/2006 | Khemakhem et al. |
| 7,083,469 B1 * | 8/2006 | Khemakhem et al. ....... 439/578 |
| 7,329,148 B2 | 2/2008 | Khemakhem et al. |
| 2002/0081907 A1 | 6/2002 | Olson et al. |
| 2002/0097105 A1 | 7/2002 | Khemakhem et al. |
| 2002/0151221 A1 | 10/2002 | Johnsen et al. |
| 2003/0134541 A1 | 7/2003 | Johnsen et al. |
| 2003/0228781 A1 | 12/2003 | Cooper et al. |
| 2004/0014365 A1 | 1/2004 | Norris et al. |
| 2004/0014367 A1 | 1/2004 | Petersen |
| 2004/0014368 A1 | 1/2004 | Kluempke |
| 2004/0097138 A1 | 5/2004 | Kha et al. |
| 2004/0209521 A1 | 10/2004 | Cooper et al. |
| 2004/0219825 A1 | 11/2004 | Musolf et al. |
| 2004/0259425 A1 | 12/2004 | Johnsen et al. |
| 2005/0026506 A1 | 2/2005 | Kha et al. |
| 2005/0095900 A1 | 5/2005 | Khemakhem et al. |
| 2005/0277331 A1 | 12/2005 | Hall |
| 2009/0011654 A1 * | 1/2009 | Khemakhem et al. ....... 439/668 |

OTHER PUBLICATIONS

Kings Electronic Co. Inc. Broadcast Video Products Catalog, front cover page, pp. 1 and 7, and back cover page (1991).

Photographs of a Kings Electronic Co. Inc. Video Jack Part No. 7400-1, 1 page (Date Unknown).

ADC Telecommunications, Inc. "Broadcast Products," 11th Edition, Publication No. 1180270, front cover, table of contents, pp. 1-16, 45-67, 172-191, back cover (Aug. 2003).

Canford Audio Video Jackfield 12 photos (Undated).

* cited by examiner

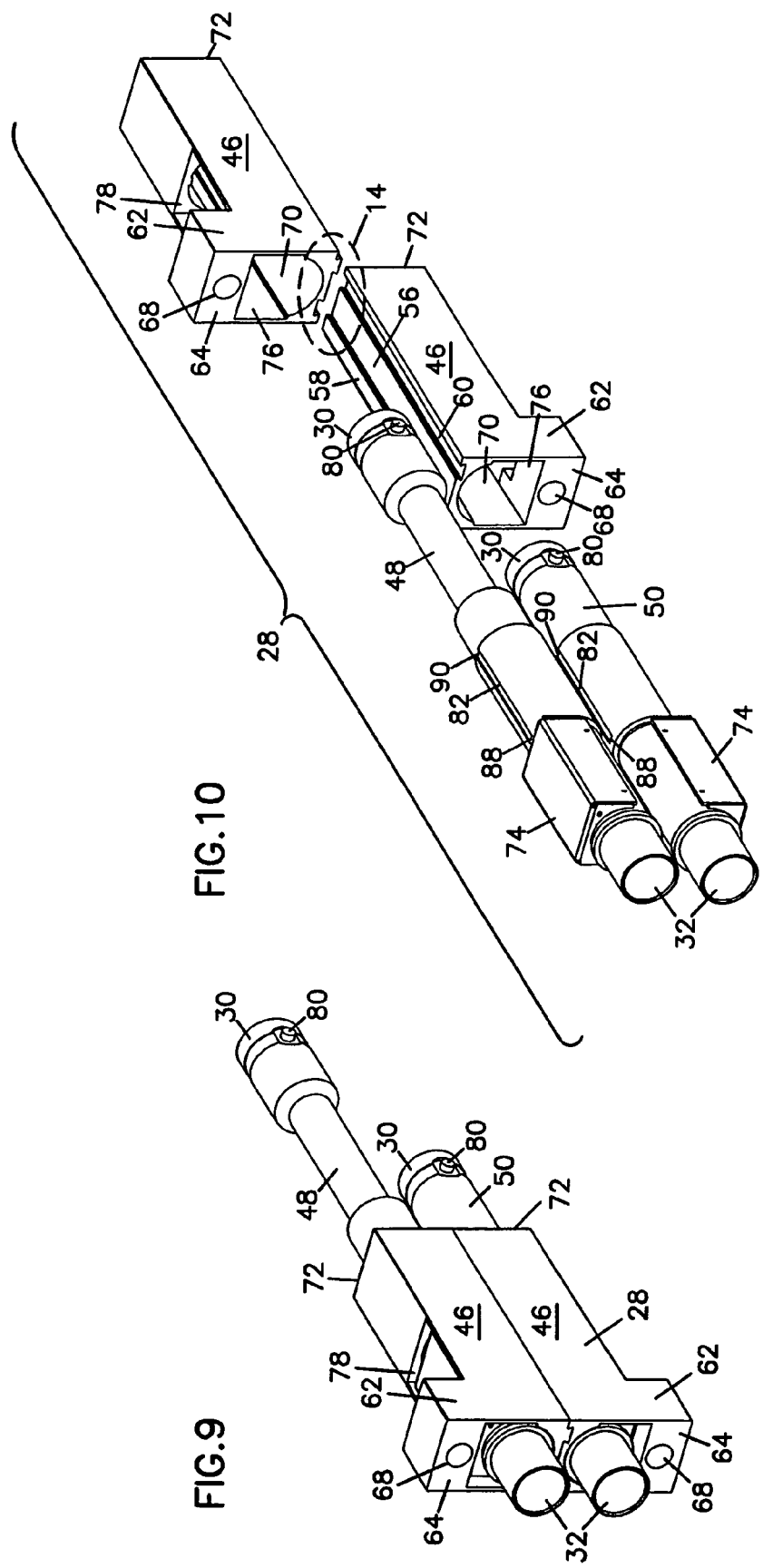

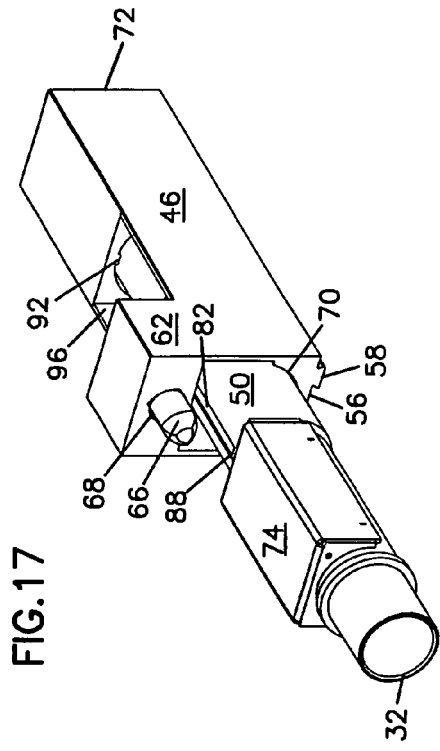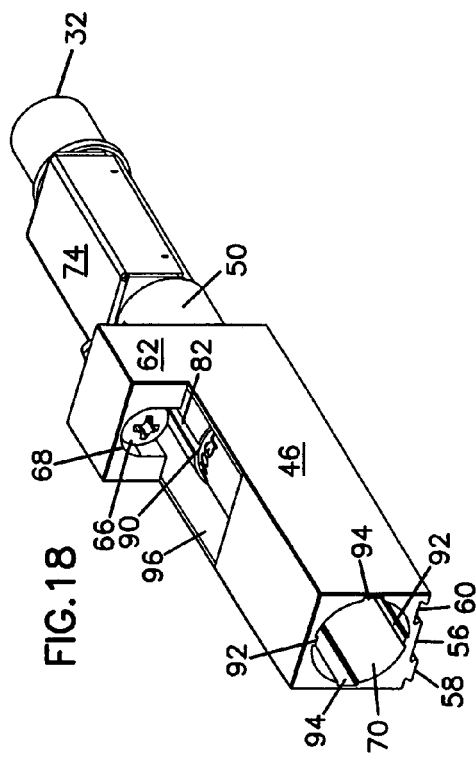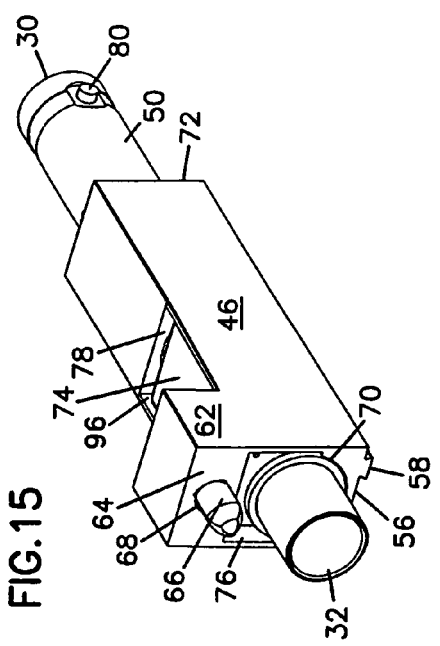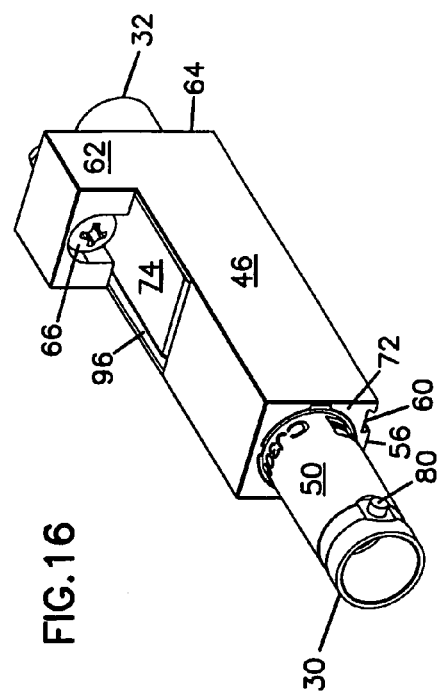

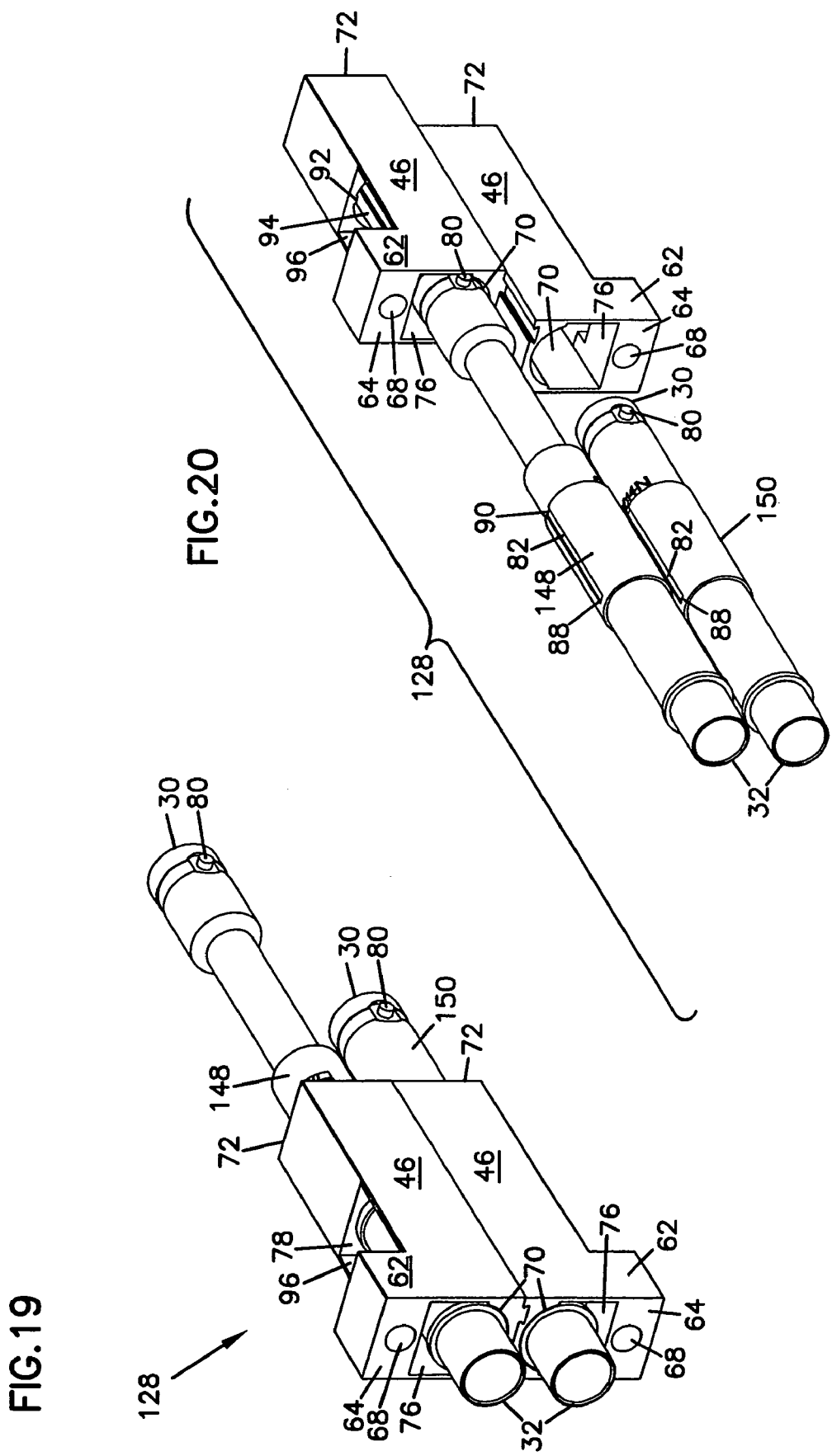

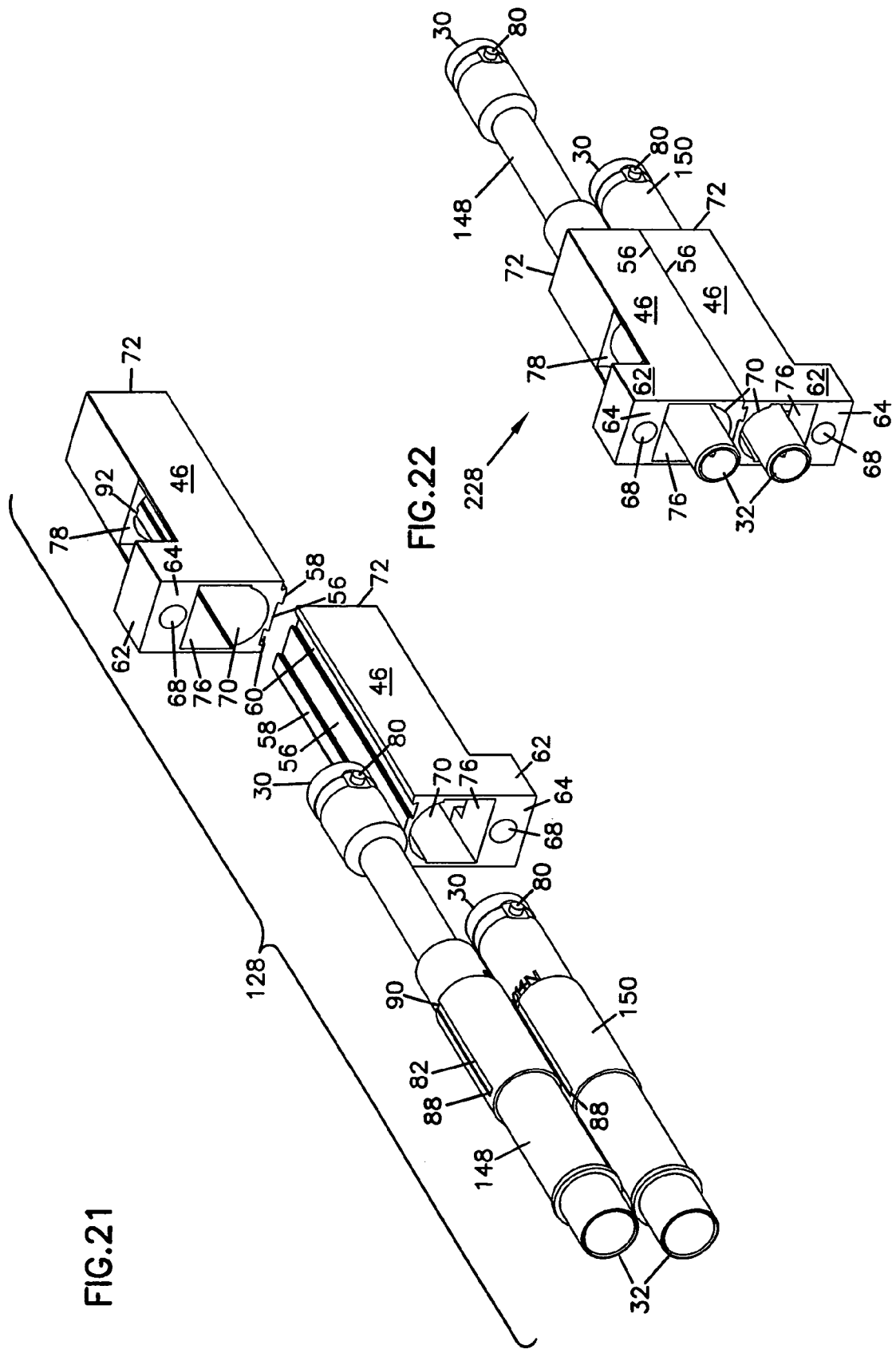

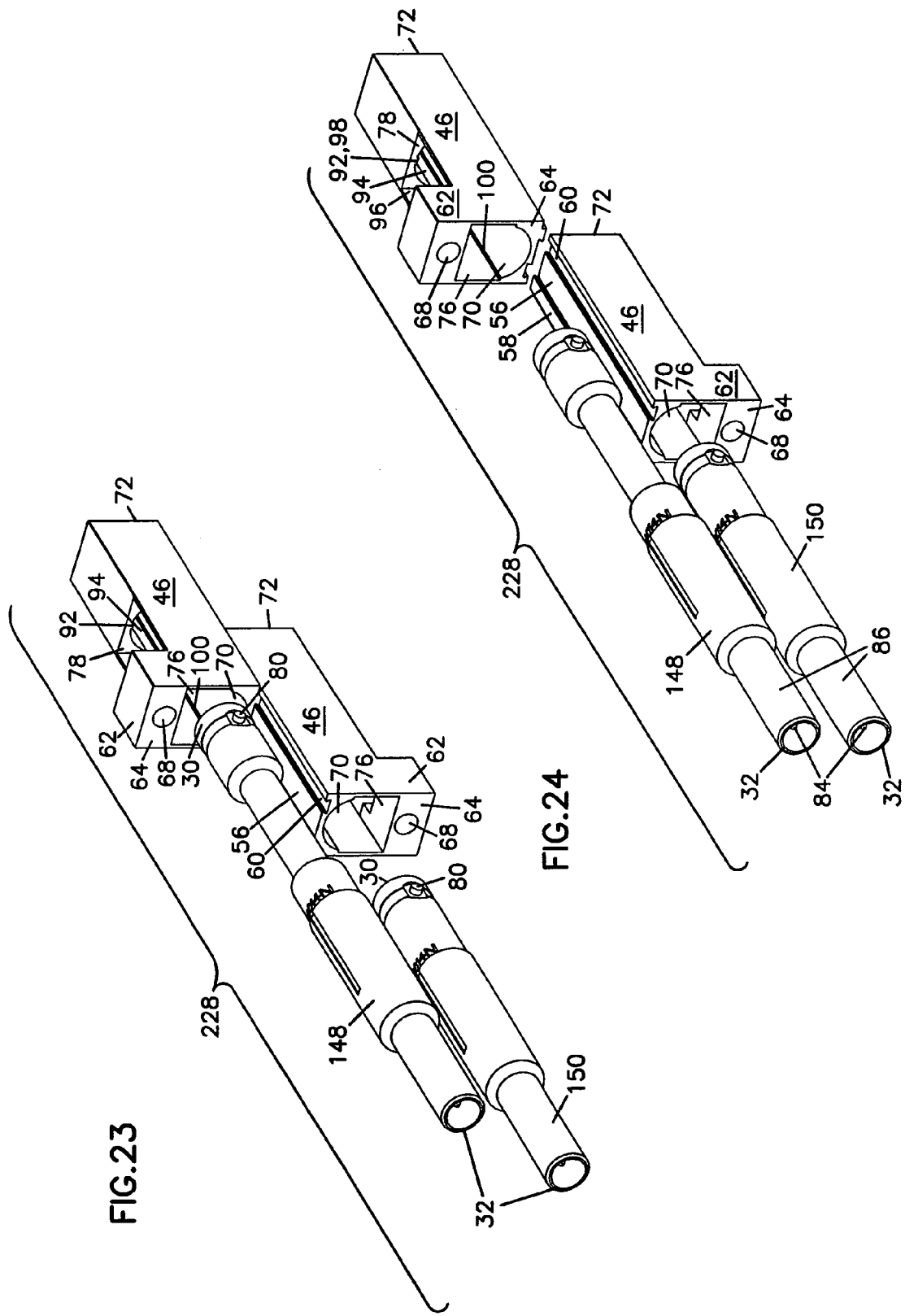

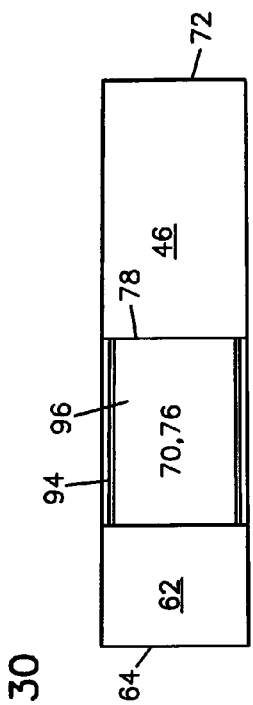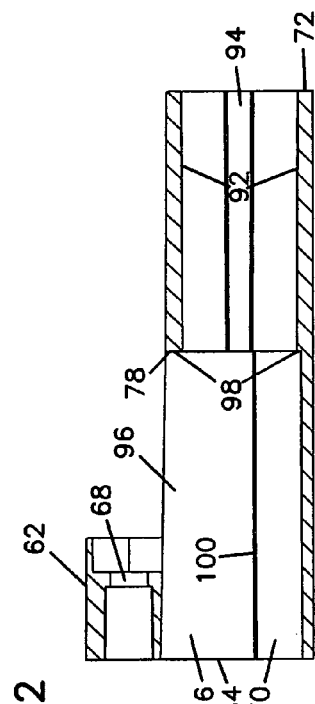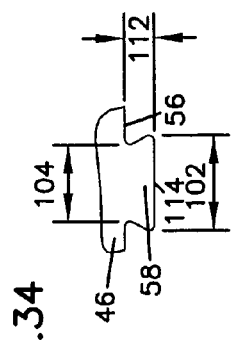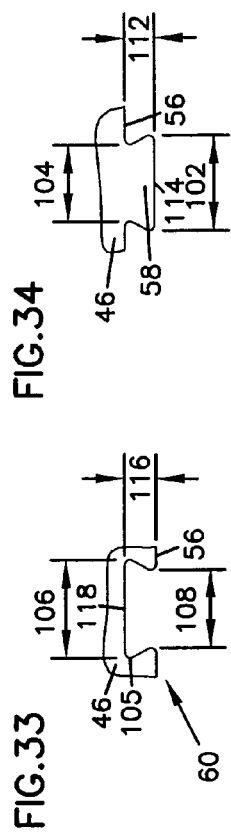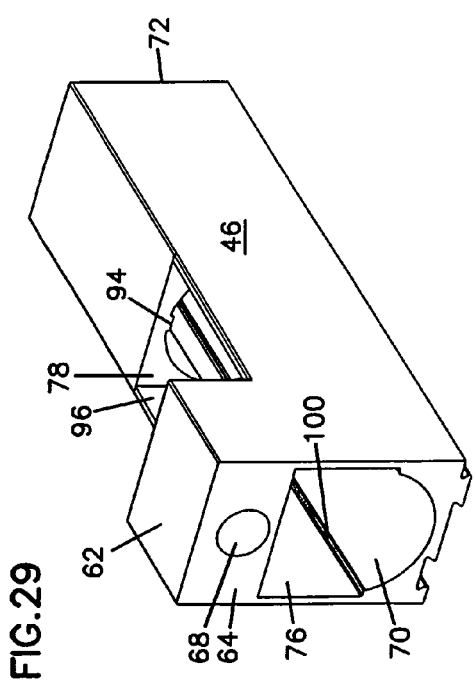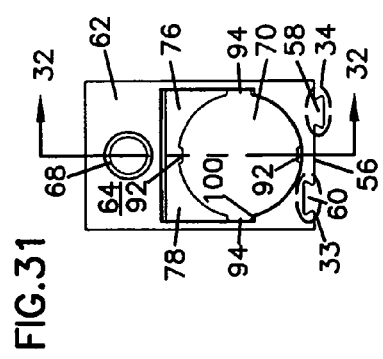

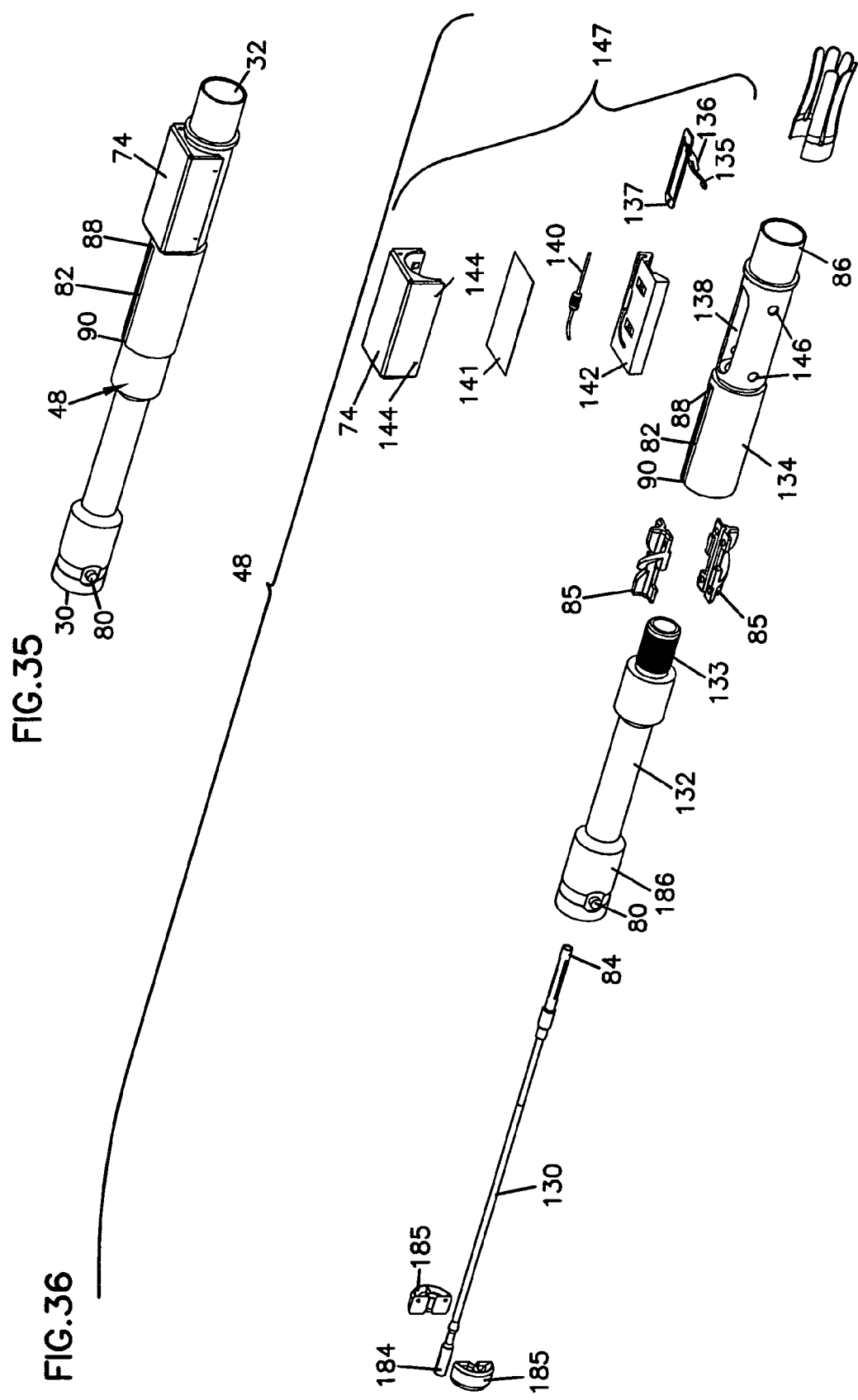

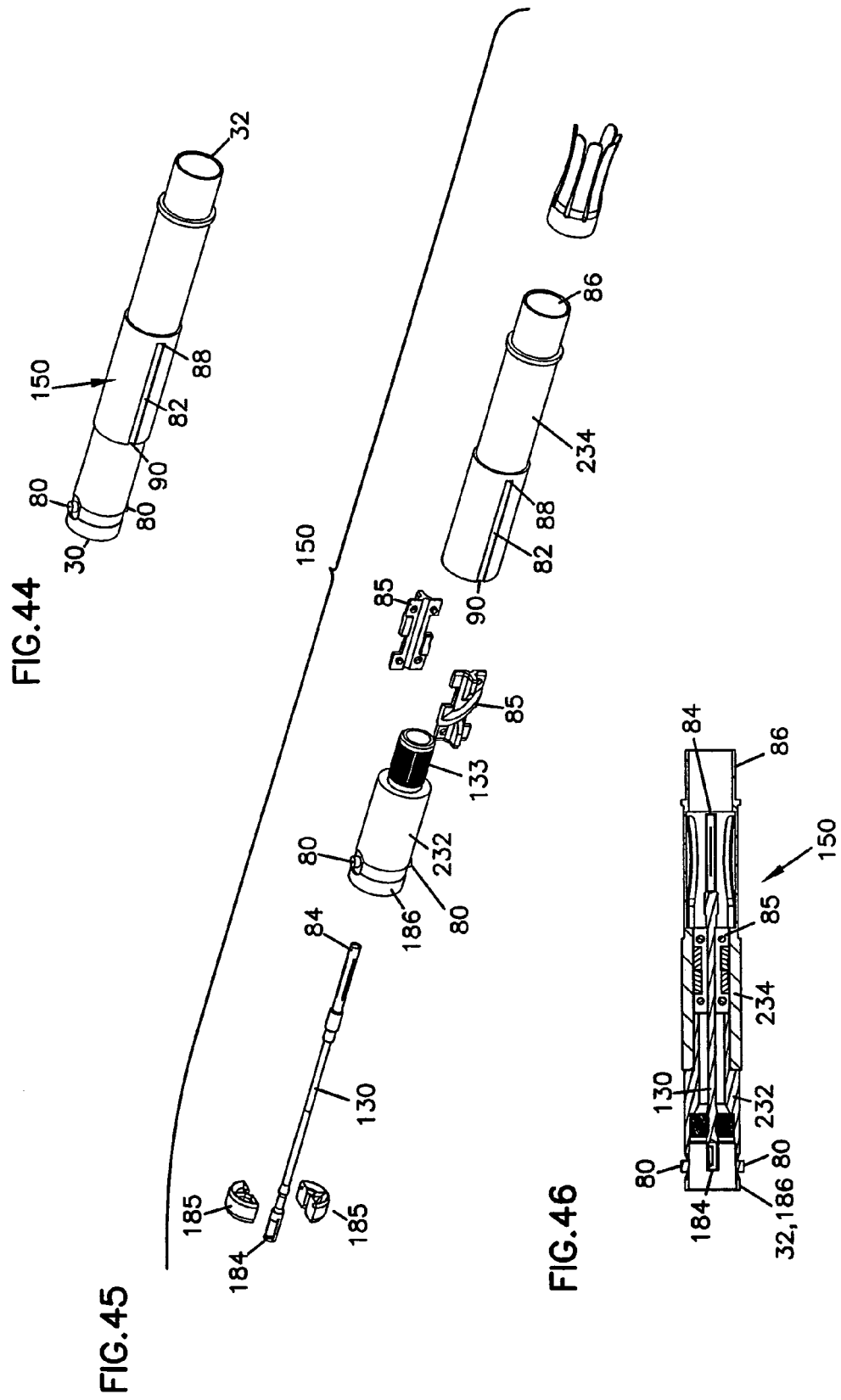

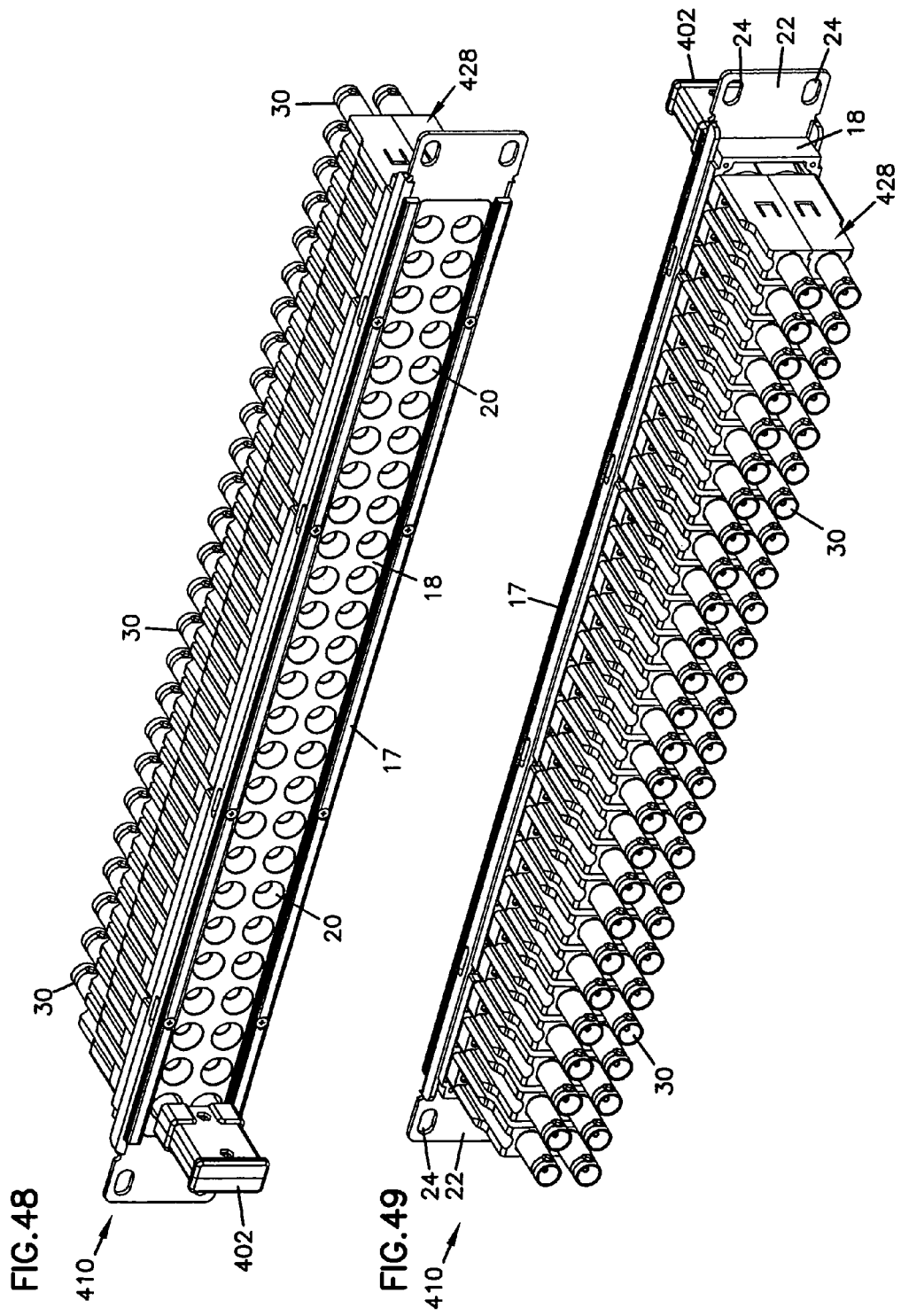

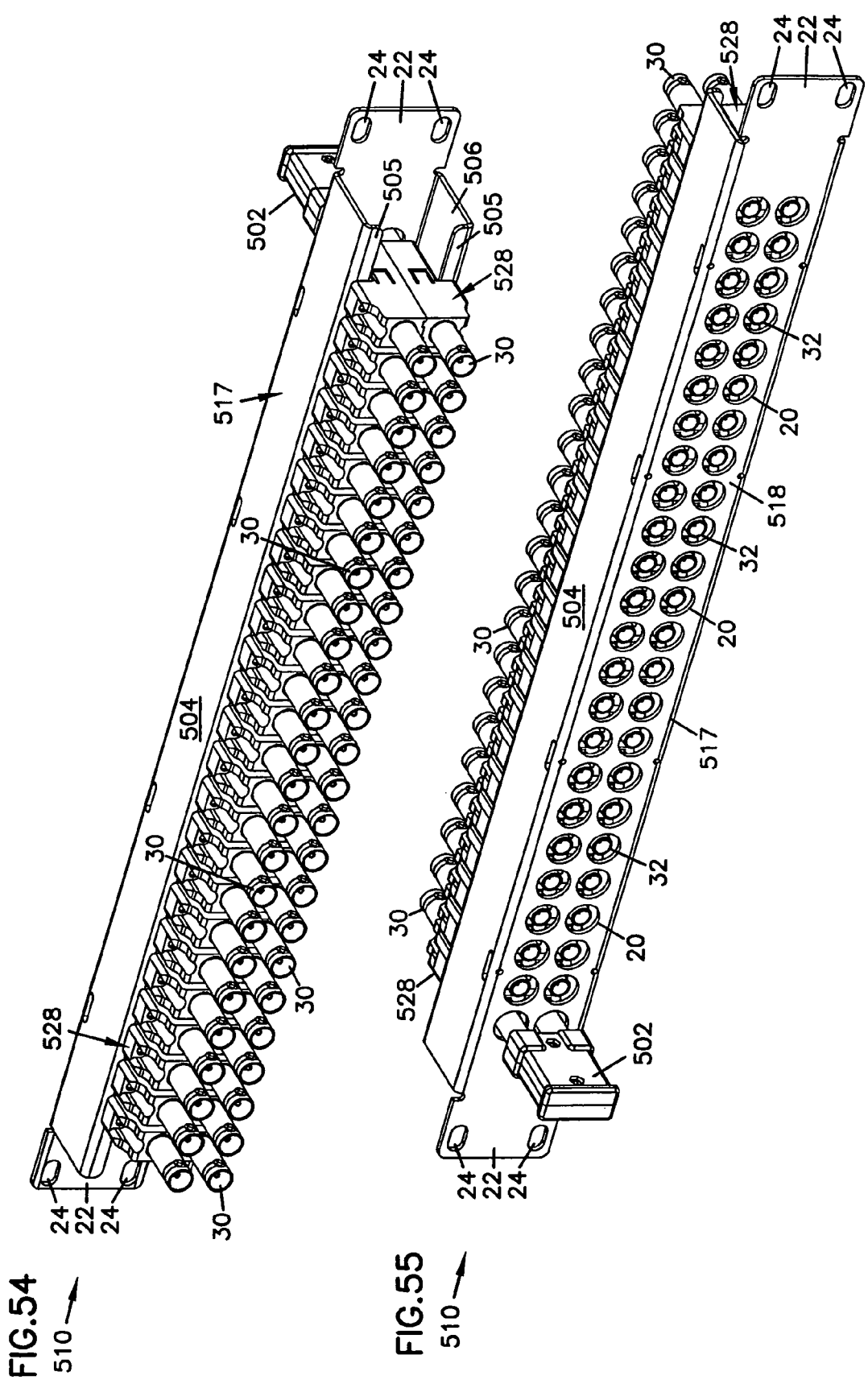

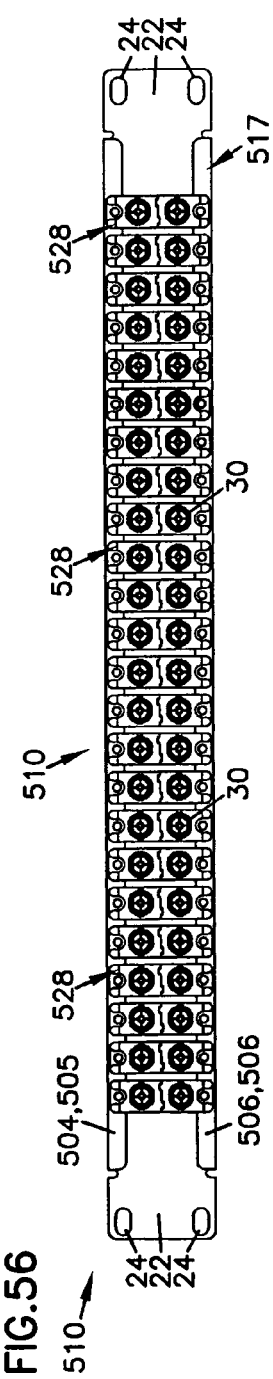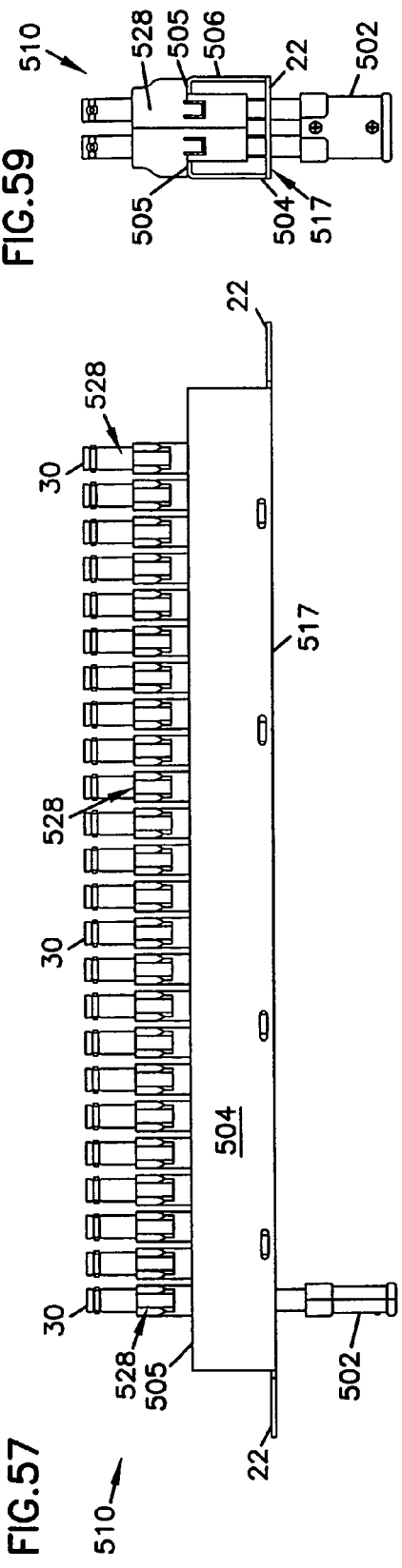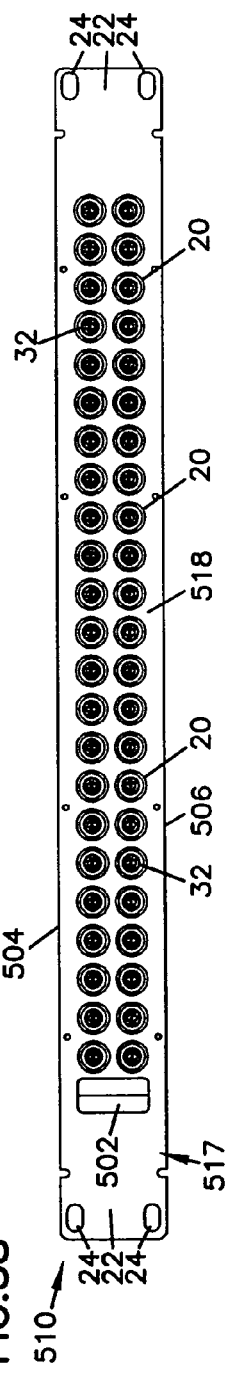

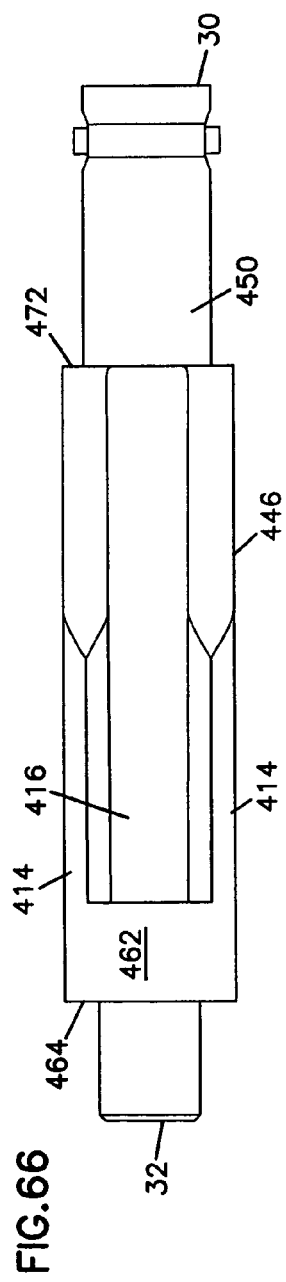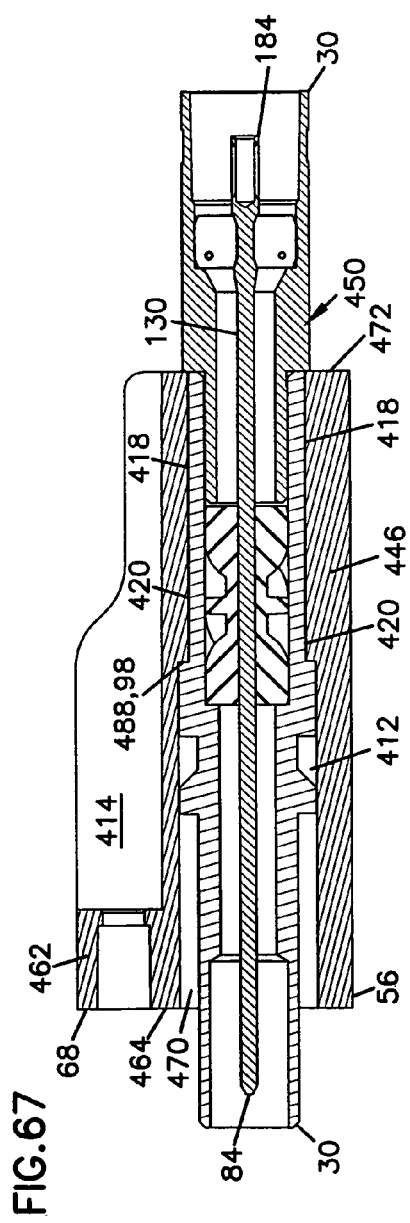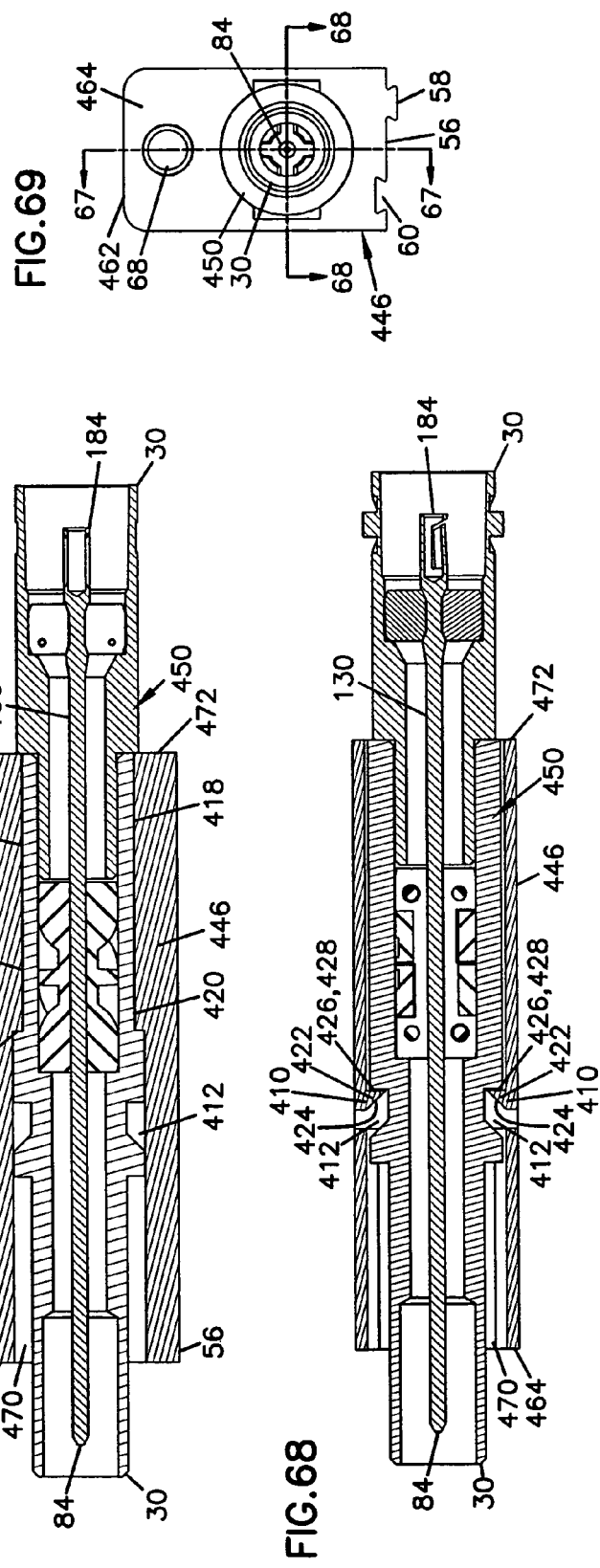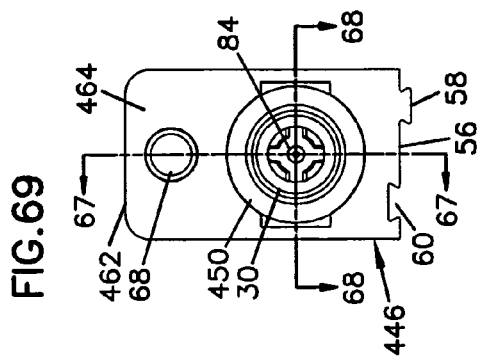

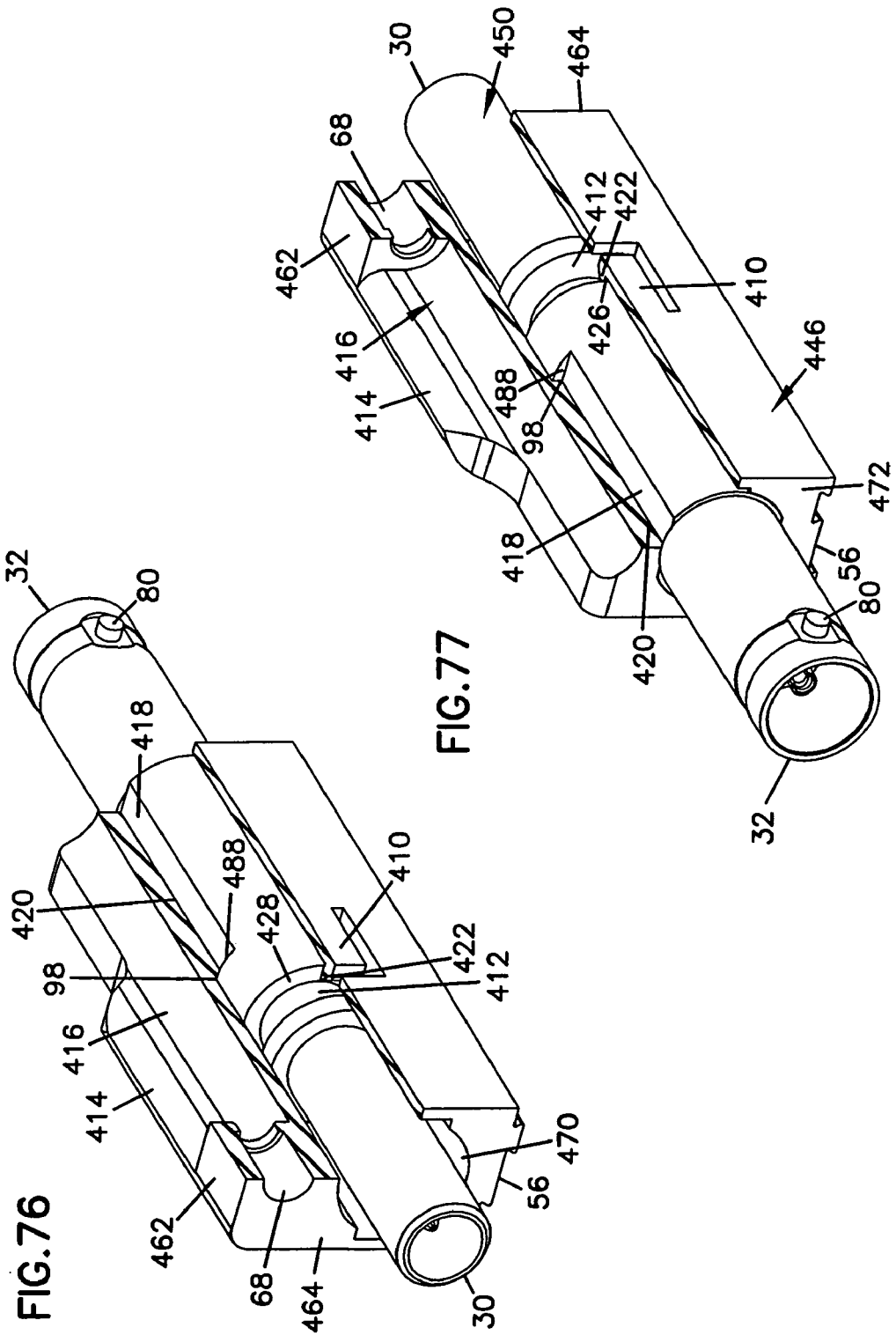

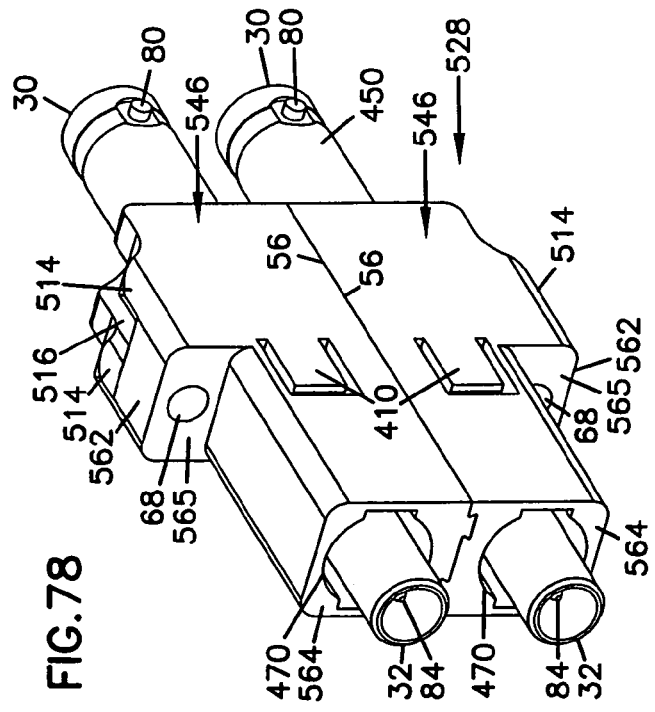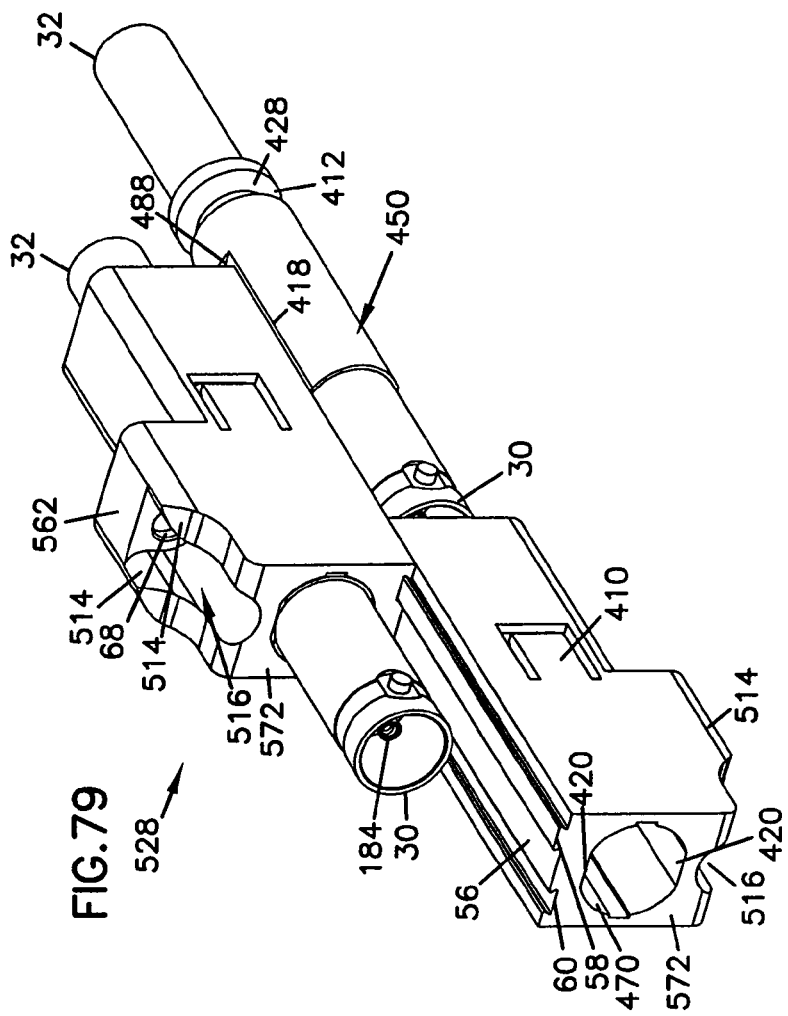

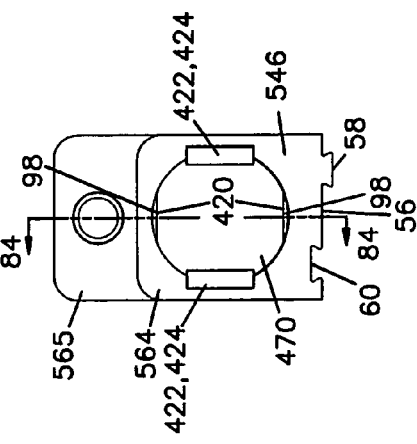
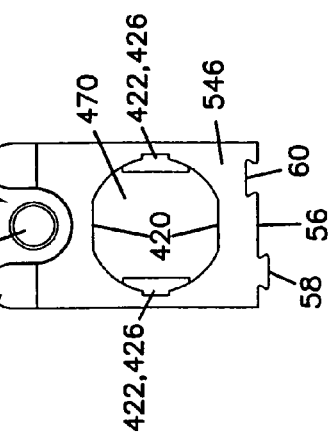
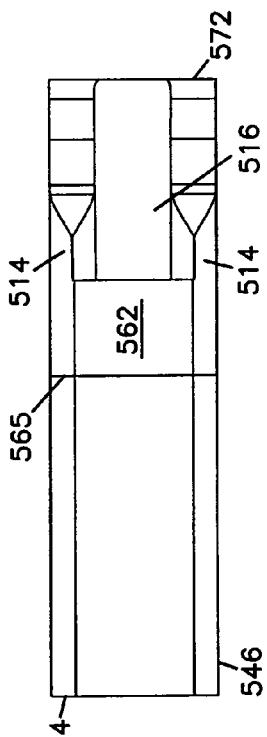
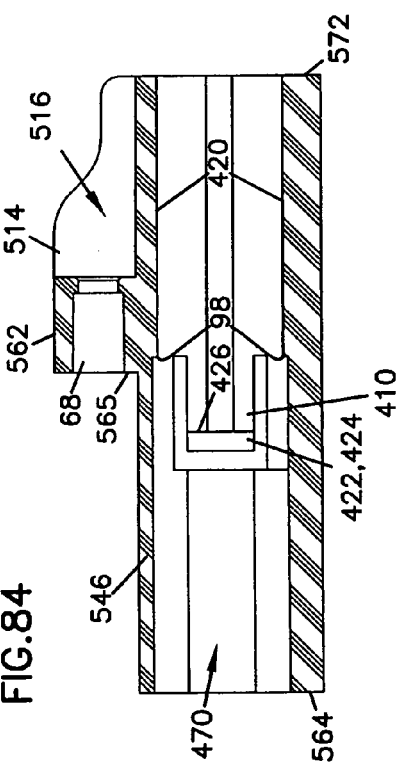
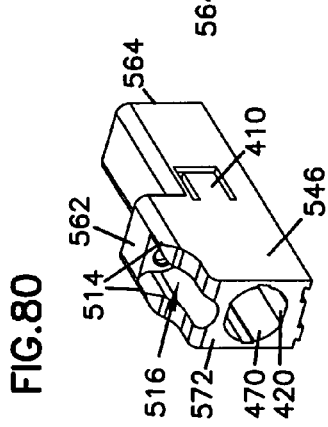
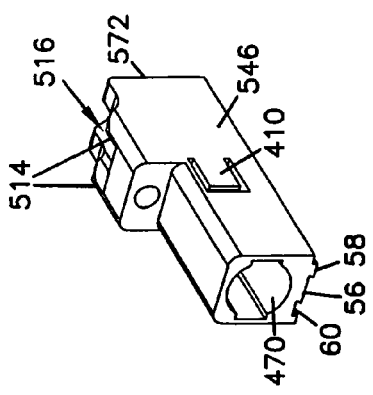

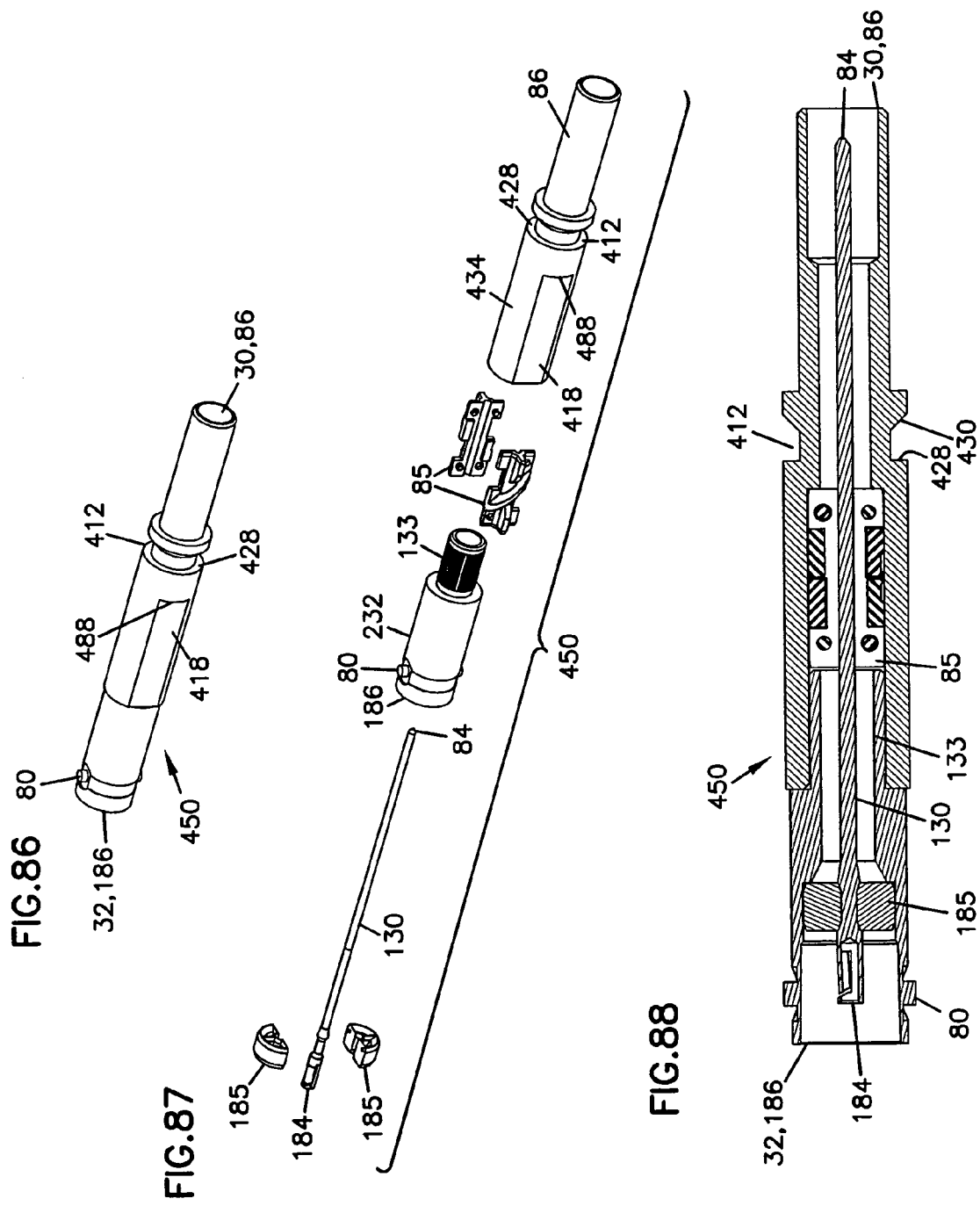

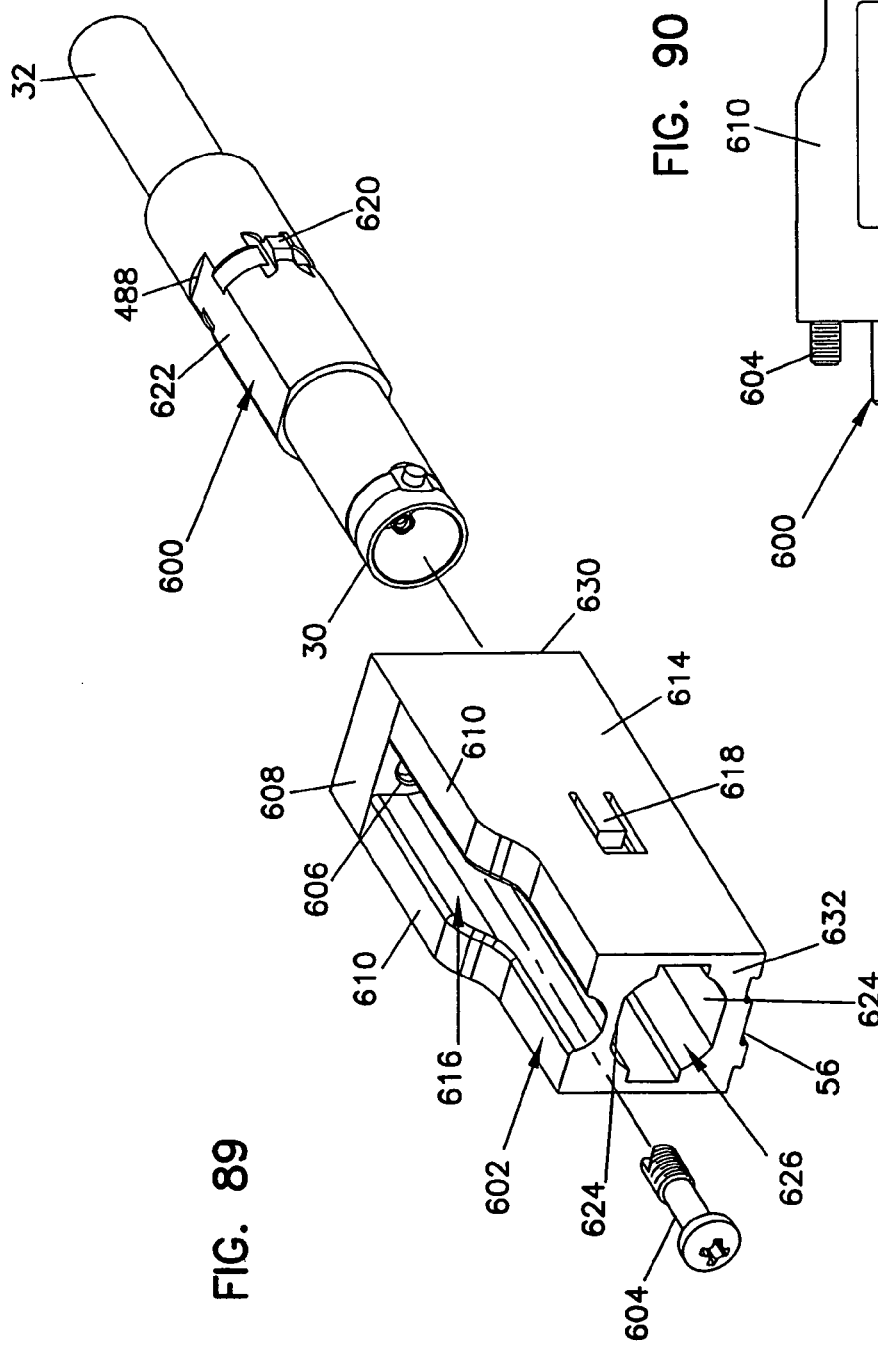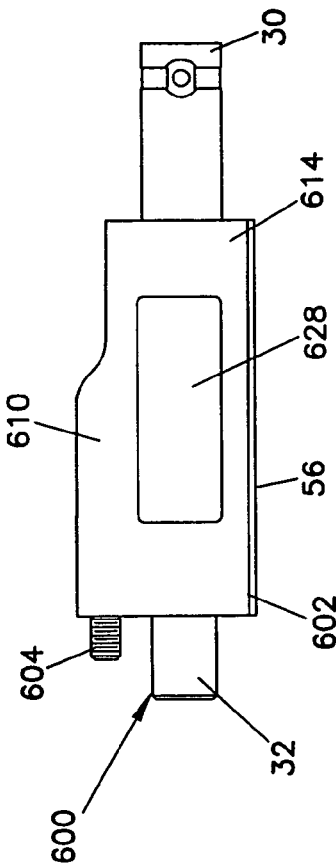

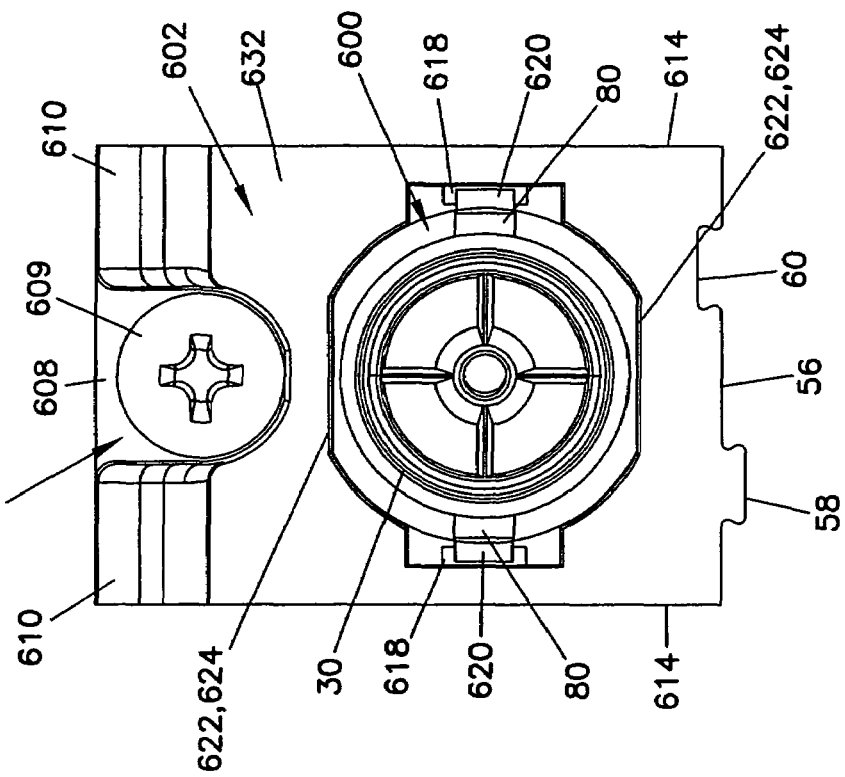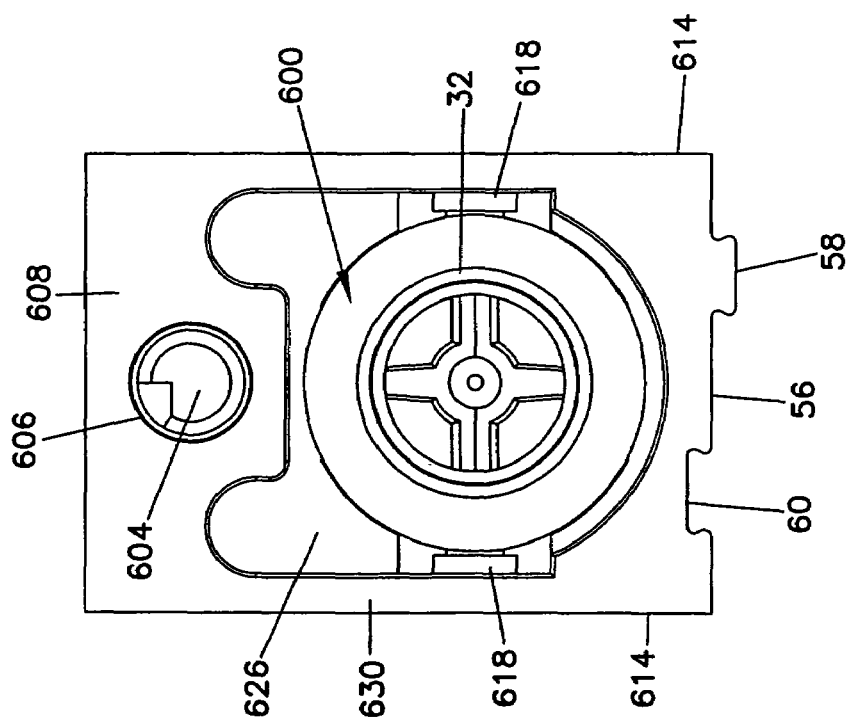

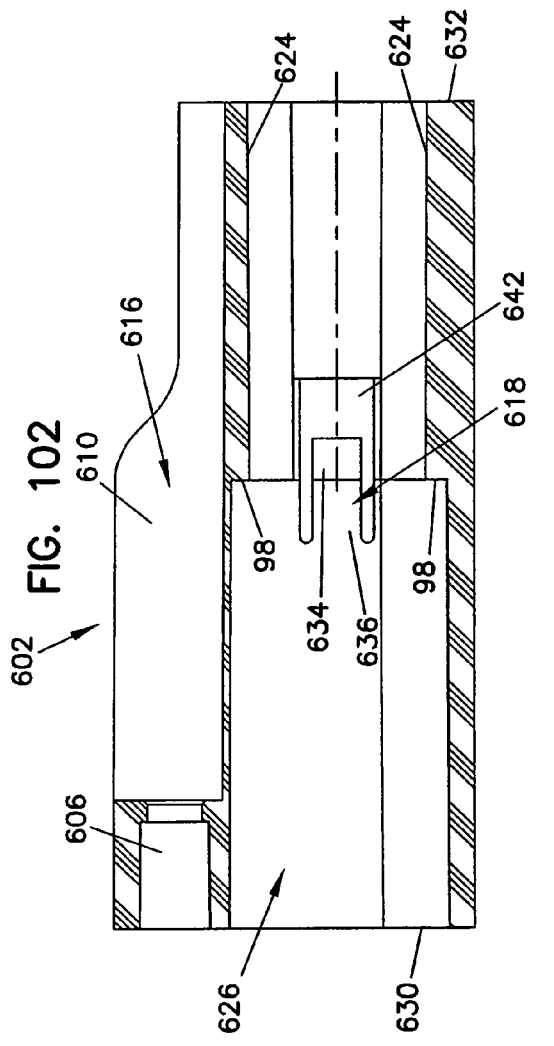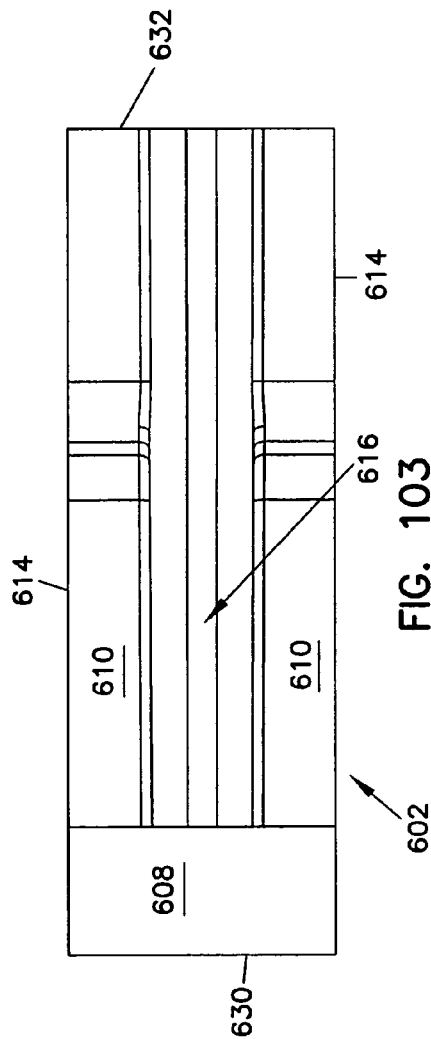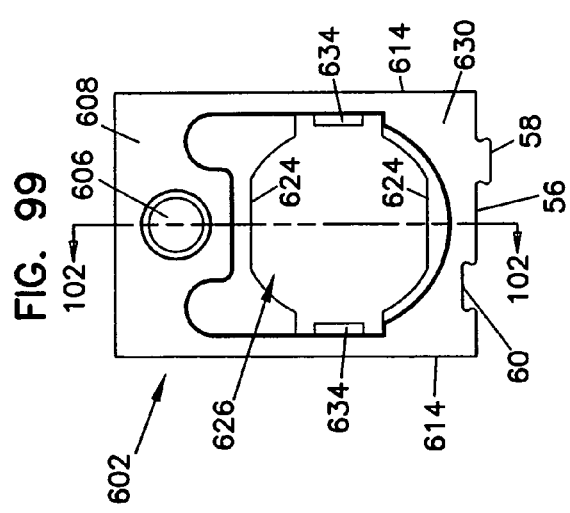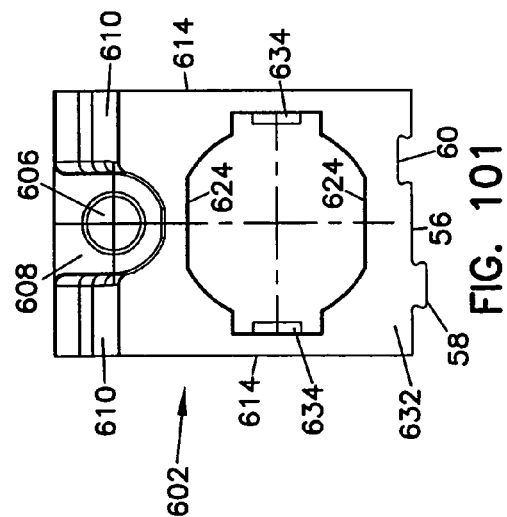

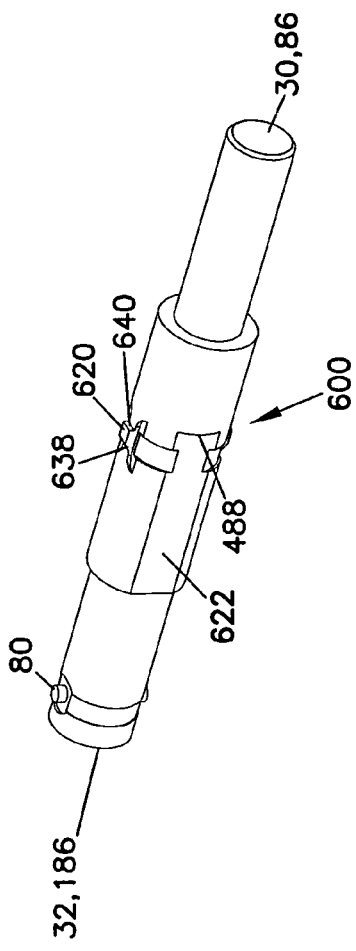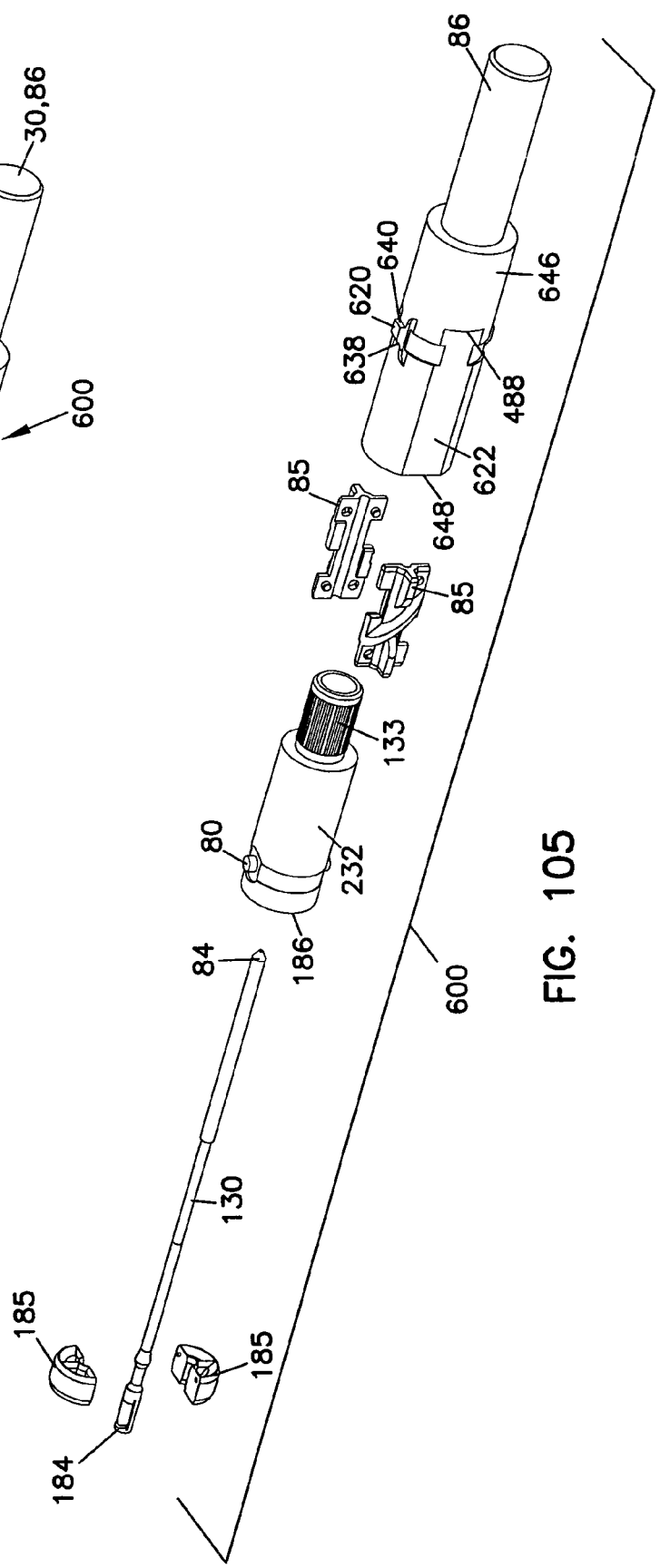

MODULAR MOUNTING SLEEVE FOR JACK

CROSS REFERENCE TO RELATED APPLICATIONS

This application is a continuation of application Ser. No. 11/484,890, filed Jul. 11, 2006 now U.S. Pat. No. 7,329,148, which is a continuation of application Ser. No. 11/144,351, filed Jun. 3, 2005, now U.S. Pat. No. 7,083,469, which is a continuation-in-part of application Ser. No. 11/112,627, filed Apr. 21, 2005, now U.S. Pat. No. 7,074,080, which applications are incorporated herein by reference.

FIELD OF THE INVENTION

The present invention generally relates to mounting sleeves for connector jacks to facilitate connection of communications circuits.

BACKGROUND

In broadcast communications equipment installations, such as in a studio or production facility, it is common to have patch panels to interconnect a variety of signal sources with a variety of downstream processing, recording and broadcast equipment. These patch panels may mount jacks in paired combinations to provide input and output circuits to each piece of equipment. Also, these paired arrangements may include a single jack connected to a monitor circuit mounted adjacent to the jack pairs. Depending on the size and complexity of the installation, these patch panels may have a single paired set of jacks or may include many paired sets in a dense configuration. Other installation may include a single jack when patching with jack pairs is not required or for connecting to monitor circuits in a location separate from the patching jack pairs.

Some of the paired jacks may be combined into a switching jack pair while other pairs may be two straight through jacks mounted adjacent each other. The jack pairs in a switching jack may have a rigid housing about them to contain both of the jacks of the pair as well as the switching circuitry between the jacks. U.S. Pat. No. 5,885,096 shows an example switching jack. This rigid housing also provides support to the jacks themselves and helps to prevent deflection of the jacks. Individual straight through jacks mounted adjacent one another in pairs do not share such a housing. Strain from the cables attached to the jacks may cause the jacks to deflect. In some cases, the jacks deflect enough to come into contact with each other or other adjacently mounted jacks.

Improvements to the jacks are desirable.

SUMMARY OF THE INVENTION

The present invention relates generally to housings for mounting jacks that receive plugs to electrically connect communications circuits. A modular housing provides support to jack assemblies mounted within the housings.

More specifically, the present invention relates to a coaxial connection assembly with a jack assembly mounted within an opening of a housing. The housing includes a mounting flange. The opening includes a mating surface which cooperates with a mating surface of the jack assembly to prevent rotation of the jack assembly within the opening. A catch within the opening positions the jack assembly within the opening. The present invention also relates to a housing for a coaxial jack, a method of assembling a coaxial jack pair and a jack pair.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows:

FIG. 9 is a front perspective view of a jack pair in accordance with the present invention.

FIG. 10 is a front perspective exploded view of the jack pair of FIG. 9.

FIG. 11 is a side view of the jack pair of FIG. 9.

FIG. 12 is an end view of the jack pair of FIG. 9.

FIG. 13 is a bottom view of the jack pair of FIG. 9.

FIG. 14 is an enlarged view of the portion labeled 14 in FIG. 10, showing mating ridges and grooves of the housings of the jacks of the jack pair in greater detail.

FIG. 15 is a front perspective view of one of the jacks of the jack pair of FIG. 9.

FIG. 16 is a rear perspective view of the jack of FIG. 15.

FIG. 17 is a front perspective view of the jack of FIG. 15 with the jack assembly partially removed from the housing.

FIG. 18 is a rear perspective view of the jack of FIG. 16 with the jack assembly partially removed from the housing.

FIG. 19 is a front perspective view of a second embodiment of a jack pair in accordance with the present invention.

FIG. 20 is a front perspective partially exploded view of the jack pair of FIG. 19.

FIG. 21 is a front perspective exploded view of the jack pair of FIG. 19.

FIG. 22 is a front perspective view of a third embodiment of a jack pair in accordance with the present invention.

FIG. 23 is a front perspective partially exploded view of the jack pair of FIG. 22.

FIG. 24 is a front perspective exploded view of the jack pair of FIG. 22.

FIG. 29 is a front perspective view of one of the housings of the jack pair of FIGS. 9, 19 and 22.

FIG. 30 is a top view of the housing of FIG. 29.

FIG. 31 is an end view of the housing of FIG. 29.

FIG. 32 is a side cross-sectional view of the housing of FIG. 29 taken along line 32-32 in FIG. 31.

FIG. 33 is an enlarged view of the portion labeled 33 in FIG. 31 showing the groove in greater detail.

FIG. 34 is an enlarged view of the portion labeled 34 in FIG. 31 showing the ridge in greater detail.

FIG. 35 is a perspective view of a jack assembly in accordance with the present invention.

FIG. 36 is an exploded perspective view of the jack assembly of FIG. 35.

FIG. 44 is a perspective view of a fourth embodiment of a jack assembly in accordance with the present invention.

FIG. 45 is an exploded perspective view of the jack assembly of FIG. 44.

FIG. 46 is a side cross-sectional view of the jack assembly of FIG. 44.

FIG. 48 is a front perspective view of a fourth embodiment of a broadcast communications patch panel in accordance with the present application, with a loop-thru plug inserted in the front of one of the jack pairs.

FIG. 49 is a rear perspective view of the broadcast communications patch panel of FIG. 48.

FIG. 54 is a front perspective view of a fifth embodiment of a broadcast communications patch panel in accordance with the present application, with a loop-thru plug inserted in the front of one of the jack pairs.

FIG. 55 is a rear perspective view of the broadcast communications patch panel of FIG. 54.

FIG. 56 is a rear view of the broadcast communications patch panel of FIG. 54.

FIG. 57 is a top view of the broadcast communications patch panel of FIG. 54.

FIG. 58 is a front view of the broadcast communications patch panel of FIG. 54.

FIG. 59 is a side view of the broadcast communications patch panel of FIG. 54.

FIG. 66 is a top view of one of the jacks of the jack pair of FIG. 60.

FIG. 67 is a side cross-sectional view of the jack of FIG. 66.

FIG. 68 is a top cross-sectional view of the jack of FIG. 66.

FIG. 69 is a front view of the jack of FIG. 66.

FIG. 76 is a front perspective partial cross-sectional view of the jack of FIG. 66.

FIG. 77 is a rear perspective partial cross-sectional view of the jack of FIG. 66.

FIG. 78 is a front perspective view of a jack pair from the broadcast communications patch panel of FIG. 54.

FIG. 79 is an exploded rear perspective view of the jack pair of FIG. 78.

FIG. 80 is a first perspective view of a modular housing holding one of the jacks of the jack pair of FIG. 78.

FIG. 81 is a second perspective view of the modular housing of FIG. 80.

FIG. 82 is a top view of the modular housing of FIG. 80.

FIG. 83 is a first end view of the modular housing of FIG. 80.

FIG. 84 is a side cross-sectional view of the modular housing of FIG. 80.

FIG. 85 is a second end view of the modular housing of FIG. 80.

FIG. 86 is a perspective view of a jack according to the present invention.

FIG. 87 is an exploded perspective view of the jack of FIG. 86.

FIG. 88 is a side cross-sectional view of the jack of FIG. 86.

FIG. 89 is an exploded perspective view of a further embodiment of a jack assembly and a mating housing according to the present invention.

FIG. 90 is a side view of the jack assembly and housing of FIG. 89 with a label attached to one side of the housing.

FIG. 91 is a first end view of the jack assembly and housing of FIG. 89.

FIG. 92 is a second opposite end view of the jack assembly and housing of FIG. 89.

FIG. 99 is a first end view of the housing of FIG. 96.

FIG. 101 is a second end view of the housing of FIG. 96.

FIG. 102 is a side cross-sectional view of the housing of FIG. 96.

FIG. 103 is a top view of the housing of FIG. 96.

FIG. 104 is a perspective view of the jack assembly of FIG. 89.

FIG. 105 is an exploded perspective view of the jack assembly of FIG. 104.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
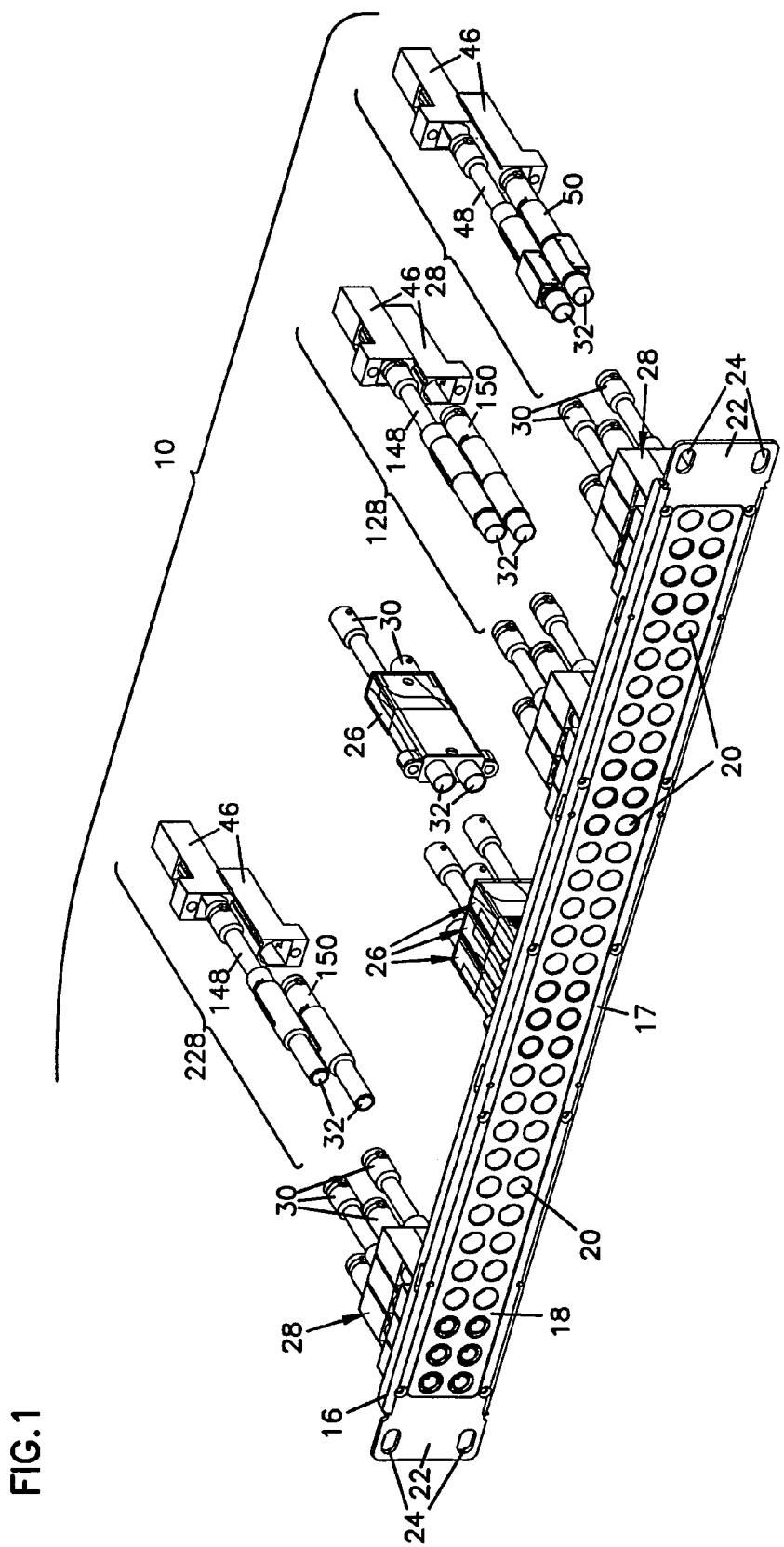
FIG. 1 is a front perspective view of a broadcast communications patch panel in accordance with the present application with some jacks shown in exploded view.

Patch panels such as a panel 10 in FIG. 1, might be installed in broadcast communications production facilities. Patch panels 10 include a chassis 16 including a mounting frame 17 and a panel front 18 with a plurality of pairs of openings 20. As shown, panel front 18 may be removed from frame 17 to allow different configurations of openings 20 to be included in panel 10. As shown, frame 17 is made of a durable material such as aluminum or steel to provide structural support to chassis 16. Other similar structural materials may be used for frame 17 such as other durable or rigid metals or composite materials. Panel front 18 is molded or formed from plastic or other similar non-conductive material to facilitate the creation of the more complex features of panel front 18 for mounting a variety of devices to chassis 16. A pair of opposing mounting flanges 22 are on either side of frame 17 to facilitate mounting panel 10 to a communications equipment rack or other mounting structure in broadcast facility. Flanges 22 include openings 24 for receiving fasteners to secure panel 10 to the rack or mounting structure.

Jacks pairs 26, 28, 128 and 228 for connecting communication circuits are mounted to a rear of panel front 18. Each of these jack pairs include a front set of connectors accessible though one of the openings 20 in panel front 18 and a rear set of connectors accessible from the rear of panel 10.

The jack pairs as shown include prior art switching jack pairs 26 and straight through jack pairs 28, 128 and 228. All of these jack pairs include a pair of rear connectors 30 for linking to communications cables extending behind panel 10 and a pair of front connectors 32 for connecting to communications cables extending in front of panel 10. Switching pair 26 provides internal circuitry so that without a plug inserted within either front connector 32, an electrical path is defined between the pair of rear connectors 30. No such circuitry is provided in straight through pairs 28, 128 and 228. U.S. Pat. No. 5,885,096, the disclosure of which is incorporated herein by reference, discloses a switching jack pair similar to switching jack pairs 26.

Jack pairs 28, 128 and 228 include a pair of housings 46, a long jack assembly or jack 48 or 148 and a short jack assembly or jack 50 or 150. Within each housing 46 is mounted one of the jack assemblies 48 or 148 and one of the jack assemblies 50 or 150. Jack pairs 28, 128 and 228, housing 46 and jacks 48, 148, 50 and 150 will be described in further detail below.

Figure 2:
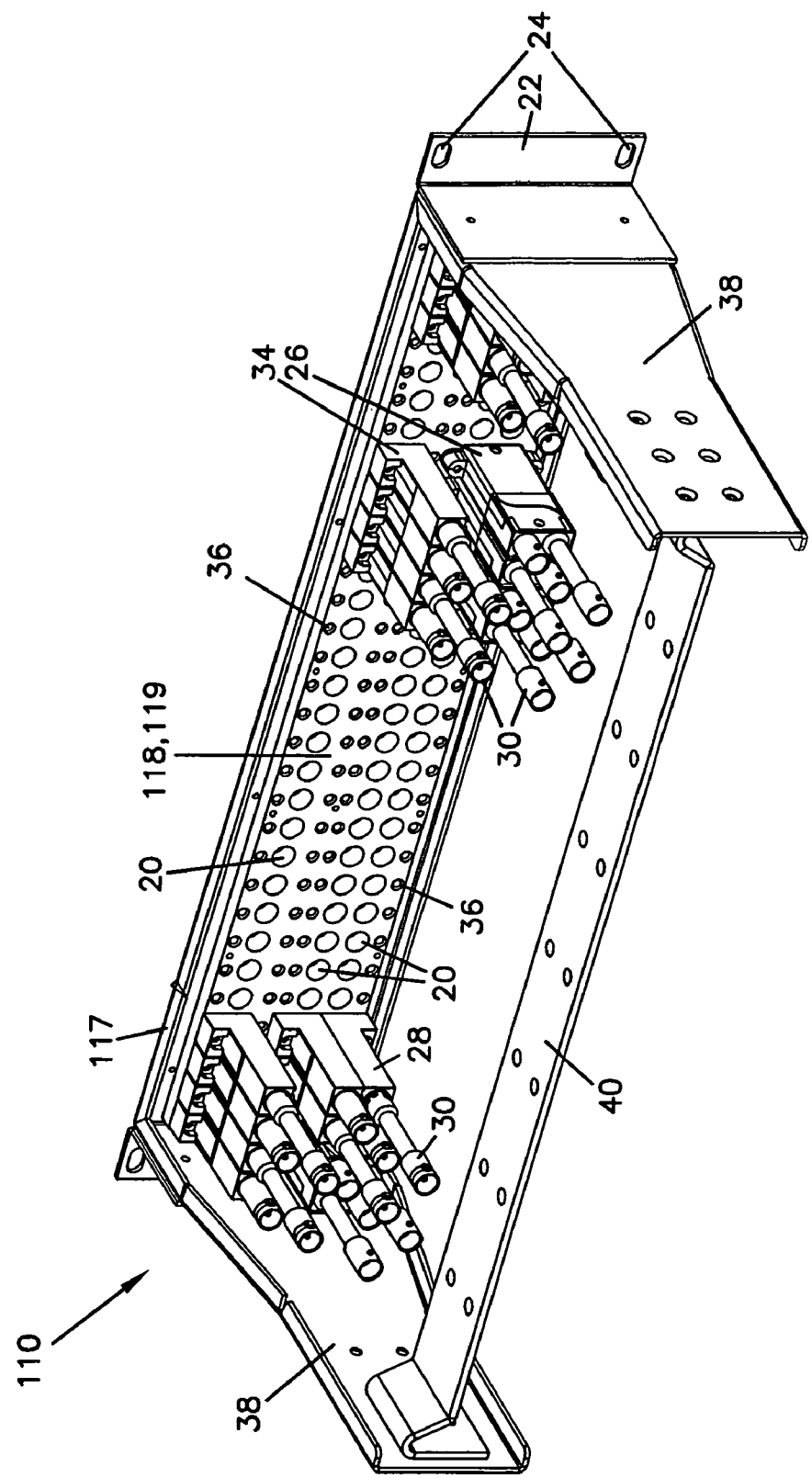
FIG. 2 is an upper rear perspective view of a second embodiment of a broadcast communications patch panel in accordance with the present invention, including monitor ports.
Figure 2A:
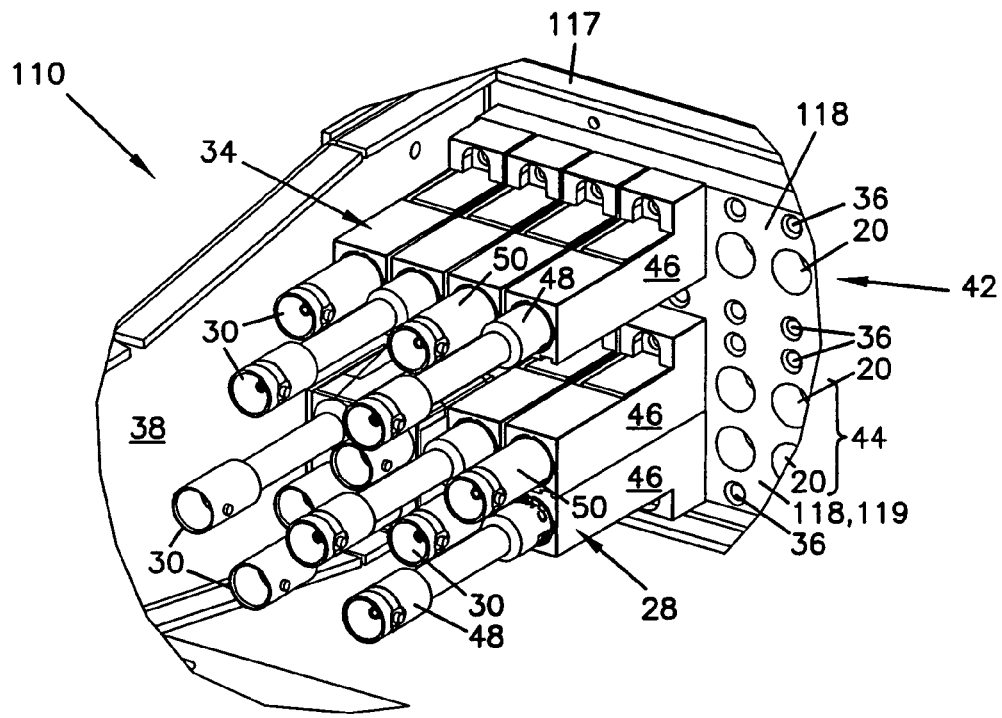
FIG. 2A is an enlarged rear perspective view of a group of jacks mounted to the patch panel of FIG. 2.
Figure 3A:
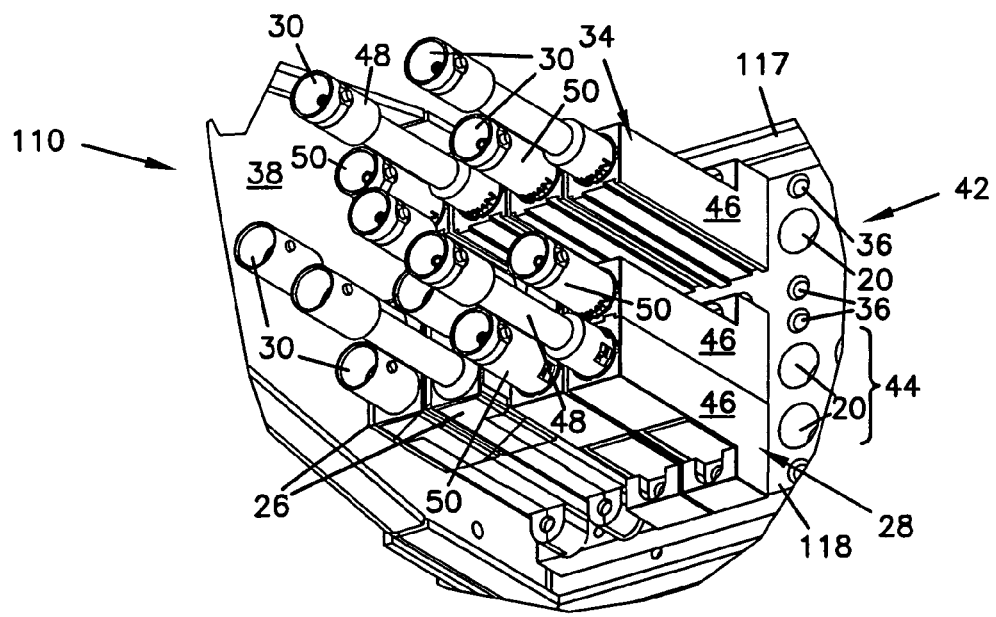
FIG. 3A is an enlarged rear perspective view of the group of jacks shown in FIG. 3.
Figure 3:
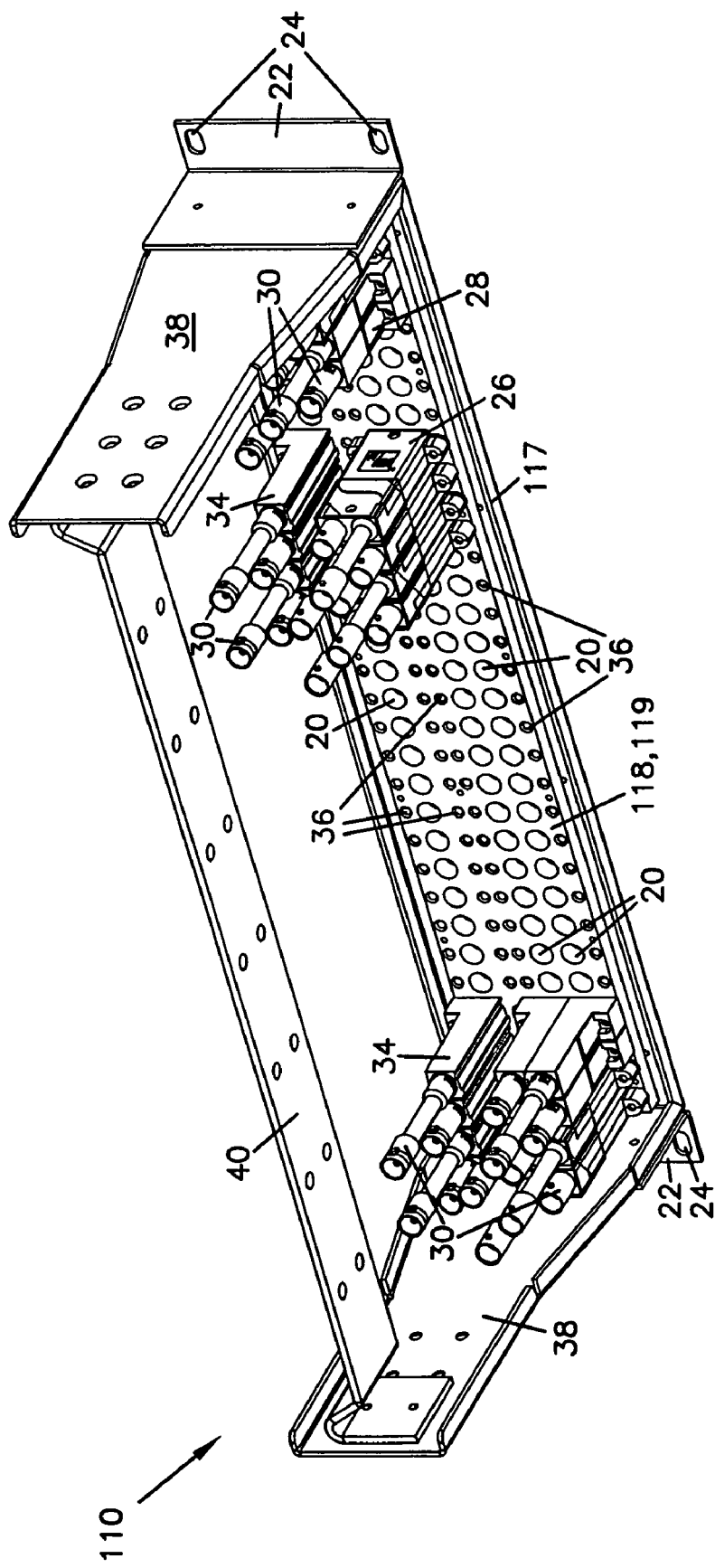
FIG. 3 is a lower rear perspective view of the patch panel of FIG. 2.

Referring now to FIGS. 2 and 3, an alternative embodiment patch panel 110 is shown. Panel 110 is similar to panel 10 in construction but includes a third row of openings 20 in a panel front 118 to which may be mounted monitor jacks 34. Panel front 118 is mounted in a frame 117. Monitor jack 34 also includes rear connector 30 and front connector 32 and these connectors 30 and 32 may be the same format as those of the adjacently mounted pairs 26 and 28. On a rear face 119 of panel front 118, a pair of fastener openings 36 are positioned adjacent each of the openings 20 in the monitor row and adjacent each pair of openings 20 for mounting pairs 26 and 28. Openings 36 each receive a fastener of a jack pair 26, 28, 128 or 228 or a monitor jack 34 to mount these devices to panel front 118. Similar openings 36 are also positioned on the rear of panel front 18 of panel 10. Panel front 118 is removably mounted to frame 117 to permit the configuration of openings 20 and 36 of panel 110 to be changed.

Extending rearward from frame 117 adjacent panel front 118 and mounting flanges 22 are a pair of sides 38. A tie-off bar 40 extends between the two sides 38 and provides a convenient location to tie-off cables extending to the rear connectors 30 of each of the jack pairs or monitor jacks. A similar structure of sides 38 and rear tie-off bar 40 may be added to panel 10.

As shown in FIGS. 1 to 3, rear connectors 30 are coaxial cable connectors for receiving standard coaxial BNC connectors. Others sizes and styles of coaxial connectors may be used as well. Front connectors 32 are coaxial cable connectors for connecting to standard size or mid size video plugs. Other sizes and styles of coaxial connectors adapted to receive video plugs may be used as well. It is also anticipated that panels 10 and 110 are not limited to use in a broadcast communications environment but may also be adapted for use in other telecommunications installations where coaxial cable connections are required.

As can be seen in FIGS. 1 to 3, rear connectors 30 may be staggered either horizontally or vertically to improve access to adjacent connectors. This staggering also permits a greater density of jack pairs 26 and 28 and monitor jacks 34 to mounted to panel 10 or 110. Alternatively, rear connectors 30 could be non-staggered where access and density of installation are not as great a concern.

Referring now to FIGS. 2, 2A, 3, and 3A, a grouping of jack pairs 26 and 28 and monitor jacks 34 mounted to rear 119 of panel front 118 of panel 110 is shown. Monitor jacks 34 are mounted to openings 20 in a monitor row 42. Jack pairs 26 and 28 are mounted in pairs of openings 20 in a row 44. Monitor 34 includes a housing 46 and either a long jack 48 or a short jack 50 mounted within an opening in housing 46.

Figure 4:
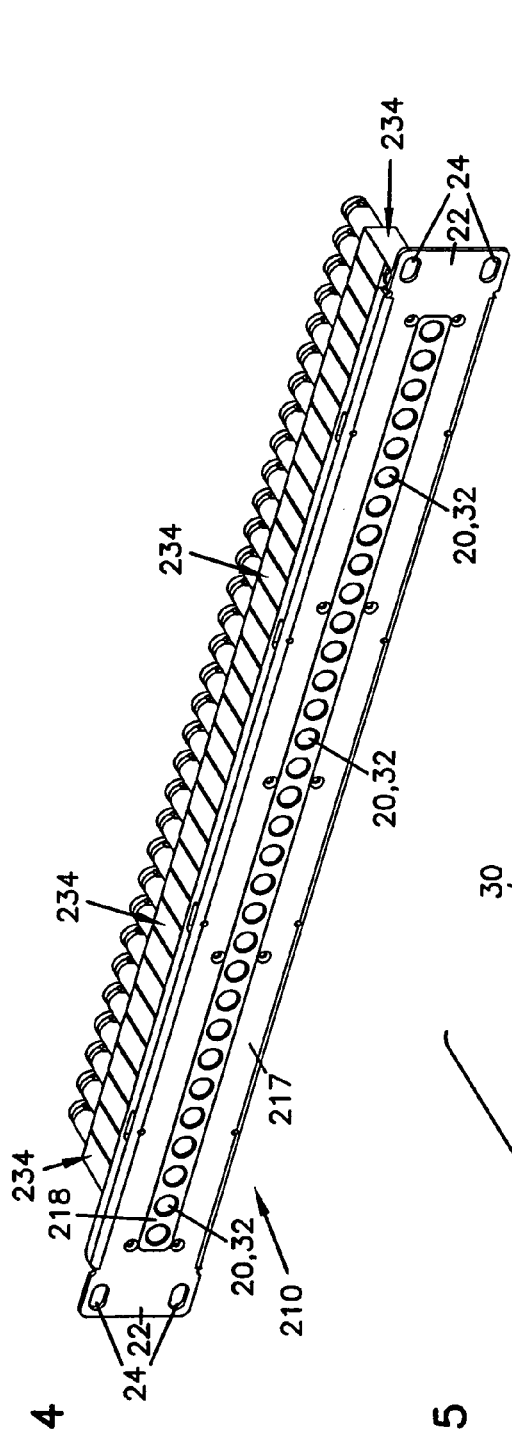
FIG. 4 is a perspective view of a third embodiment of a broadcast communications patch panel in accordance with the present invention, with a single row of openings.
Figure 5:
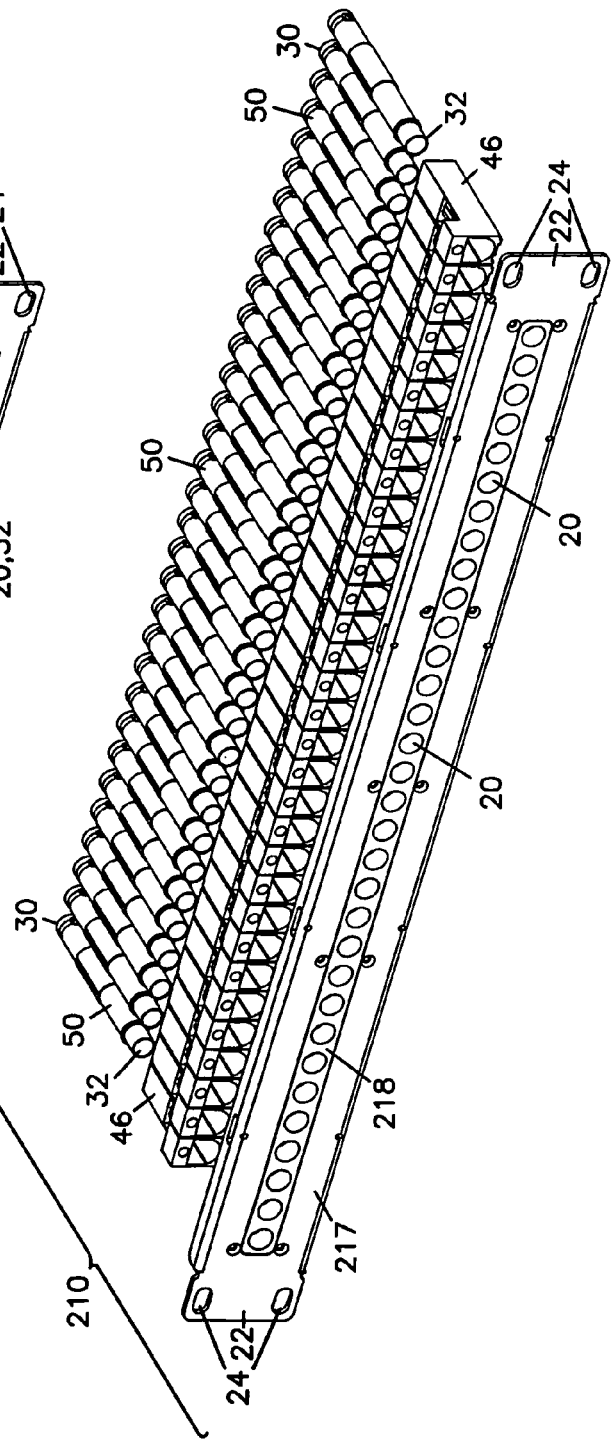
FIG. 5 is an exploded perspective view of the panel of FIG. 4.

FIGS. 4 and 5 show a third panel 210 with a single row of openings 20 with a single adjacent row of mounting openings 36. Individual jacks 234 including jack assemblies 50 mounted within a single housing 46, similar to monitor jack 34, may be mounted to panel 210. Panel 210 may provide a separate row of monitor circuits to match up with patching circuits such as shown in panel 10 of FIG. 1. Alternatively, jacks and housings may be mounted to panel 210 to provide patching or circuit connections where the number of circuits is relatively smaller and fewer jack assemblies are needed. Frame 217 includes mounting flanges 22 with openings 24 for mounting panel 210. Mounted to panel front 218 is a plurality of single jacks 234, which may be monitor jacks 34 but may also be individual patching jacks.

Figure 6:
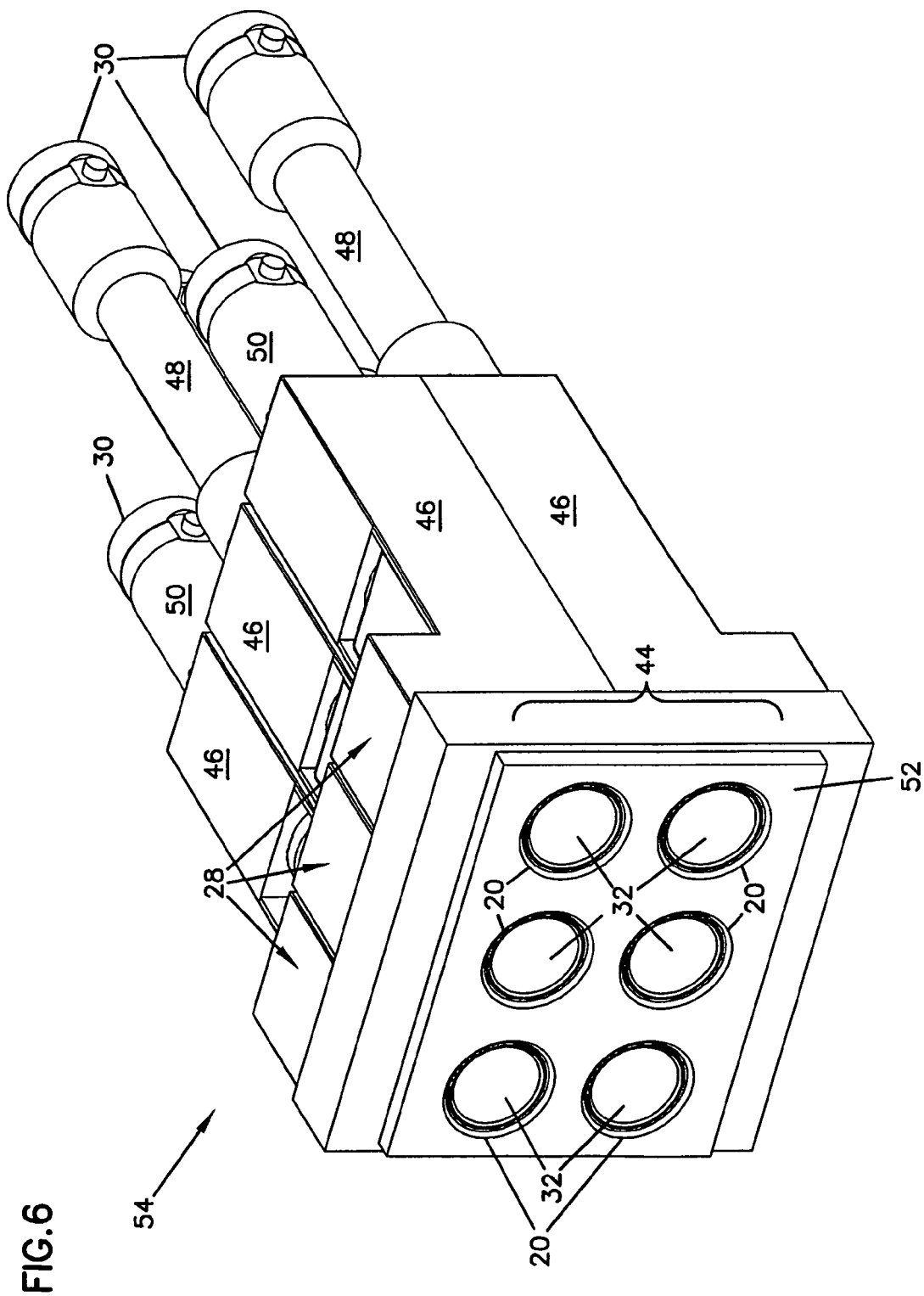
FIG. 6 is a front perspective view of a block of three jack pairs according to the present invention.

Referring now to FIG. 6, a module 54 including three jack pairs 28 mounted to a mounting block 52 is shown. Such a module might be used when a smaller number of patching jacks are required for a particular installation. Alternatively, module 54 might be used with a patch panel including a front face adapted to receive and mount a plurality of modules 54 in a density similar to that of panels 10 and 110, above.

Figure 7:
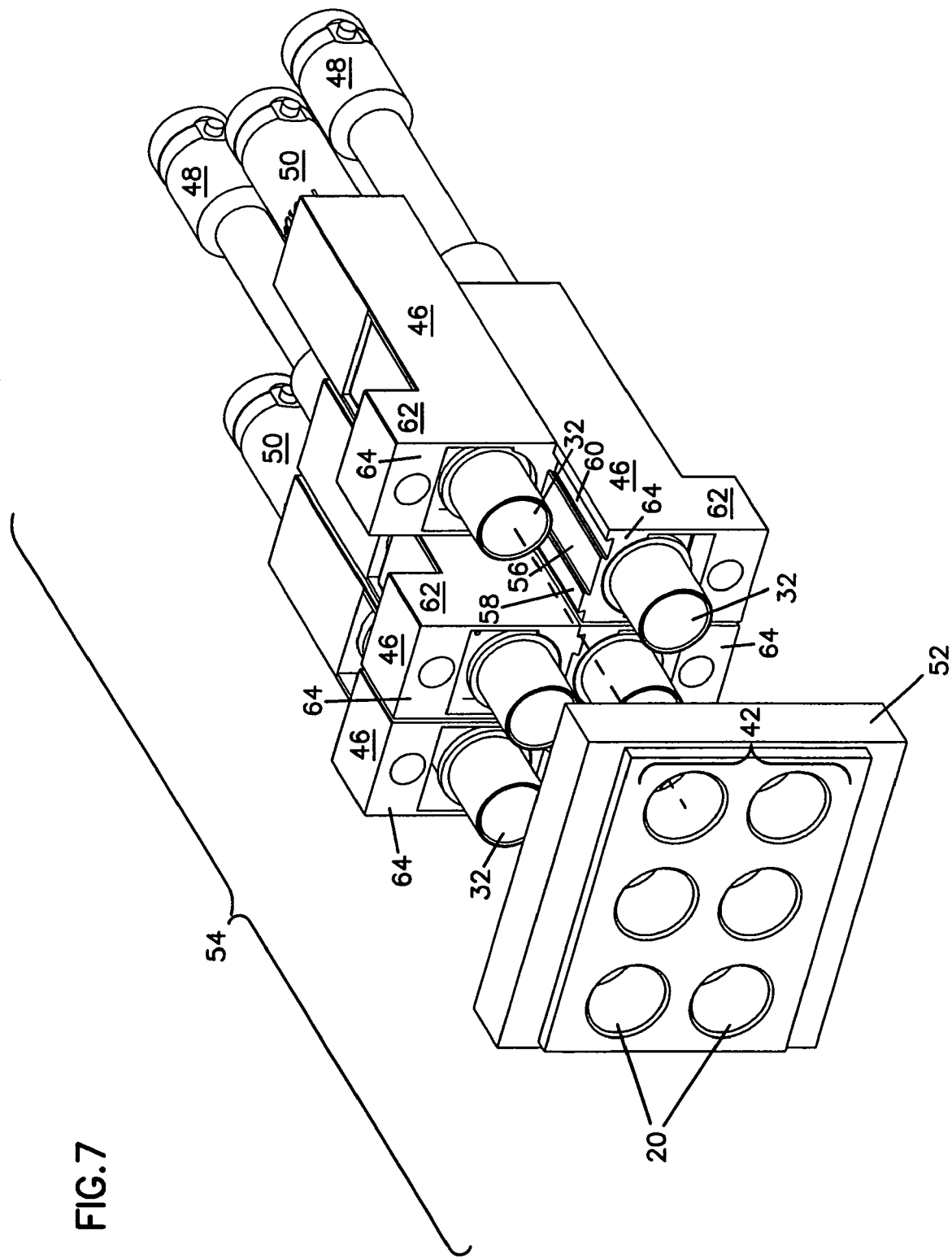
FIG. 7 is a front perspective exploded view of the block of jack pairs of FIG. 6.
Figure 8:
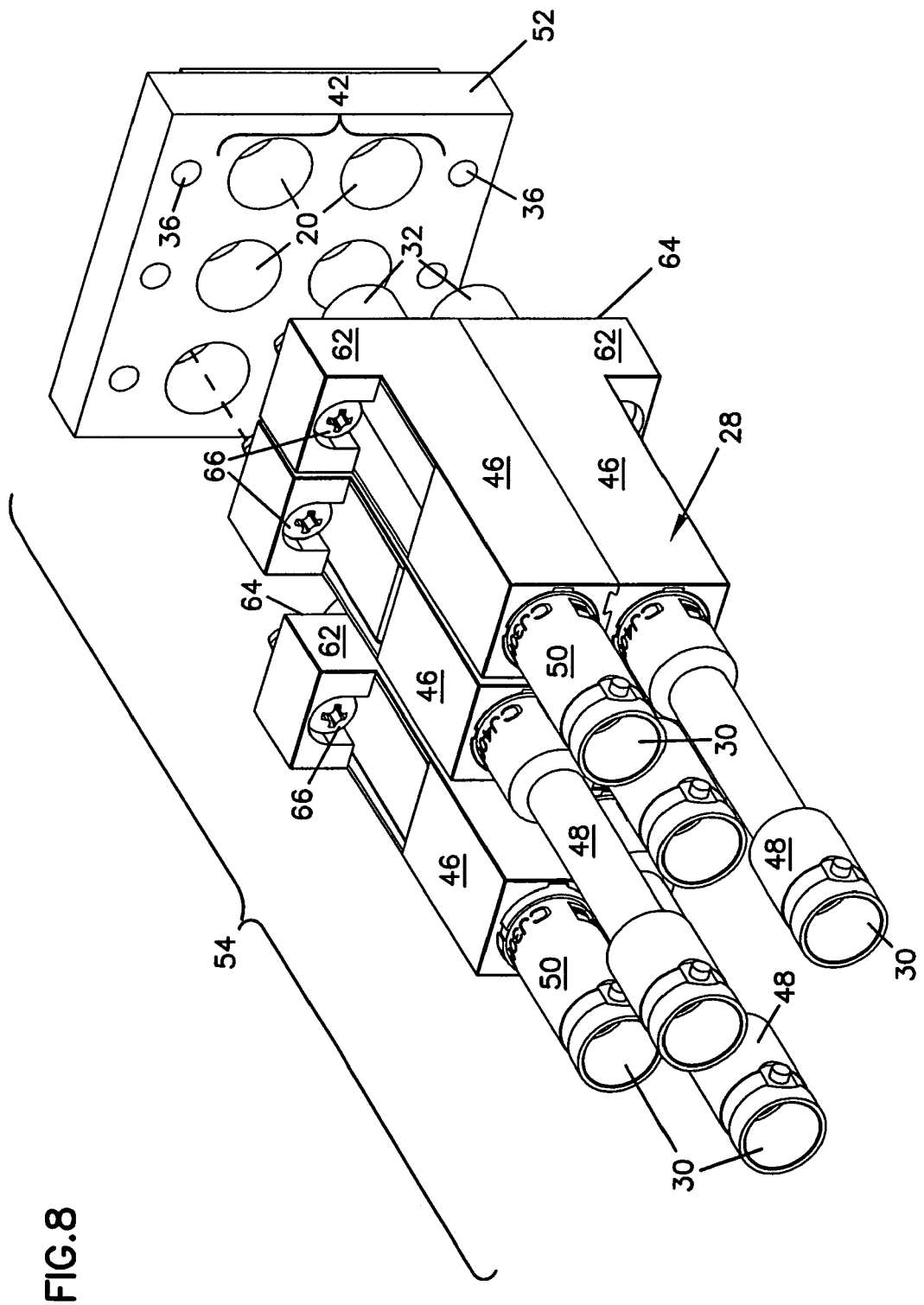
FIG. 8 is a rear perspective exploded view of the block of jack pairs of FIG. 6.
Figure 26:
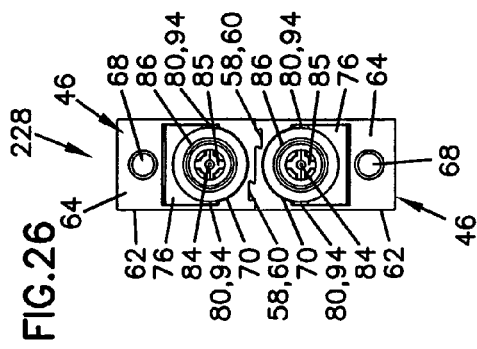
FIG. 26 is an end view of the jack pair of FIG. 22.
Figure 25:
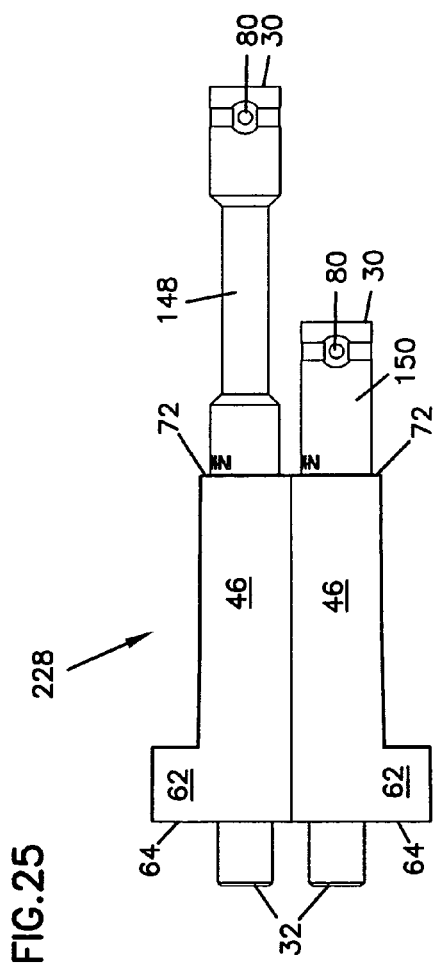
FIG. 25 is a side view of the jack pair of FIG. 22.

FIGS. 7 and 8 show module 54 of FIG. 6 is an exploded view. Also shown in FIG. 8 is the interconnection between housings 46 of each jack pair 28. Housings 46 are identical housings which mate with each other along a face 56. Face 56 includes a ridge 58 and groove 60. Housing 46 also includes a mounting flange 62 positioned adjacent a first end 64. Ridge 58 and groove 60 are positioned and configured so that the ridge and groove of a first housing 46 cooperate with the groove and ridge, respectively, of a second housing 46 when the first and second housings 46 are positioned with faces 56 and first ends 64 adjacent each other. Ridge 58 and groove 60, and the nature of their cooperation are described in further detail below.

Within an opening in mounting flange 62 of housing 46 is a captive fastener such as a screw 66. Screw 66 engages opening 36 of mounting block 52 and of panel front 18 to removably mount a housing 46, a monitor jack 34 or a jack pair 28. As shown in the FIGS., screw 66 is a captive screw and remains with housing 46 when disengaged from opening 36. It is anticipated that other captive fasteners may be used with housing 46, such as quarter-turn fasteners and similar fasteners.

FIGS. 9 to 14 illustrate jack pair 28. Referring now specifically to FIG. 10, housing 46 includes an opening 68 for receiving captive screw 66 in flange 62. Screw 66 includes threads which extend through first end 64, as shown in FIGS. 7 and 8, above. Housing 46 also defines a longitudinal opening 70 extending from first end 64 to a second end 72. Jacks 48 and 50 are received within opening 70 through first end 64 so that rear connectors 30 extend through and beyond second end 72. Adjacent front connector 32 of both jacks 48 and 50 is a grounding housing 74. Within grounding housing 74 is circuitry to permit a center conductor 84 (see FIG. 12) of jack 48 or 50 to make electrical contact with and ground to an outer conductive shell 86 (see FIG. 12). An insulator 85 electrical isolates center conductor 84 from outer shell 86 except as the circuitry may ground the two to each other. Opening 70 includes an enlarged portion 76 adjacent first end 64 for receiving housing 74. Enlarged portion 76 does not extend through opening 70 to second end 72 and ends at an intermediate bulkhead 78.

Adjacent rear connectors 30 of jacks 48 and 50 are a pair of opposed bayonets 80 for releasably securing a BNC cable connector to rear connector 30. Each jack 48 and 50 also includes a pair of opposed guide or key slots 82. Each slot 82 includes a closed end 88 and an open end 90. Key slots 82 are oriented parallel to the main axis of jacks 48 and 50 with closed end 88 toward the front connector 32 and open end 90 toward rear connector 30. Key slots 82 are located between grounding housing 74 and rear connector 30.

Figures 11, 12, 13, 14:
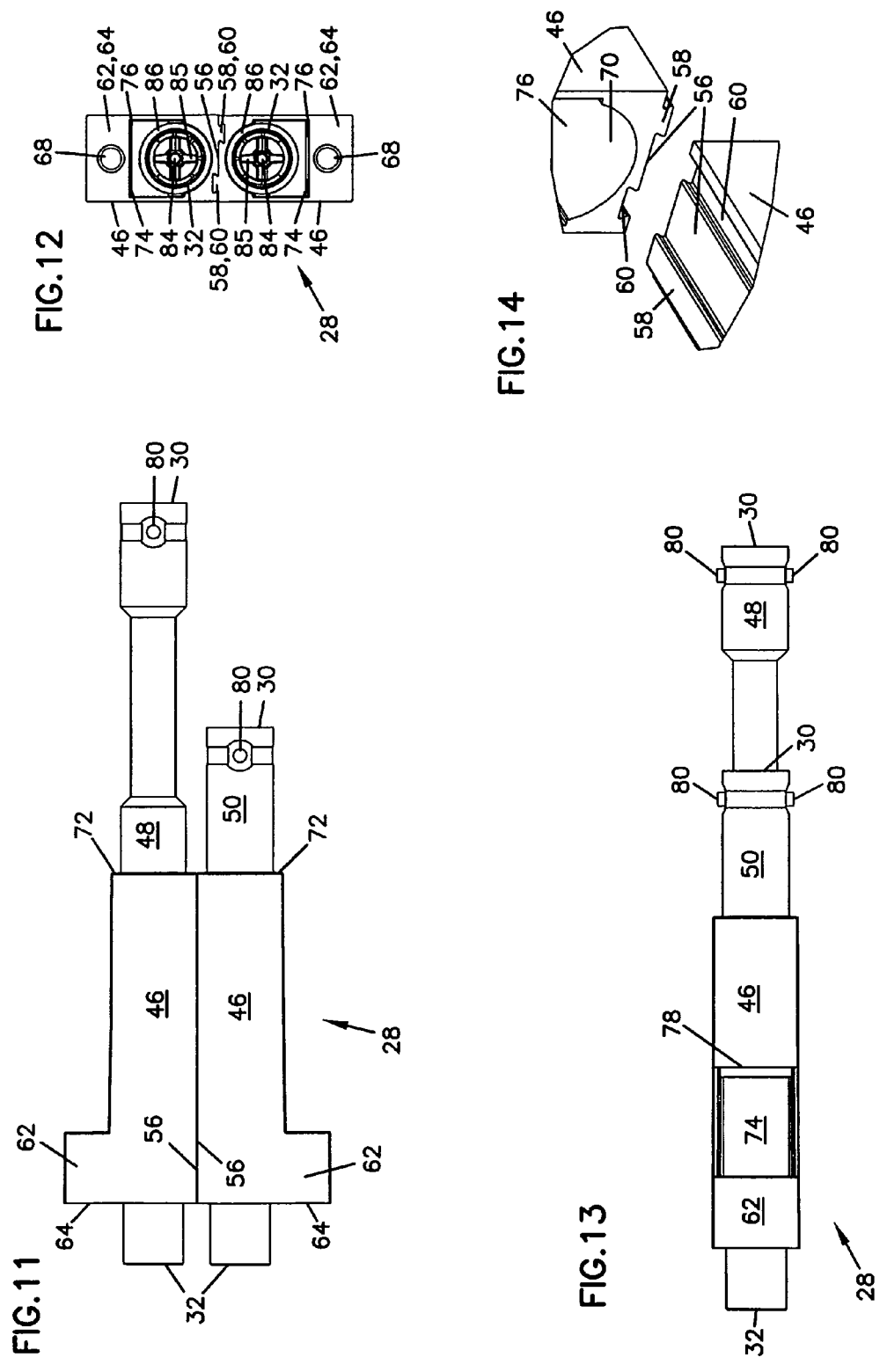

FIG. 14 shows the cooperating shapes of ridge 58 and groove 60. Ridge 58 includes a dovetail shape when viewed from first end 64 or from second end 72. Groove 60 includes a mating shape for receiving the dovetail shape of ridge 58. Further details of these shapes are described below with regard to FIGS. 33 and 34.

Referring now to FIGS. 15 to 18, one half of jack pair 28 is shown, including shorter jack 50. As enlarged portion 76 of opening 70 of housing 46 extends beyond mounting flange 62 toward bulkhead 78, an open top 96 is formed, through which grounding housing 74 is visible. This open top allows maximum room for housing 74 without impeding access to screw 66. Between bulkhead 78 and second end 72 of housing 46, a pair of opposing guides or keys 92 are formed in the top and bottom of opening 70 to engage key slots 82 of jack 50 (and also of jack 48). Keys 92 and key slots 82 cooperate to orient jack 50 (and also jack 48) within housing 46. Bayonets 80 and key slots 82 are offset from each other about jack 50 and with keys 92 engaged in key slots 82, bayonets 80 are oriented horizontally.

Also within opening 70 are opposing bayonet slots 94. Opening 70 is smaller in dimension than the width of bayonets 80. Bayonet slots 94 allow rear connector 30 to be inserted through first end 64 and extend through opening 70 beyond second end 72. Bayonet slots 94 also orient jack 50 so that key slots 82 are correctly oriented to engage keys 92 through open ends 90. When jack 50 is fully inserted and correctly positioned within housing 46, keys 92 adjacent bulkhead 78 engage closed ends 88 of key slots 82, and prevent further insertion of jack 50.

As shown in FIGS. 15 to 18, jacks 48 and 50 each include grounding housing 74. An alternative embodiment jack pair 128 includes jacks 148 and 150, which do not include grounding housing 74, is shown in FIGS. 19 to 21. In other respects, jack pair 128 is similar to jack pair 28. For jacks 48, 50, 148 and 150, key 92 engaging closed end 88 of key slot 82 defines the limit of insertion within housings 46. While jacks 148 and 150 do not require enlarged portion 76 of opening 70, housing 46 is configured to be compatible with multiple types and styles of jacks 48, 50, 148 and 150, as well as other types and styles which may or may not include a grounding housing or another enlarged portion adjacent front connector 32.

FIGS. 22 to 27 illustrate a further alternative embodiment jack pair 228, with front connectors 32 configured to receive a mid-size video coaxial plug. In other respects, jack pair 228 is similar to jack pair 128 of FIGS. 19 to 21 and to jack pair 28 of FIGS. 9 to 14.

Figure 28:
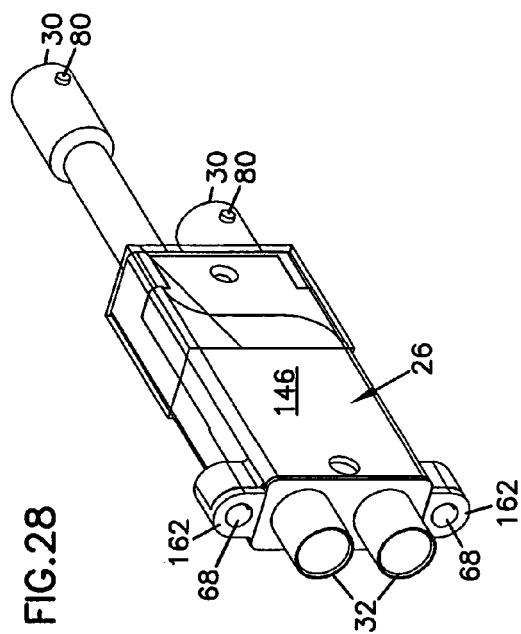
FIG. 28 is a switching jack as shown mounted to the patch panel of FIGS. 1, 2, and 3.
Figure 27:
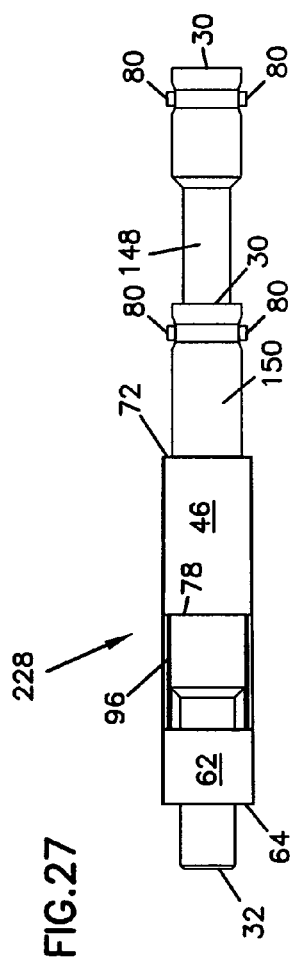
FIG. 27 is a bottom view of the jack pair of FIG. 22.

FIG. 28 shows prior art switching jack pair 26, including front connectors 32 configured to receive standard size video plugs and rear connectors 30 configured to receive BNC plugs. A pair of mounting flanges 162 extend from opposing sides of a housing 146. Flanges 162 including openings 68 for receiving a captive fastener such as screw 66, shown in FIGS. 16 to 19, above. Openings 68 are positioned so that fasteners within openings 68 may engage openings 36 of panel front 18 or mounting block 52. As shown in FIGS. 1 to 5, above, jack pairs 26, 28, 128 and 128, may all be mounted to panel front 18 as part of patch panel 10 or 110, or as shown in FIGS. 6 to 8, to mounting block 52 as part of module 54.

FIGS. 29 to 34 show housing 46 in further detail. A ledge 100 extends within opening 70 from bulkhead 78 to first end 64 and defines the transition from opening 70 to enlarged portion 76. Ledge 100 also cooperates with bayonet slot 94 to permit bayonets 80 of rear connector 30 to extend through opening 70 in an appropriate orientation for key slot 82 to engage key 92. Keys 92 extend from second end 72 to bulkhead 78 and define an end wall 98 at bulkhead 78. End wall 98 engages closed end 88 of key slot 82 to define a stop. This stop sets the maximum extent that a jack assembly may be inserted within housing 46.

FIGS. 33 and 34 show groove 60 and ridge 58, respectively, in further detail. Ridge 58 includes an outer face 114 defining a maximum width 102 at an offset distance 112 from face 56 of housing 46. Ridge 58 narrows as it approaches face 56 to a minimum width of 104 adjacent face 56. Groove 60 includes an inner face 118 defining a maximum width 106 at inset distance 116 from face 56. Groove 60 narrows as it approaches face 56 to a minimum width 108 adjacent face 56. Ridge 58 and groove 60 are sized so that width 102 fits within width 106 with face 114 adjacent face 118, and width 104 fits within width 108. Distances 112 and 116 are generally equal so that when faces 56 of a pair of cooperating housings 46 are adjacent, face 114 is adjacent face 118. Other similar cooperating shapes may be used for ridge 58 and groove 60 provided they join two identical housing to each other as shown for a jack pair 28, 128 or 228. This joining is accomplished by sliding the housing together longitudinally while preventing the housings from being pulled apart transversely.

The cooperation of the dovetail shape of the cooperating ridge 58 and groove 60 provide several advantages. First, these shapes tie together two housings 46 to form a housing for two jacks in a jack pair, such as jacks 48, 50, 148 and 150. The same housing 46 may be used to hold a single jack, such as shown in monitor jack 34. This reduces the number of different housings that must be produced and maintained in inventory. Secondly, the dovetail configuration locks two housings together while allowing sliding movement in a longitudinal direction. No additional fasteners for connecting the two housings 46 are required. Screws 66 of each housing 46 may then be used to mount housings 46 in a module 54 or a panel 10 or 110.

Housings 46 provide an electrically insulative sleeve about a tubular jack such as jacks 48, 50, 148 and 150 and also provide mechanical support to the jack to resist deflection due to strain from cables attached to rear connectors 30, when the cable exerts a force an angle to the jacks. Panel 110 provides a tie off bar 40 to help reduce the strain that a cable might exert on a jack. Panel 10 does not include such a feature and thus cables attached to a rear connector 30 and hanging directly downward from rear connector 30 may exert an angled force on the jack. Cables may also be pulled toward the side or top. Housing 46 is attached to panel front 18 by fastener 66 with first end 64 against rear face 19, as shown in FIGS. 1 to 5. For either jack pair 28 or for monitor jack 34, this arrangement allows housing 46 to provide additional support to resist such transverse forces. The resistance of transverse forces and the insulative sleeve of housing 46 reduce the likelihood that jacks 48 and 50 or 148 and 150 of a jack pair can be deflected enough to electrically contact each other and cause a short circuit between the two outer insulative shells 86. Housing 46 also provides support against the jacks being deflected enough to permanently deform or break the jacks.

Figure 37:
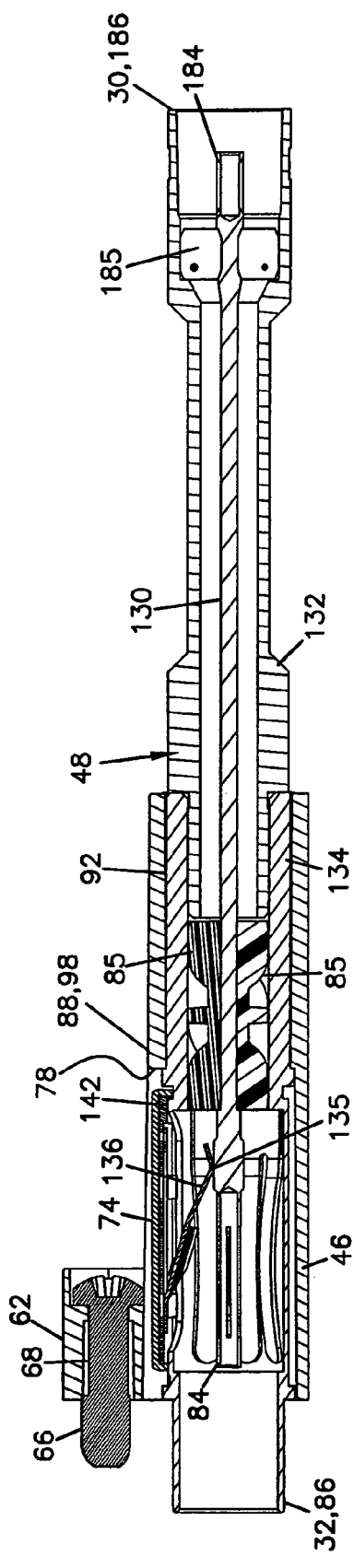
FIG. 37 is a side cross-sectional view of the jack assembly of FIG. 35 positioned within the housing of FIG. 29.

Referring now to FIGS. 35 to 37, jack assembly 48 is shown in greater detail. A first outer housing 134 includes conductive outer shell 86 of front connector 32 as well as slot 82. Mounted within first housing 134 is insulator 85 within which center conductor 84 is mounted. Insulator 85 supports and isolates center conductor 84 from shell 86. As shown, insulator 85 is made from two identical halves or, alternatively, may be made as a single piece insulator. A second outer housing 132 includes a conductive outer shell 186 of rear connector 30. Second outer housing 132 includes a knurled end 133 to aid insertion and retention within first outer housing 134. Mounted within second housing 132 is an insulator 185 within which a center conductor 184 is mounted. Insulator 185 supports and isolates center conductor 184 from shell 186. As shown, insulator 185 is made from two identical halves or, alternatively, may be made as a single piece insulator. A conductive shaft 130 links center conductors 84 and 184.

Figure 40:
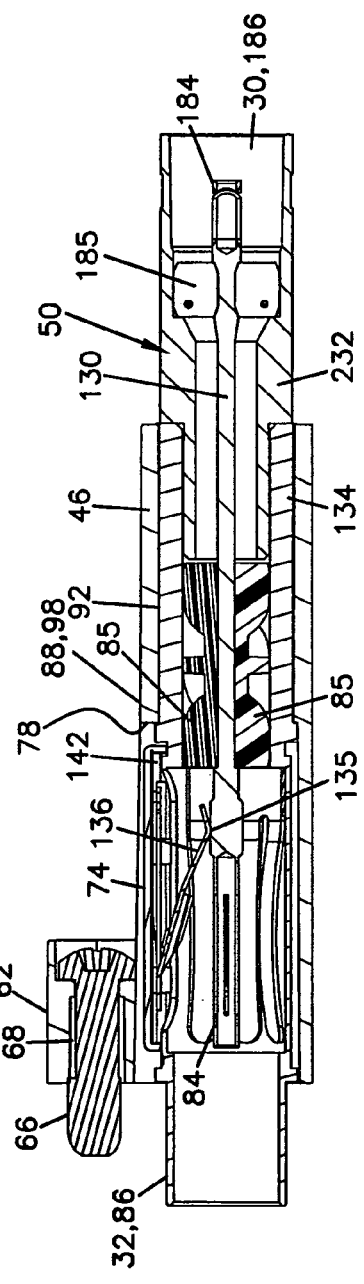
FIG. 40 is a side cross-sectional view of the jack assembly of FIG. 38 positioned within the housing of FIG. 29.
Figure 38:
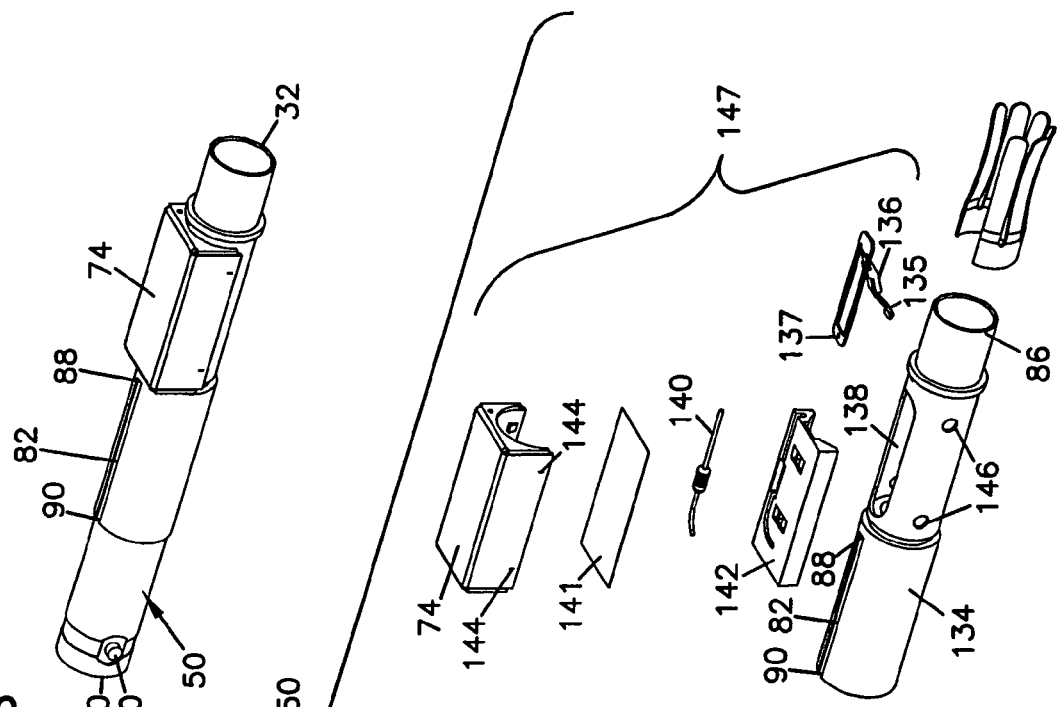
FIG. 38 is a perspective view of a second embodiment of a jack assembly in accordance with the present invention.
Figure 39:
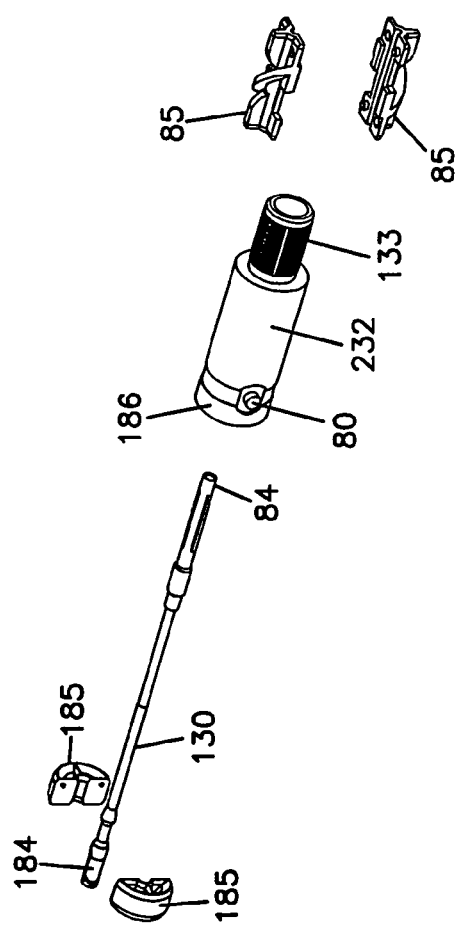
FIG. 39 is an exploded perspective view of the jack assembly of FIG. 38.

Referring now to FIGS. 38 to 40, jack assembly 50 is shown in greater detail. A first outer housing 134 includes conductive outer shell 86 of front connector 32 as well as slot 82. Mounted within first housing 134 is insulator 85 within which center conductor 84 is mounted. Insulator 85 supports and isolates center conductor 84 from shell 86. As shown, insulator 85 includes two identical halves. Alternatively, insulator 85 may be a single piece insulator. A second outer housing 232 includes a conductive outer shell 186 of rear connector 30. Mounted within second housing 132 is an insulator 185 within which a center conductor 184 is mounted. Insulator 185 supports and isolates center conductor 184 from shell 186. As shown, insulator 185 includes two identical halves. Alternatively, insulator 85 may be a single piece insulator. A conductive shaft 130 links center conductors 84 and 184.

In both jack assemblies 48 and 50, grounding housing 74 combines with a flexible conductive contact member 136, a resistor 140, a pad 141 and a block 142 to define a selective termination device 147, as shown in FIGS. 36 and 39. Termination device 147 is mounted to first housing 134 with a first end 135 of member 136 extending through an opening 138 to contact center conductor 84. A second end 137 of member 136 is mounted to block 142 and is in contact with one end of resistor 140. The other end of resistor 140 is in electrical contact with first outer housing 134 and conductive outer shell 86. When a mating plug is inserted within front connector 32, first end 135 of member 136 is displaced and is no longer in contact with center conductor 84, breaking the termination between center conductor 84 and shell 86. Termination device 147 is attached to first outer housing 132 by depressions 144 of grounding housing 74 engaging depressions 146 of housing 132.

Figures 41, 42, 43:
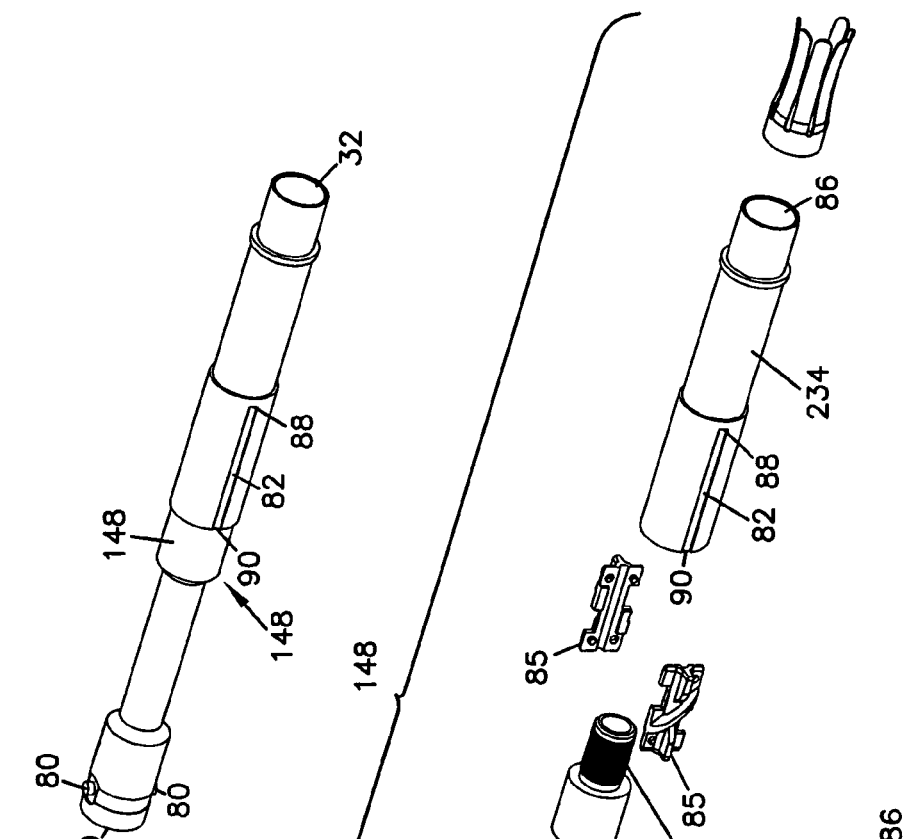
FIG. 41 is a perspective view of a third embodiment of a jack assembly in accordance with the present invention.
FIG. 42 is an exploded perspective view of the jack assembly of FIG. 41.
FIG. 43 is a side cross-sectional view of the jack assembly of FIG. 41.

FIGS. 41 to 43 show jack assembly 148 is greater detail. Jack assembly 148 does not include a selective termination device. Thus, a first outer housing 234 differs from first outer housing 134 in that there is no opening providing access to center conductor 84. Other aspects of jack assembly 148 are similar to those of jack assembly 48 shown in FIGS. 35 to 37.

FIGS. 44 to 46 show jack assembly 150 is greater detail. Jack assembly 150 does not include a selective termination device. Thus, a first outer housing 234 differs from first outer housing 134 in that there is no opening providing access to center conductor 84. Other aspects of jack assembly 150 are similar to those of jack assembly 50 shown in FIGS. 38 to 40.

Figure 47:
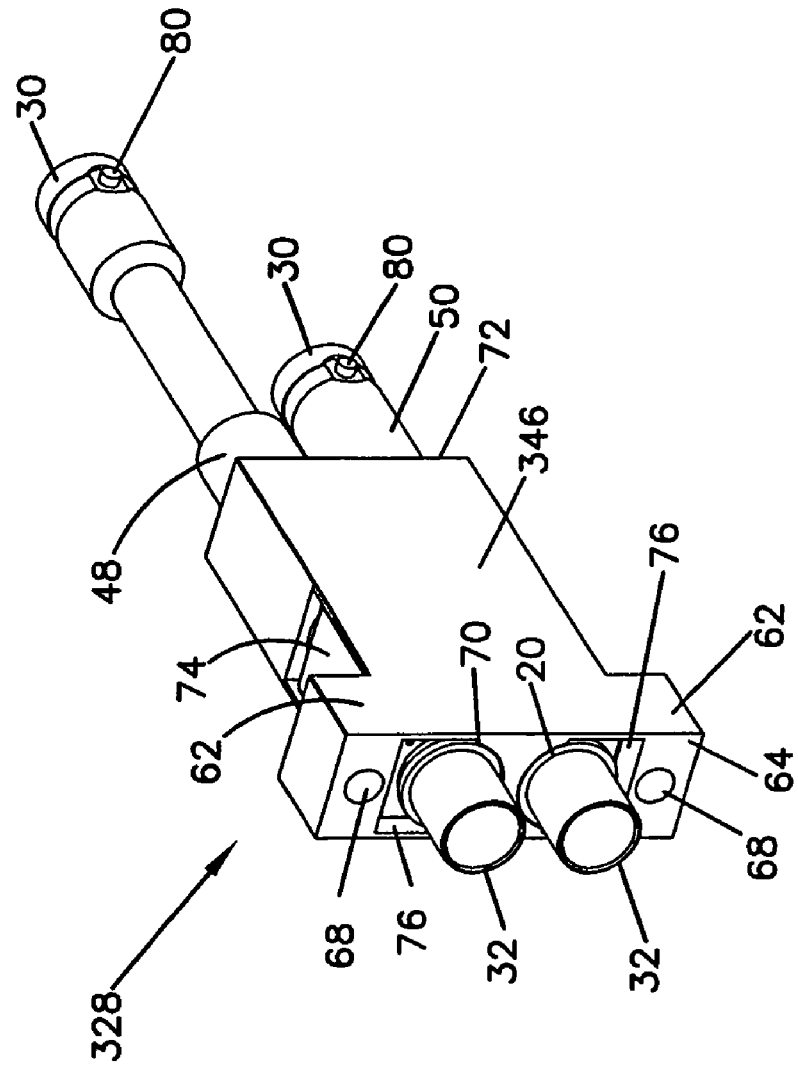
FIG. 47 is a perspective view of an alternative embodiment of a jack pair according to the present invention with a unitary housing.
Figure 53:
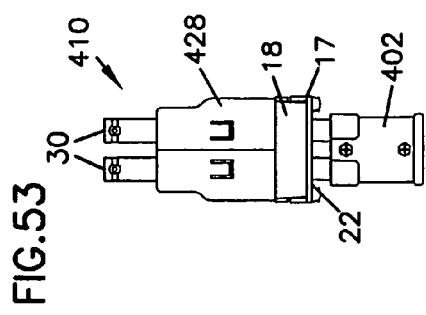
FIG. 53 is a side view of the broadcast communications patch panel of FIG. 48.
Figure 50:
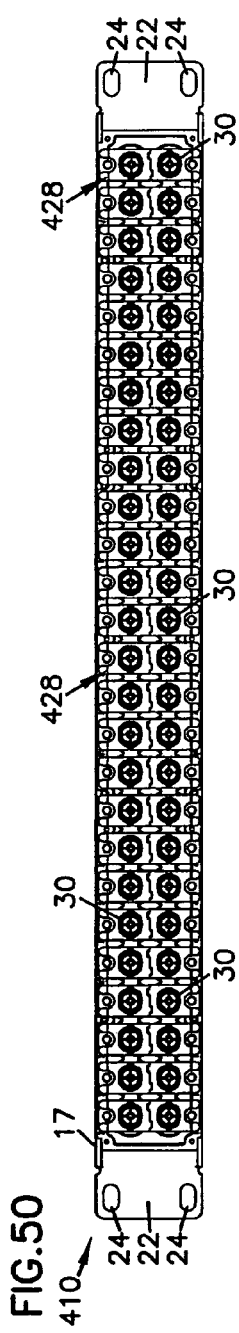
FIG. 50 is a rear view of the broadcast communications patch panel of FIG. 48.
Figure 51:
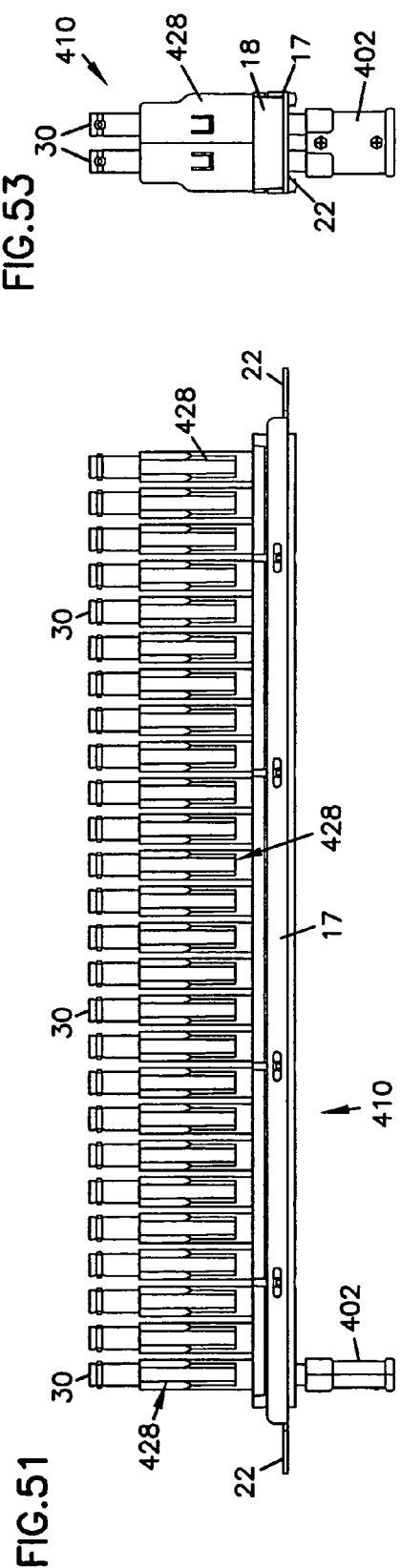
FIG. 51 is a top view of the broadcast communications patch panel of FIG. 48.
Figure 52:
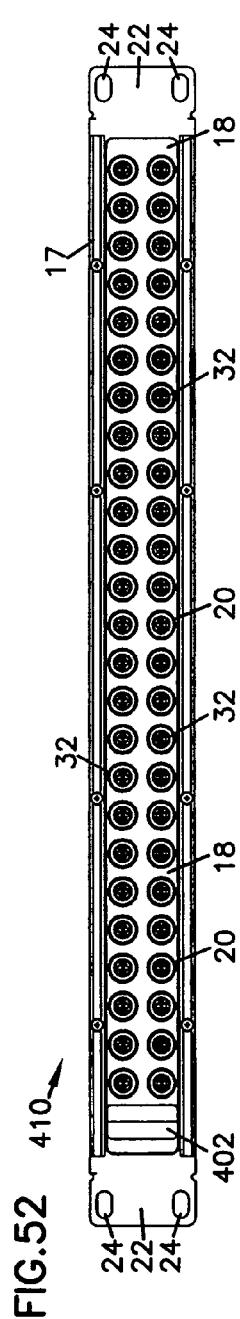
FIG. 52 is a front view of the broadcast communications patch panel of FIG. 48.
Figure 61:
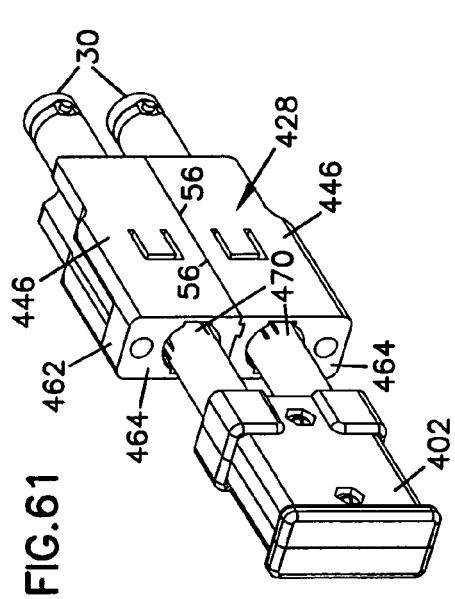
FIG. 61 is a rear perspective view of the jack pair of FIG. 60.
Figure 60:
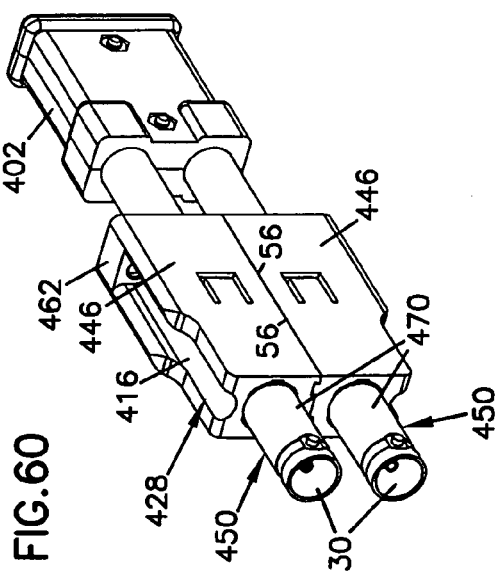
FIG. 60 is a rear perspective view of the jack pair from the broadcast communications patch panel of FIG. 48, with the loop-thru plug inserted in the front of the jacks.
Figure 63:
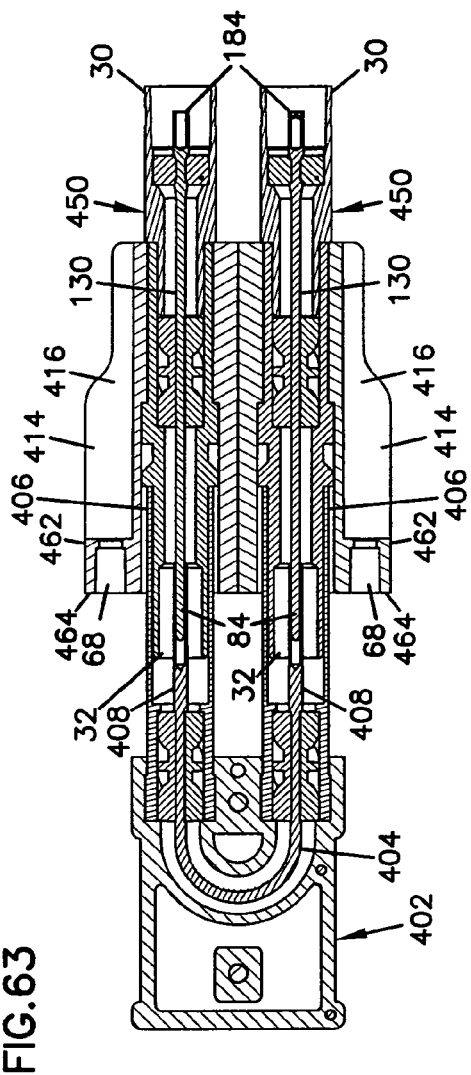
FIG. 63 is a side cross-sectional view of the jack pair of FIG. 60.
Figure 62:
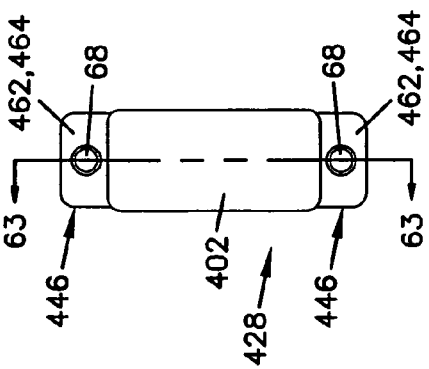
FIG. 62 is a front view of the jack pair of FIG. 60.

FIG. 47 shows an alternative jack pair 328 with jack 48 and jack 50 inserted within a pair of openings 70 in a unitary housing 346. Housing 346 is similar to and includes the elements described above with regard to housing 46 with the exception of first face 56, ridge 58 and groove 60. Housing 346 is a single piece housing including both openings 70. Housing 346 provides support and strength to jacks 48, 50, 148 and 150 in a manner similar to housings 46, described above. Housing 346 is also constructed of a non-conductive material to prevent jacks 48 and 50, or 148 and 159, from deflected into contact with each other and creating a short circuit.

FIGS. 48 to 53 illustrate a fourth embodiment of a broadcast communications patch panel 410 according to the present invention. Panel 410 is similarly configured to panel 10, above, and includes a frame 17 with a panel front 18 including a plurality of openings 20 for access to a plurality of jack pairs 428 mounted to a rear of panel front 18. Flanges 22 include opening 24 for mounting panel 410 to provide patching between different communication cables. Jack pairs 428 include rear connectors 30 and front connectors 32. Inserted within one of the jack pairs 428 through panel front 18 is a loop-thru plug 402, which will be described in further detail below, with regard to FIGS. 60 to 63.

FIGS. 54 to 59 illustrate a fifth embodiment of a broadcast communication patch panel 510 according to the present invention. Panel 510 is similarly configured to panel 10, above, and includes a frame 517 with an integral panel front 518 including a plurality of openings 20 for access to a plurality of jack pairs 528 mounted to panel 510. Frame 517 includes an upper flange 504 and a lower flange 506 to which jack pairs 528 are mounted. Flanges 504 and 506 provide a mounting location for housings of jack pairs 528 which is rearwardly offset from panel front 518. Front connectors 32 are accessible through openings 20 and a loop-thru plug 502 is inserted within one of the jack pairs 528 through panel front 518.

FIGS. 60 to 63 illustrate loop-thru plug 402 inserted within jack pair 428 removed from panel 410. Jack pair 428 includes a pair of housings 446 which are preferably identical and are joined to each along faces 56. Each housing 446 includes a mounting flange 462 with an opening 68 to receive a fastener for mounting to panel front 418. When mounted as shown in FIGS. 48 to 53, a first end 464 of housing 446 engages a rear surface of panel front 418. Each housing 446 of jack pair 428 has a coaxial jack 450 mounted within a longitudinal opening 470, and each coaxial jack 450 includes front end 32 and rear end 30. Conductive shaft 130 extends between center conductor 84 at front end 32 and center conductor 184 at rear end 30.

Loop-thru plug 402 includes a pair of sockets 406, with each socket 406 is configured to engage one of the front ends 30 of jack pair 428. Plug 402 also includes a center conductor 404 extending between a pair of socket ends 408, with one socket end 408 mounted within each socket 406. Socket ends 408 are configured to engage and electrically connect with center conductors 84 in front ends 32. Conductor shaft 404 electrically connects each socket end 408 so that a signal from one of the coaxial jacks 450 in jack pair 428 is looped back into the other coaxial jack 450.

Figure 65:
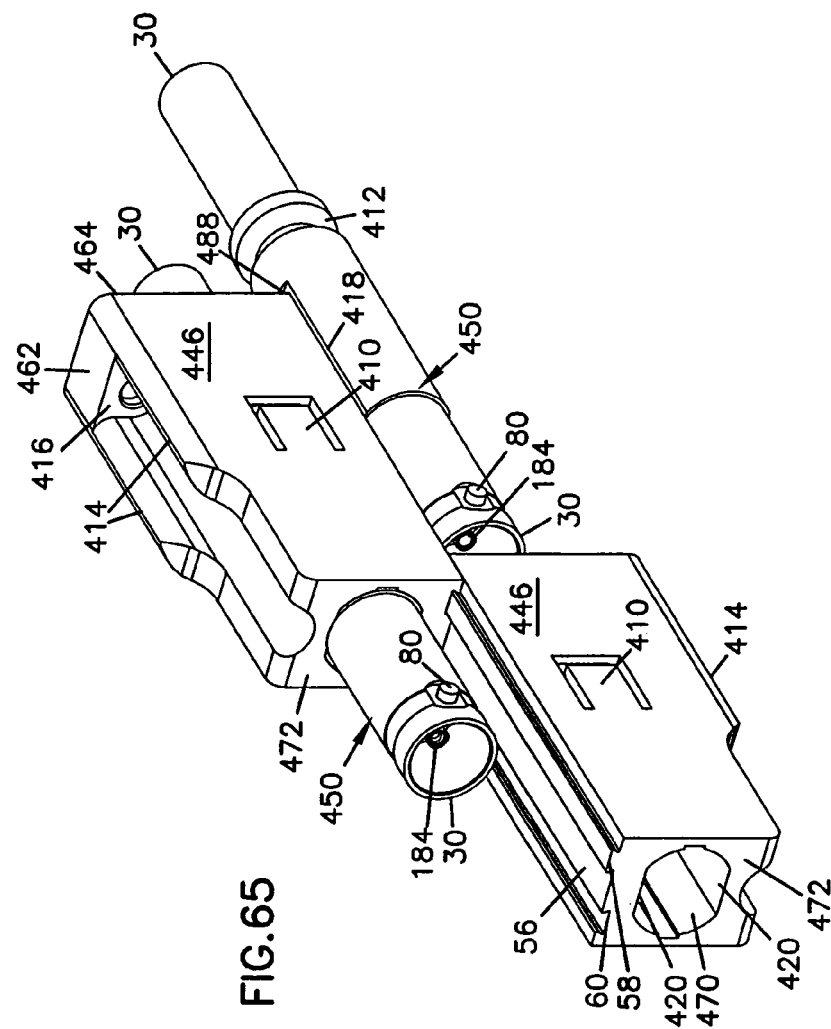
FIG. 65 is an exploded rear perspective view of the jack pair of FIG. 64.
Figure 64:
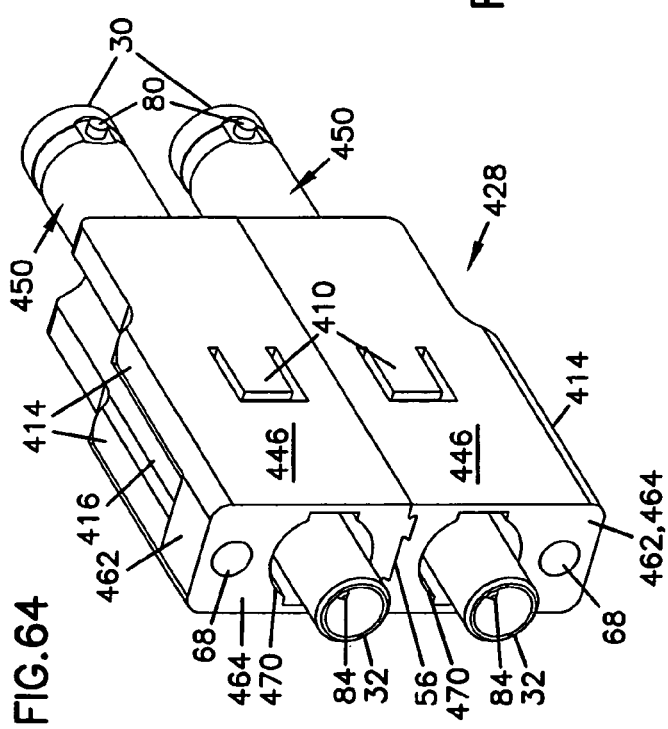
FIG. 64 is a front perspective view of the jack pair of FIG. 60, with the loop-thru plug removed.
Figure 73:
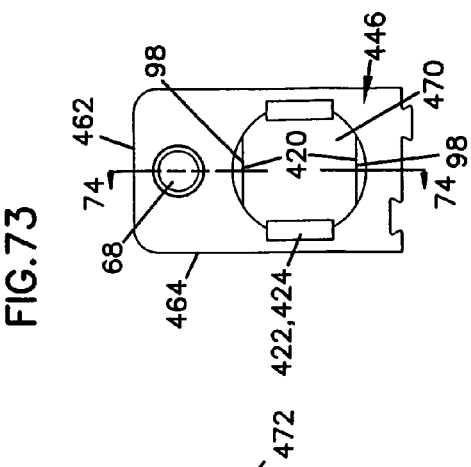
FIG. 73 is a first end view of the modular housing of FIG. 70.
Figure 75:
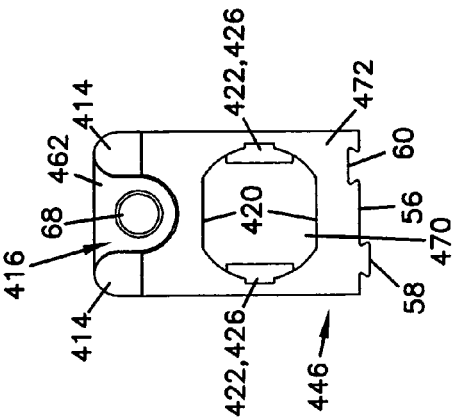
FIG. 75 is a second end view of the modular housing of FIG. 70.
Figure 72:
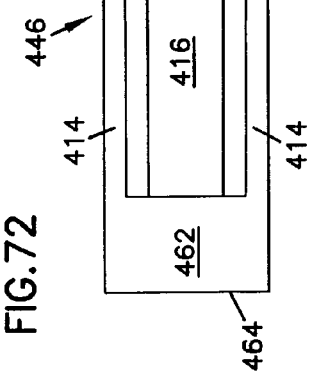
FIG. 72 is a top view of the modular housing of FIG. 70.
Figure 74:
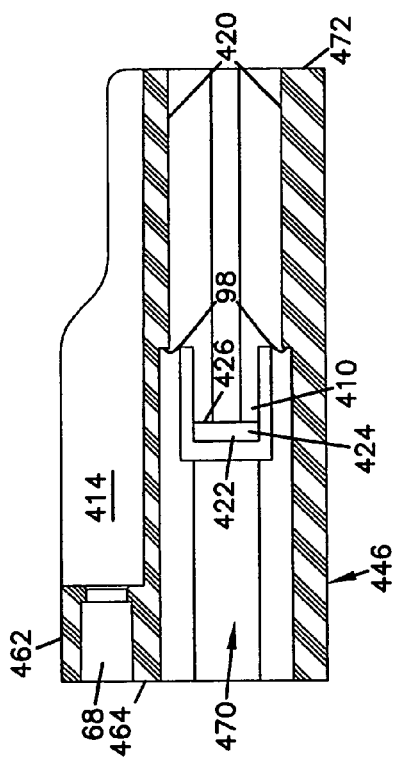
FIG. 74 is a side cross-sectional view of the modular housing of FIG. 70.
Figure 70:
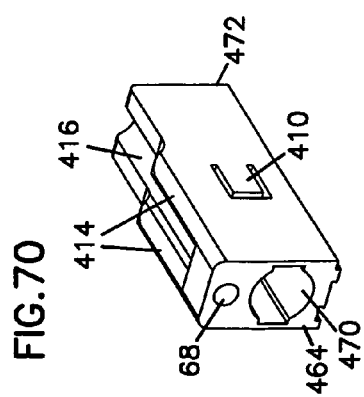
FIG. 70 is a first perspective view of a modular housing of the jack of FIG. 66.
Figure 71:
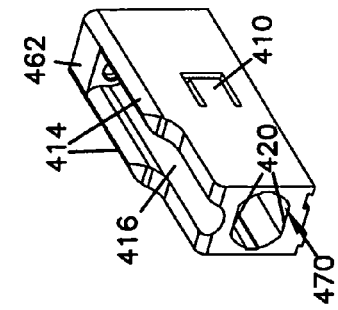
FIG. 71 is a second perspective view of the modular housing of FIG. 70.
Figure 93:
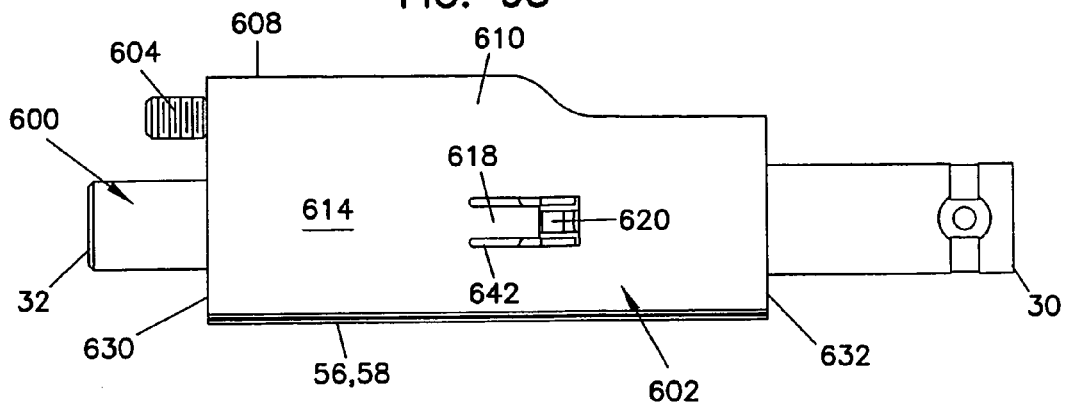
FIG. 93 is the side view of FIG. 90 with the label removed.
Figure 94:
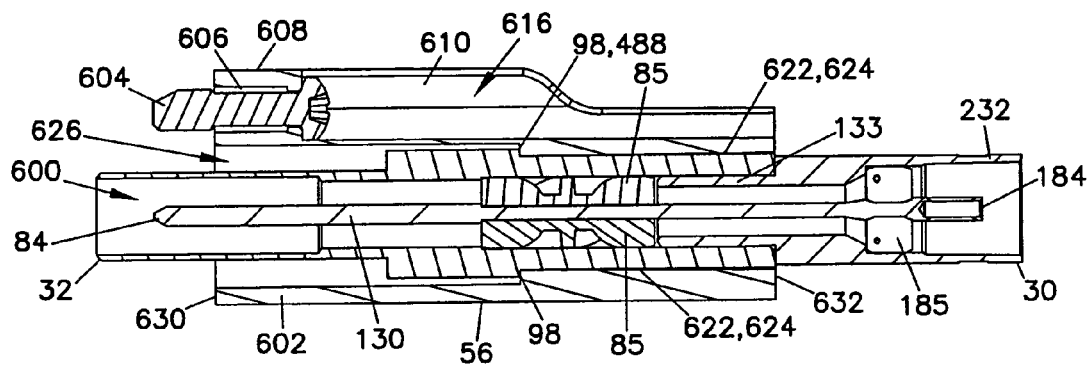
FIG. 94 is a side cross-sectional view of the jack assembly and housing of FIG. 89, taken on along a centerline of the jack assembly.

Referring now to FIGS. 64 and 65, in face 56 of each housing 446 are ridge 58 and groove 60 which engage each other as described above to releasably hold two housings 446 together. In a side wall of each housing 446 is a catch 410 configured to engage a groove 412 formed in each coaxial jack 450. As with prior embodiment of housing 46, coaxial jacks 450 are inserted within opening 470 through first end 464 and positioned so that rear end 30 extends beyond a second opposite end 472. Also similar to housing 46 above, first end 464 of housing 446 may engage panel front 518 in such a manner as to trap coaxial jack within opening 470 so that pulling on a plug engaging front end 30 will not pull coaxial jack 450 through first end 464. However, it may be desirable to provide a different or additional mechanism to hold coaxial jack 450 within opening 470 at a particular position, so that engaging or releasing either front end 32 or rear end 30 will shift jack 450 within opening 470.

Panel 410 in FIGS. 48 to 53 provides a rear surface of panel front 18 that may engage coaxial jack 450 adjacent front connector 30 to prevent coaxial jack 450 from be pulled through opening 20 when a mating plug or loop-thru plug 402 is removed from front end 30. However, panel front 18 may be differently configured and may not engage coaxial jack 450 adjacent front connector 30. For example, as shown in FIGS. 54 to 58, panel 510 does not engage jack 450 adjacent front connector 30. Catch 410 in housing 446 provides a positive positioning mechanism to hold coaxial jack 450 when catch 410 engages groove 412. Catch 410 may also be configured to be releasable from groove 412 so that coaxial jack 450 can be removed from opening 470, such as for repair or replacement. As shown, catch 410 is formed integrally with housing 446 and may be flexed outward to permit inward extending end 422 to be removed from groove 412.

Also part of housing 446 are a pair of side walls or reinforcing flanges 414 extending from flange 462 toward second end 472. Between side walls 414 is defined a channel 416 permitting access to a fastener that may be positioned within opening 68 to mount housing 446. Side walls 414 provide support and reinforcement to flanges 62 to improve the overall structural rigidity of housing 446 and of jack pair 428. Formed in at least one side of coaxial jack 450 is a flat 418. Preferably, flats 418 are formed on opposing sides of coaxial jack 450. Flats 418 are configured to engage corresponding opposing reduced size portions or flats 420 of opening 470 to prevent rotation of jack 450 within opening 470. Engagement of flats 418 and flats 420 also provide a controlled orientation of jacks 450 within openings 470, for example to ensure that bayonets 80 of ends 30 are commonly aligned across panel 410.

Referring now to FIGS. 68, 74, 76 and 77, catch 410 of housing 446 includes an inward projecting end 422 with a ramped surface 424 to aid entry of jack 450 into position within opening 470 and an opposing face 426 to engage a similar face 428 within groove 412. Referring now to FIGS. 70 to 77, within opening 470 flats 420 define end wall 98 to prevent further movement of coaxial jack 450 through opening 470 toward second end 472. End wall 98 engages a lip 488 defined on coaxial jack 450 by flats 418 (shown in FIGS. 65, 68, 76 and 77).

FIGS. 78 and 79 illustrate jack pair 528, which is similarly configured to jack pair 428, described above. Jack pair 528 includes a pair of housings 546 which each have a flange 562 which is positioned at a point between a first end 564 and a second opposite end 572. Flange 562 includes a mounting face 565 which is positioned adjacent one of the offset flanges 504 or 506 (shown in FIGS. 54 to 59). A fastener inserted through opening 68 may engage an opening in a rearward lip 505 (see FIG. 54) of either flange 504 or 506 to hold jack pair 528 to panel 510. In this configuration, front connector 30 is positioned extending from first end 564 behind panel front 518, while the attachment point is set rearward at the interface of lip 505 and mounting face 565. So positioned, jack pair 528 and front connectors 30 are allowed more movement to ensure that front connectors 30 are properly aligned behind openings 20 and to allow easy insertion or withdrawal of mating plugs from openings 20. Flange 562 is supported opposite mounting face 565 by side walls 514 extending along either side of housing 546. Between sidewalls 514 is defined a channel 516 to permit access to a fastener in opening 68.

Referring now to FIGS. 80 to 85, housing 546 includes catch 410 with inward projecting end 422. End 422 includes ramped face 424 and opposing face 426. When coaxial jack 450 is inserted within opening 470, projecting end engages groove 412 and face 426 engages face 428 of jack 450 to prevent jack 450 from being removed through first end 564. Movement of jack 450 further into opening 470 is prevented by lip 488 defined by flat 418 of jack 450 engaging end wall 98. Flats 418 of jack 450 engage flats 420 within opening 470 to prevent rotation is jack 450 within opening 470, and may also orient bayonets 80 to a desired position.

FIGS. 86 to 88 show coaxial jack 450 is similar in configuration to jack 150, described above. A first outer housing 434 includes flats 418 and corresponding lip 488, as well as groove 412 defined by face 428 and an opposing face 430. As shown, opposing face 430 is ramped to aid in engagement of end 422 of catch 410. It is anticipated that opposing face 430 could also be configured more generally parallel to face 428.

FIGS. 89 to 95 illustrate an additional embodiment of a coaxial jack assembly and housing according to the present invention, which includes a housing 602 and a jack assembly 600. A fastener 604 extends through an opening 606 in a mounting flange 608 on adjacent a first end 630 of housing 602. A pair of side walls 610 extend from flange 608 toward a second opposite end 632. Side walls 610 are opposite face 56 and may be parallel extensions of sides 614 of housing 602. Between side walls 610 is a channel 616 allowing access to fastener 604. Positioned in each side 614 may be a catch 618 extending into an opening 626 of housing 602. Catch 618 is configured to engage a protrusion 620 on the side of jack assembly 600 to hold jack assembly 600 within opening 626.

A pair of mating surfaces 622 may be formed in opposing sides of jack assembly 600 to aid in the alignment and orientation of jack assembly 600 with opening 626 so that catches 618 may engage protrusions 620. Corresponding mating surface 624 within opening 626 engage mating surfaces 622 of jack assembly 600. In FIG. 90, a label 628 has been placed on side 614 of housing 602 and covers catch 618 on that side of the housing. Label 628 may receive indicia identifying equipment connected to jack assembly 600 or other information such as product identifiers or serial numbers.

Figure 95:
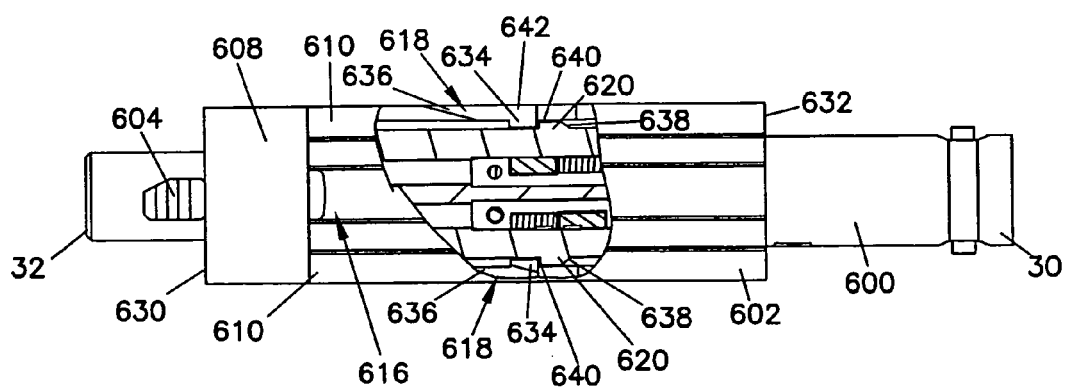
FIG. 95 is a top view of the jack assembly and housing of FIG. 89, with a partial cross-section of the engagement of the jack assembly and the housing.
Figure 96:
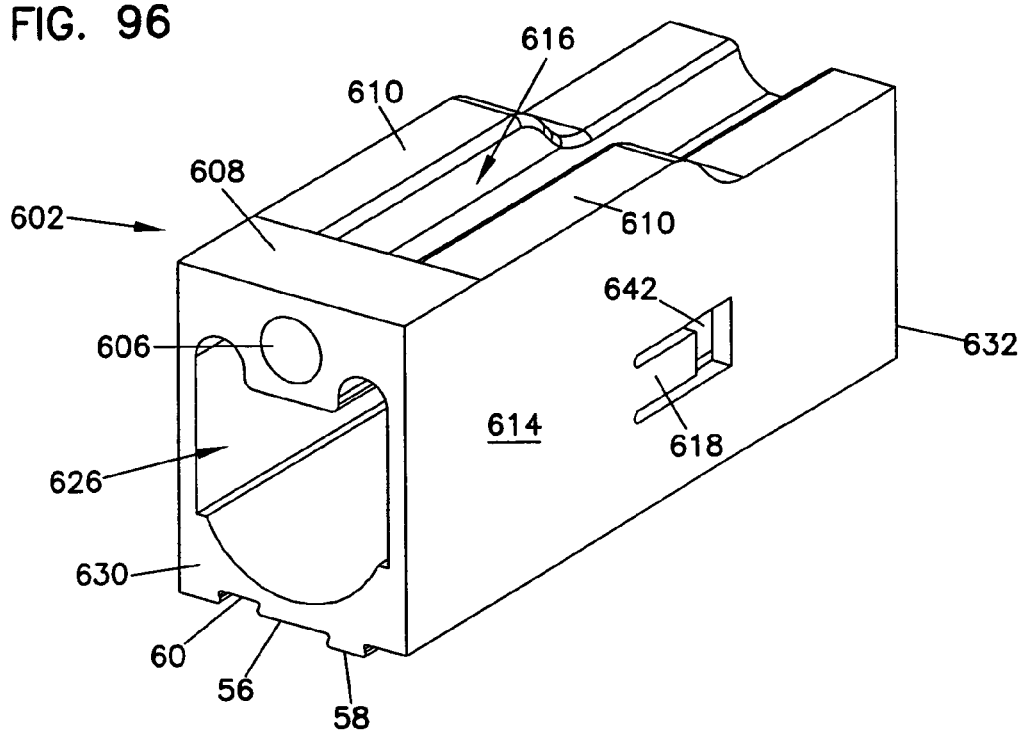
FIG. 96 is a first perspective view of the housing of FIG. 89.
Figure 97:
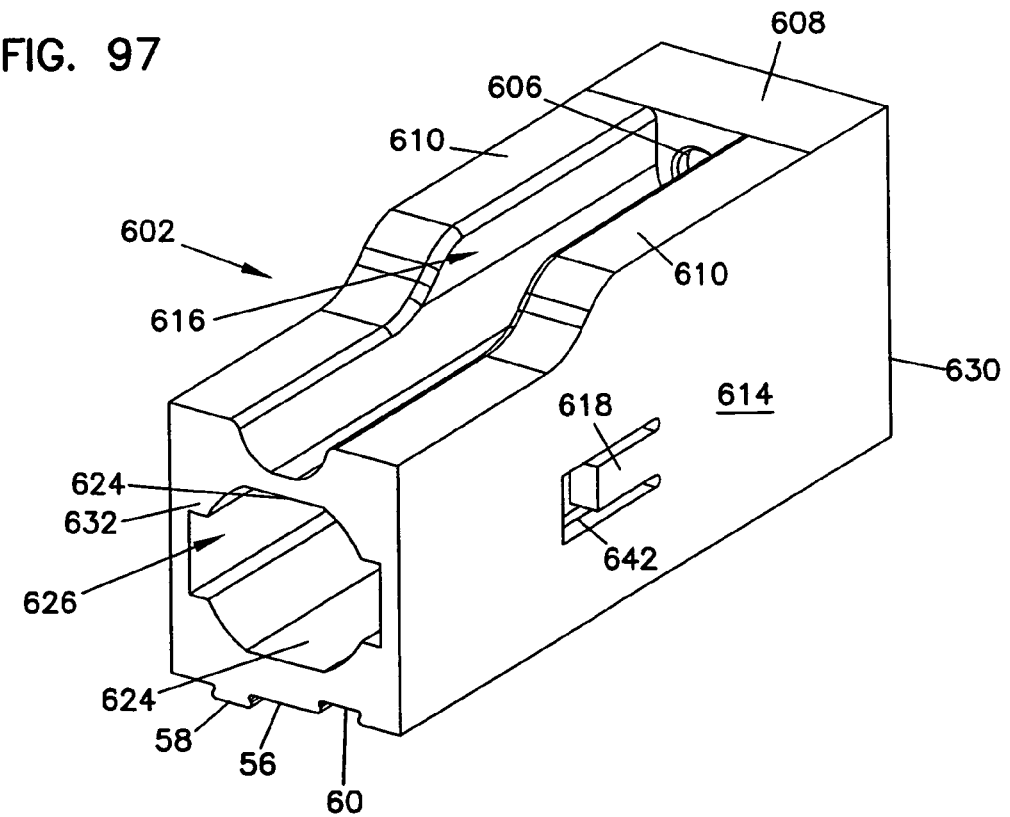
FIG. 97 is a second perspective view of the housing of FIG. 96.
Figure 98:
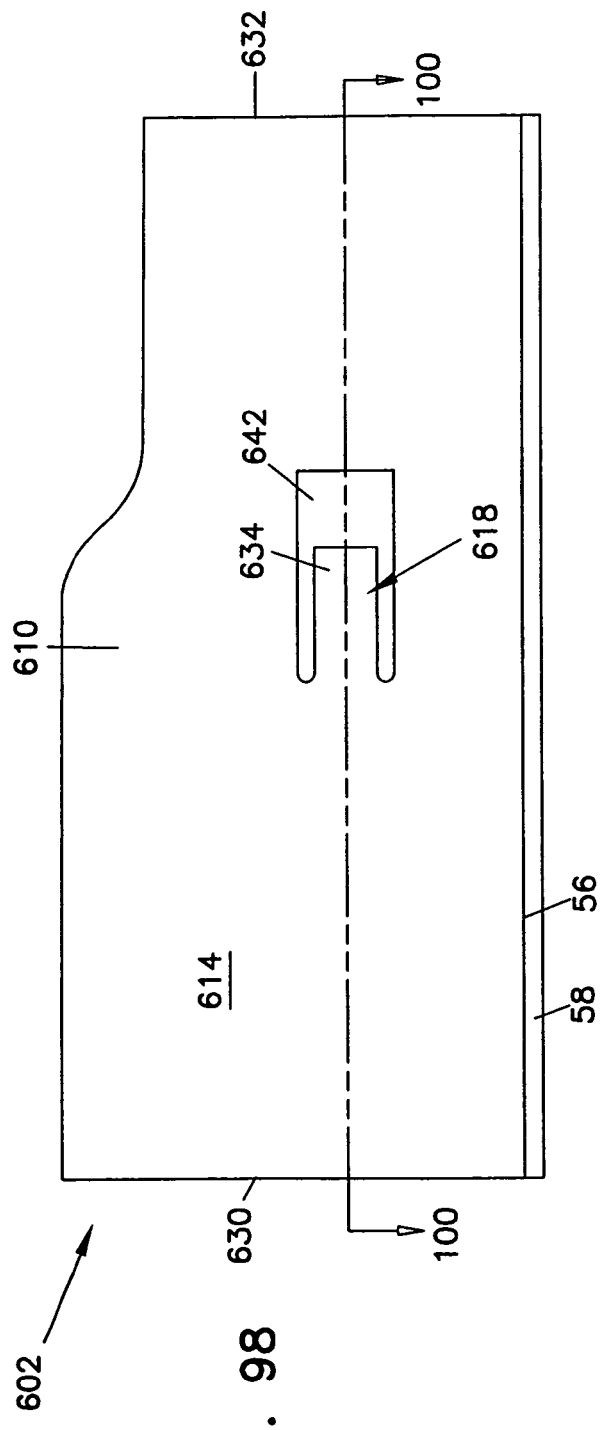
FIG. 98 is a side view of the housing of FIG. 96.

Referring now to FIG. 95, catch 618 includes an inwardly extending tab 634 mounted to an end of a flexible arm 636. The other end of arm 636 is attached to housing 602 and catch 618 extends within an opening 642 of housing 602. Opening 642 may be open between side 614 and jack opening 626. Flexible arm 636 permits tab 634 to be deflected outward by the insertion of jack assembly 600 within opening 626 as a ramped face 638 of protrusion 620 engages tab 634 during insertion. As protrusion 620 passes tab 634, arm 636 snaps back into place as shown in FIG. 95 so that tab 634 now engages a radial surface 640 opposite ramped face 638. Engagement of tab 634 and surface 640 prevents jack assembly 600 from being removed from opening 626 through first end 630. As shown in the FIGS. above, jack assembly 600 includes lip 488 which engages end wall 98 to prevent further insertion of jack assembly 600 into opening 626 and also prevents removal of jack assembly 600 through second end 632. As shown in FIG. 92, bayonets 80 of front connector 30 do not extend far enough from jack assembly 600 to engage tabs 634. If there is some interference between tabs 634 and bayonets 80 during insertion, a slight twist or side to side manipulation of jack assembly 600 should permit passage of bayonets 80 beyond tabs 634.

Figure 100:
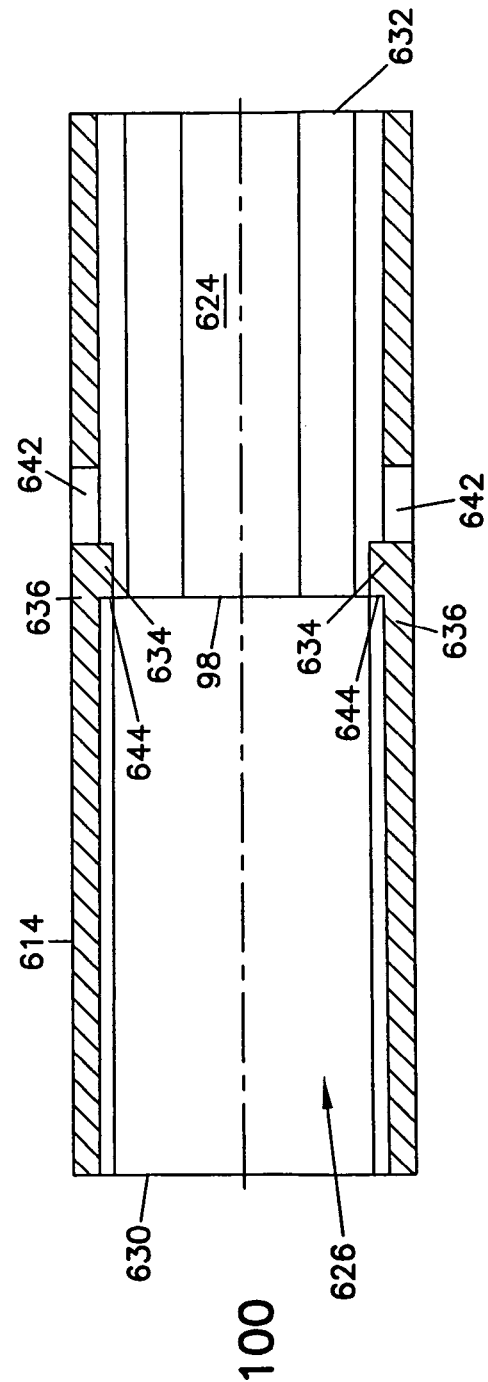
FIG. 100 is a top cross-sectional view of the housing of FIG. 96, taken along line 100-100 of FIG. 98.

FIGS. 96 to 103 illustrate housing 602 is further detail. Housing 602 is similar in many respects to housing 446, above, with the inclusion of tabs 634 and arms 636 of catch 618 extending within openings 642 in sides 614. Housing 602 is preferably made of a material with sufficient strength and resilience so that catch 618 may be formed integrally with side 614. Catch 618 should be flexible enough to permit outward deflection for passage of protrusion 620 past tab 634 and resilient enough to return to the position shown in FIGS. 95 and 100. In FIGS. 95 and 100, tab 634 has returned to an undeflected position with a retention face 644 engaging radial surface 640. Note in FIGS. 100 and 102, that end wall 98 and retention surface 644 may be generally aligned with each other, as shown, or may be located at different locations within opening 626. It is preferable that a pair of end walls 98 and a pair of catches 618 may be included on housing 602. Alternatively, a single end wall 98 and a single catch 618 may be sufficient. Also note that mating surfaces 624 are generally at a ninety degree spacing from each other about opening 626. Other configurations of relative spacing about opening 626 and jack assembly 600 are possible within the bounds of the present invention.

Figure 106:
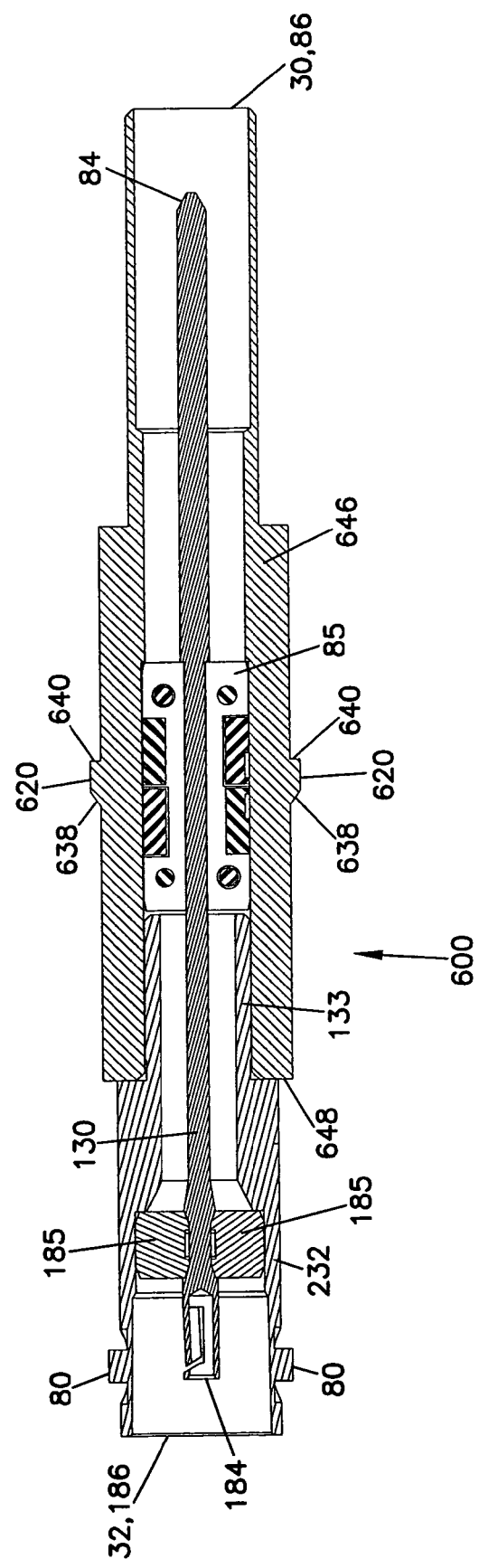
FIG. 106 is a side cross-sectional view of the jack assembly of FIG. 104.
Figure 107:
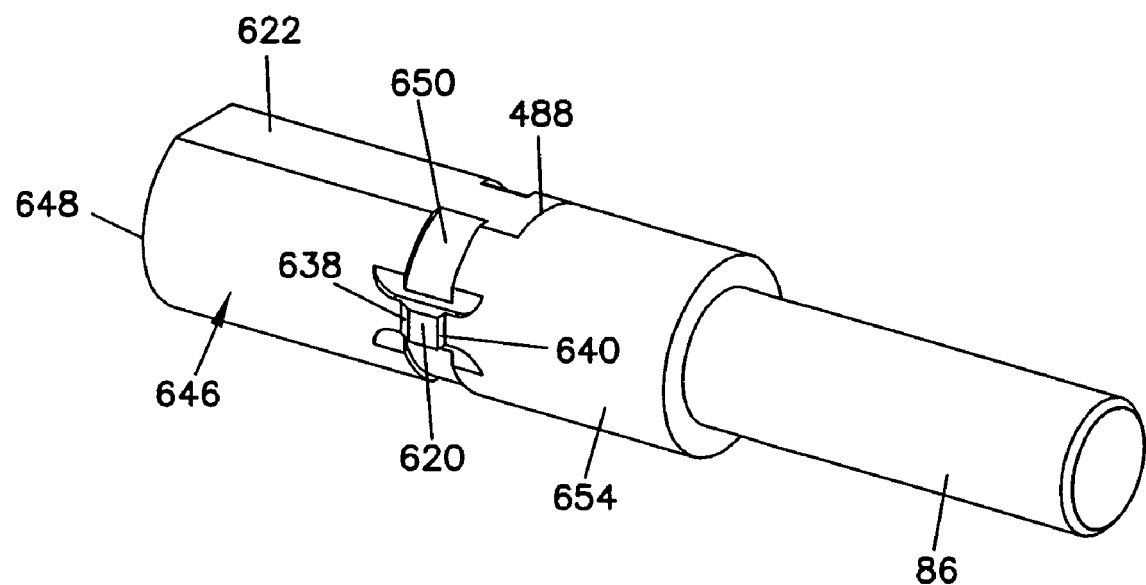
FIG. 107 is a perspective view of an outer housing of the jack assembly of FIG. 104.
Figure 108:
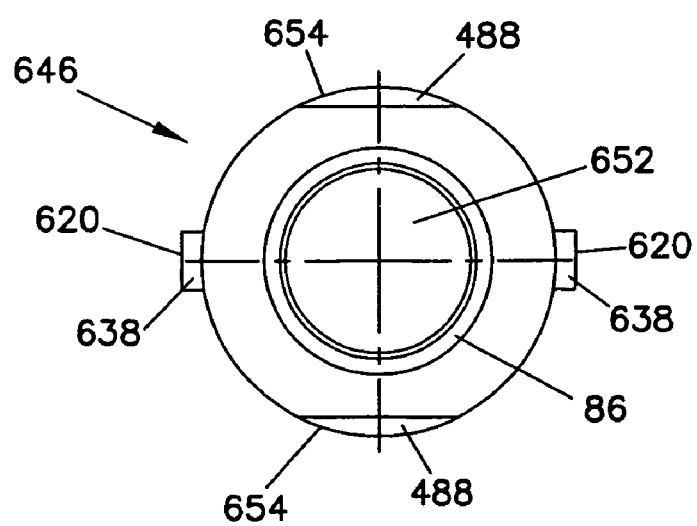
FIG. 108 is an end view of the outer housing of FIG. 107.
Figure 109:
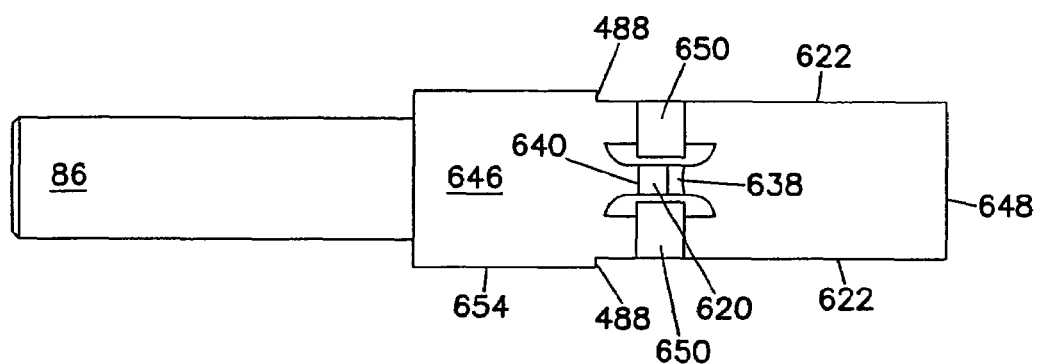
FIG. 109 is a side view of the outer housing of FIG. 107.
Figure 110:
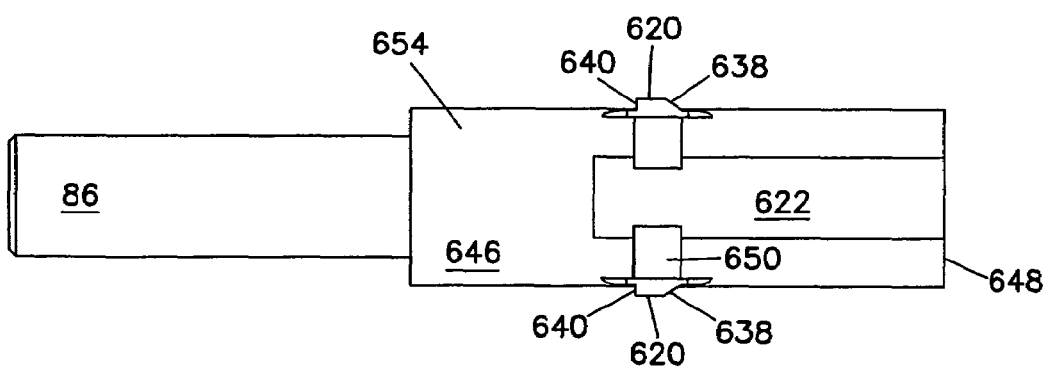
FIG. 110 is a top view of the outer housing of FIG. 107.

FIGS. 104 to 106 illustrate jack assembly 600 with second outer housing 232 including knurled end 133 received within a first outer body 646. First outer body 646 includes mating surfaces 622 about an exterior adjacent an end 648 within which knurled end 133 is received. Positioned generally ninety degrees from mating surfaces 622 are protrusions 620 with ramped surface sloped toward end 648 and surface 640 directed toward outer conductive shell 86 forming part of front end 30.

FIGS. 107 to 110 show first outer body 646 of jack assembly 600 with the other components removed. Body 646 includes a generally circumferential groove 650 positioned generally aligned with protrusion 620. In contrast with groove 412 of first outer body 434 of jack assembly 450, above, groove 650 does not extend deeply into body 646. This permits a larger opening 652 within body 646 to be formed while still maintaining sufficient strength by having not reducing the thickness of body 646. Note that groove 650 does not extend as deep as mating surfaces 622 into an outer surface 654 of body 646. Reduction of the limitations on the size of opening 652 become more desirable as jack assembly 600 is configured for use with smaller format mating jack and socket designs.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A housing for a coaxial jack, the housing comprising:
   a body extending from a first end to a second end;
   a pair of longitudinal openings extending from the first end of the body to the second end of the body, the longitudinal openings each sized to receive the coaxial jack through the first end;
   the openings each including a mating surface to prevent rotation of the coaxial jack within the longitudinal opening;
   the openings each including a flexible catch for locking the coaxial jack from movement within the longitudinal opening in a first direction of further insertion of the coaxial jack in the opening and in a second direction opposite to the first direction;
   the body including a first flange extending from a first outer surface of the body and extending generally perpendicular to the longitudinal opening, the first flange including an opening to receive a fastener.

2. The housing of claim 1, further comprising a second flange extending from a second outer surface of the body, the first flange and the second flange extending generally in opposite directions, the second flange including an opening to receive a fastener.

3. The housing of claim 1, wherein the first flange extends from the body adjacent the first end.

4. The housing of claim 1, wherein the mating surface of each of the openings is a flat.

5. The housing of claim 4, wherein each longitudinal opening includes a pair of opposing flats.

6. The housing of claim 1, wherein the flexible catch of each opening includes an inwardly extending tab extending into the longitudinal opening, and an arm extending within an opening in a side of the housing adjacent the longitudinal opening.

7. The housing of claim 6, wherein the inwardly extending tab includes a ramped surface angled toward the first end of the body.

8. The housing of claim 7, wherein the inwardly extending tab includes a retention surface facing the second end of the body.

9. The housing of claim 1, further comprising a pair of flexible catches in each opening to lock the coaxial jack within the longitudinal opening.

10. The housing of claim 9, wherein the flexible catches are positioned generally opposite each other within each of the longitudinal openings.

11. The housing of claim 9, wherein each of the flexible catches includes an inwardly extending tab extending into the longitudinal opening, and an arm extending within an opening in a side of the housing adjacent the longitudinal opening.

12. The housing of claim 1, wherein the body is non-conductive.

13. A jack pair comprising:
 first and second jack assemblies, each jack assembly including a first coaxial connector end and a second coaxial connector end, each of the connector ends adapted to receive and electrically mate with a coaxial connector;
 first and second housings, each housing defining a longitudinal opening configured to position one of the jack assemblies within the opening with the first coaxial connector adjacent a first end of the housing and the second coaxial connector end adjacent a second end of the housing;
 the opening of each housing receiving one of the jack assemblies through the first end of the housing;
 the opening of each housing including a first mating surface and each jack assembly within the opening including a second mating surface, the first and second mating surfaces cooperating to prevent rotation of the jack assembly within the opening;
 the opening of each housing including a flexible catch for locking the jack assembly from movement within the longitudinal opening in a first direction of further insertion of the jack assembly in the opening and in a second direction opposite to the first direction;
 each housing including an outer face including a longitudinal ridge and a longitudinal groove, the ridge and the groove of the first housing slidably received within the groove and ridge, respectively, of the second housing to releasably hold the outer faces of the first and second housings together;
 each of the housings including a mounting flange extending opposite the outer face of the housing, the mounting flange including a mounting opening for receiving a fastener.

14. The jack pair of claim 13, wherein the mounting flanges are adjacent the first end of each housing.

15. The jack pair of claim 13, wherein the longitudinal opening of each housing includes two opposing first mating surfaces and each jack assembly includes two opposing second mating surfaces.

16. The jack pair of claim 13, wherein the ridge has a dovetail shape and the groove has a mating shape for slidably receiving the dovetail shape of the ridge.

17. The jack pair of claim 13, wherein the first and second mating surfaces are flats.

18. The jack pair of claim 13, wherein the flexible catch includes an inwardly extending end projecting into the longitudinal opening and engaging a groove of the jack assembly within the longitudinal opening.

19. The jack pair of claim 18, wherein the groove of the jack assembly extends generally circumferentially about the jack assembly.

20. The jack pair of claim 13, further comprising a pair of flexible catches in each opening to lock the jack assembly within the longitudinal opening.

21. The jack pair of claim 20, wherein the flexible catches are positioned generally opposite each other within each of the longitudinal openings.

22. The jack pair of claim 20, wherein each of the flexible catches includes an inwardly extending tab extending into the longitudinal opening, and an arm extending within an opening in a side of the housing adjacent the longitudinal opening.

23. The jack pair of claim 13, wherein the flexible catch includes a tab extending inwardly into the longitudinal opening which engages a protrusion extending outwardly from the jack assembly.

24. The jack pair of claim 23, further comprising two flexible catches extending into each longitudinal opening, each catch releasably engaging an outwardly extending protrusion of each jack assembly.

25. The jack pair of claim 24, wherein the two catches are positioned on generally opposite sides of the longitudinal opening of each housing.

26. The jack pair of claim 13, wherein each housing is non-conductive.

* * * * *